(12) United States Patent
Yoshida et al.

(10) Patent No.: US 7,726,765 B2
(45) Date of Patent: Jun. 1, 2010

(54) PRINTING METHOD, STORAGE MEDIUM, MEDIUM, PRINTING APPARATUS, METHOD FOR DETECTING END OF IMAGE, METHOD FOR DETECTING CARRYING UNEVENNESS OF MEDIUM, AND DEVICE FOR DETECTING CARRYING UNEVENNESS OF MEDIUM

(75) Inventors: Masahiko Yoshida, Nagano-ken (JP); Keigo Yamasaki, Tokyo (JP); Tatsuya Nakano, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 685 days.

(21) Appl. No.: 11/412,835

(22) Filed: Apr. 28, 2006

(65) Prior Publication Data
US 2006/0269342 A1    Nov. 30, 2006

(30) Foreign Application Priority Data
Apr. 28, 2005  (JP) ............................. 2005-133697
Apr. 28, 2005  (JP) ............................. 2005-133698
Apr. 28, 2005  (JP) ............................. 2005-133700

(51) Int. Cl.
B41J 29/393    (2006.01)
(52) U.S. Cl. ................................. 347/19; 347/5; 347/9
(58) Field of Classification Search .................. 347/5, 347/9, 12, 19, 14, 15; 356/150; 358/443
See application file for complete search history.

(56) References Cited
U.S. PATENT DOCUMENTS
4,878,124 A  * 10/1989  Tsujimoto et al. ........... 358/443
2003/0156148 A1 * 8/2003  King et al. ................... 347/19
2004/0130708 A1 * 7/2004  Ruiz et al. ................... 356/150

FOREIGN PATENT DOCUMENTS
JP    02-054676 A    2/1990
JP    06-166247 A    6/1994

* cited by examiner

Primary Examiner—Lam S Nguyen
(74) Attorney, Agent, or Firm—Sughrue Mion, PLLC

(57) ABSTRACT

A printing method according to the present invention includes carrying a medium, and printing, using a nozzle for ejecting ink, a plurality of images each having a section to be detected for detecting an inclination of the image with respect to the carried medium.

13 Claims, 38 Drawing Sheets

READ DARKNESS DATA TABLE

| ROW AREA NUMBER | CYAN | | | | | MAGENTA | | | | |
|---|---|---|---|---|---|---|---|---|---|---|
| | DARK-NESS1 | DARK-NESS2 | DARK-NESS3 | DARK-NESS4 | DARK-NESS5 | DARK-NESS1 | DARK-NESS2 | DARK-NESS3 | DARK-NESS4 | DARK-NESS5 |
| 1 | xxx | xxx | xxx | xxx | xxx | xxx | xxx | xxx | xxx | xxx |
| 2 | xxx | xxx | xxx | xxx | xxx | xxx | xxx | xxx | xxx | xxx |
| 3 | xxx | xxx | xxx | xxx | xxx | xxx | xxx | xxx | xxx | xxx |

| |
|---|
| THE NUMBER OF ROW AREAS IN FRONT END PROCESSING SECTION |
| THE NUMBER OF ROW AREAS IN INTERMEDIATE PROCESSING SECTION |
| THE NUMBER OF ROW AREAS IN REAR END PROCESSING SECTION |
| |
| CORRECTION VALUES FOR FRONT END PROCESSING SECTION |
| CORRECTION VALUES FOR INTERMEDIATE PROCESSING SECTION |
| CORRECTION VALUES FOR REAR END PROCESSING SECTION |
| |

CORRECTION VALUES FOR FRONT END PROCESSING SECTION

| ROW AREA NUMBER | CYAN | | | MAGENTA | | | YELLOW | | | BLACK | | |
|---|---|---|---|---|---|---|---|---|---|---|---|---|
| | DARK-NESS2 | DARK-NESS3 | DARK-NESS4 | DARK-NESS2 | DARK-NESS3 | DARK-NESS4 | DARK-NESS2 | DARK-NESS3 | DARK-NESS4 | DARK-NESS2 | DARK-NESS3 | DARK-NESS4 |
| 1 | C2_1 | C3_1 | C4_1 | M2_1 | M3_1 | M4_1 | Y2_1 | Y3_1 | Y4_1 | K2_1 | K3_1 | K4_1 |
| 2 | C2_2 | C3_2 | C4_2 | M2_2 | M3_2 | M4_2 | Y2_2 | Y3_2 | Y4_2 | K2_2 | K3_2 | K4_2 |
| 3 | C2_3 | C3_3 | C4_3 | M2_3 | M3_3 | M4_3 | Y2_3 | Y3_3 | Y4_3 | K2_3 | K3_3 | K4_3 |
| ⋮ | ⋮ | | | ⋮ | | | ⋮ | | | ⋮ | | |

| ERROR FLAG OF DISTANCE BETWEEN LEFT RULED LINES | × | ○ | × | × | ○ | × | ○ |
|---|---|---|---|---|---|---|---|
| ERROR FLAG OF DISTANCE BETWEEN RIGHT RULED LINES | × | × | ○ | × | × | ○ | ○ |
| ERROR FLAG OF DIFFERENCE BETWEEN DISTANCES BETWEEN LEFT AND RIGHT RULED LINES | × | × | × | ○ | ○ | ○ | ○ |
| | NO SKEW | LEFT SKEW (SLIGHT) | RIGHT SKEW (SLIGHT) | SYMMETRICAL SKEW (SLIGHT) | LEFT SKEW (SERIOUS) | RIGHT SKEW (SERIOUS) | SYMMETRICAL SKEW (SERIOUS) |

PRINTING METHOD, STORAGE MEDIUM, MEDIUM, PRINTING APPARATUS, METHOD FOR DETECTING END OF IMAGE, METHOD FOR DETECTING CARRYING UNEVENNESS OF MEDIUM, AND DEVICE FOR DETECTING CARRYING UNEVENNESS OF MEDIUM

CROSS-REFERENCE TO RELATED APPLICATIONS

The present application claims priority on Japanese Patent Application No. 2005-133697 filed on Apr. 28, 2005, Japanese Patent Application No. 2005-133698 filed on Apr. 28, 2005, and Japanese Patent Application No. 2005-133700 filed on Apr. 28, 2005, which are herein incorporated by reference.

BACKGROUND

1. Technical Field

The present invention relates to printing methods, storage media, media, printing apparatuses, methods for detecting an end of an image, methods for detecting carrying unevenness of a medium, and devices for detecting carrying unevenness of a medium.

2. Related Art (1) Inkjet printers (hereinafter, referred to as "printers") are known as printing apparatuses for forming an image by ejecting ink onto paper serving as a medium. These printers repeat in alternation a dot forming operation in which dots are formed on paper by ejecting ink from a plurality of nozzles moving in a movement direction of a carriage, and a carrying operation in which a carry unit carries the paper in an intersecting direction (hereinafter, also referred to as "carrying direction") that intersects the movement direction. Thus, a plurality of raster lines constituted by a plurality of dots along the movement direction are formed in the intersecting direction, so that an image is printed (see JP-A-06-166247).

However, in the printers as above, there is a possibility that an image is printed at an angle with respect to paper due to, for example, the characteristics of a paper carry mechanism of the printers. Furthermore, in the printers as above, there is a case in which a predetermined pattern used for adjusting the printers and other purposes is printed in addition to an ordinary image such as letters and sceneries. There is a problem that it may be impossible to perform adjustment well when such a predetermined pattern used for adjustment and other purposes is printed at an angle with respect to paper, and adjustment is performed without noticing that the pattern is at an angle.

(2) Furthermore, there is a case in which it is required to detect the area of an image, that is, an end portion of the image by reading the image that has been printed in the printing apparatuses as above with a reading device and the like.

However, in the printers as above, ink may spread over the area that is to be printed originally at an end portion of the image, for example, because the ink that has been ejected on the paper smudges. Thus, there is a possibility that the area of the printed image is larger than the area of the image that is to be printed originally, so that it is impossible to accurately detect the end portion of the image.

(3) Furthermore, in printing apparatuses such as inkjet printers, a process is performed in which ejection non-uniformity of ink is adjusted by reading the darkness of a test pattern that has been printed by the printing apparatuses (see JP-A-H02-54676). In this process, the darkness of the printed test pattern is read by a darkness reading device such as a scanner, for example.

There is a case in which when a test pattern is printed, paper is carried askew, for example, because the paper slips on a paper sending roller or the paper is excessively pressed by a paper guide. For example, there is a case in which paper is carried in a curve because the carrying amount is uneven between one side and the other side in the width direction of the paper (hereinafter, the phenomenon in which paper is carried in a curve is also referred to as "skew"). When the skew occurs, the test pattern is printed in a deformed state, and thus the accuracy in adjustment is degraded. However, it is difficult to detect this skew by visual observation.

SUMMARY

A first aspect of the present invention was arrived at in order to solve the first problem, and it is an object thereof to achieve printing methods, storage media, media, and printing apparatuses in which it is easy to detect the inclination of an image that has been printed on a medium.

The first aspect of the present invention in order to achieve the object is a printing method comprising: carrying a medium; and printing, using a nozzle for ejecting ink, a plurality of images respectively having sections to be detected for detecting inclinations of the images with respect to the carried medium.

A second aspect of the present invention was arrived at in order to solve the second problem, and it is an object thereof to achieve methods for detecting an end of an image, storage media, and printing apparatuses in which it is easy to detect an end of an image that has been printed on a medium.

The second aspect of the present invention in order to achieve the object is a method for detecting an end of an image, comprising: printing, on a medium, an image in which a plurality of dot rows constituted by a plurality of dots that are formed in a predetermined direction are arranged in an intersecting direction that intersects the predetermined direction, and in which the outermost dot row that is positioned at outermost of the plurality of dot rows arranged has extending portions that are formed so as to extend in an area wider than the other dot rows in the predetermined direction; reading the image that has been printed on the medium; and detecting an end of the image based on data obtained by reading the extending portion of the image.

A third aspect of the present invention was arrived at in view of the third problem, and it is an object thereof to precisely detect carrying unevenness (skew) when a test pattern is printed.

The third aspect of the present invention in order to achieve the object is a method for detecting carrying unevenness of a medium, comprising: obtaining read data by reading a test pattern that has been obtained by printing, on a medium, one index pair positioned away from each other in a movement direction by ejecting ink while moving a print head in the movement direction, after the one index pair has been printed, by carrying the medium in a carrying direction that intersects the movement direction, and after the medium has been carried, by printing, on the medium, another index pair positioned away from each other in the movement direction by ejecting the ink while moving the print head in the movement direction; and detecting carrying unevenness at one side portion and the other side portion in the movement direction of the medium when the test pattern has been printed on the medium, by obtaining a relationship between a position of the one index pair and a position of the other index pair using the read data.

Features and objects of the present invention other than the above will become clear by reading the description of the present specification with reference to the accompanying drawings.

BRIEF DESCRIPTION OF THE DRAWINGS

FIG. 35 is a diagram illustrating the area of a memory provided in a printer-side controller of the second embodiment.

Figure 1:
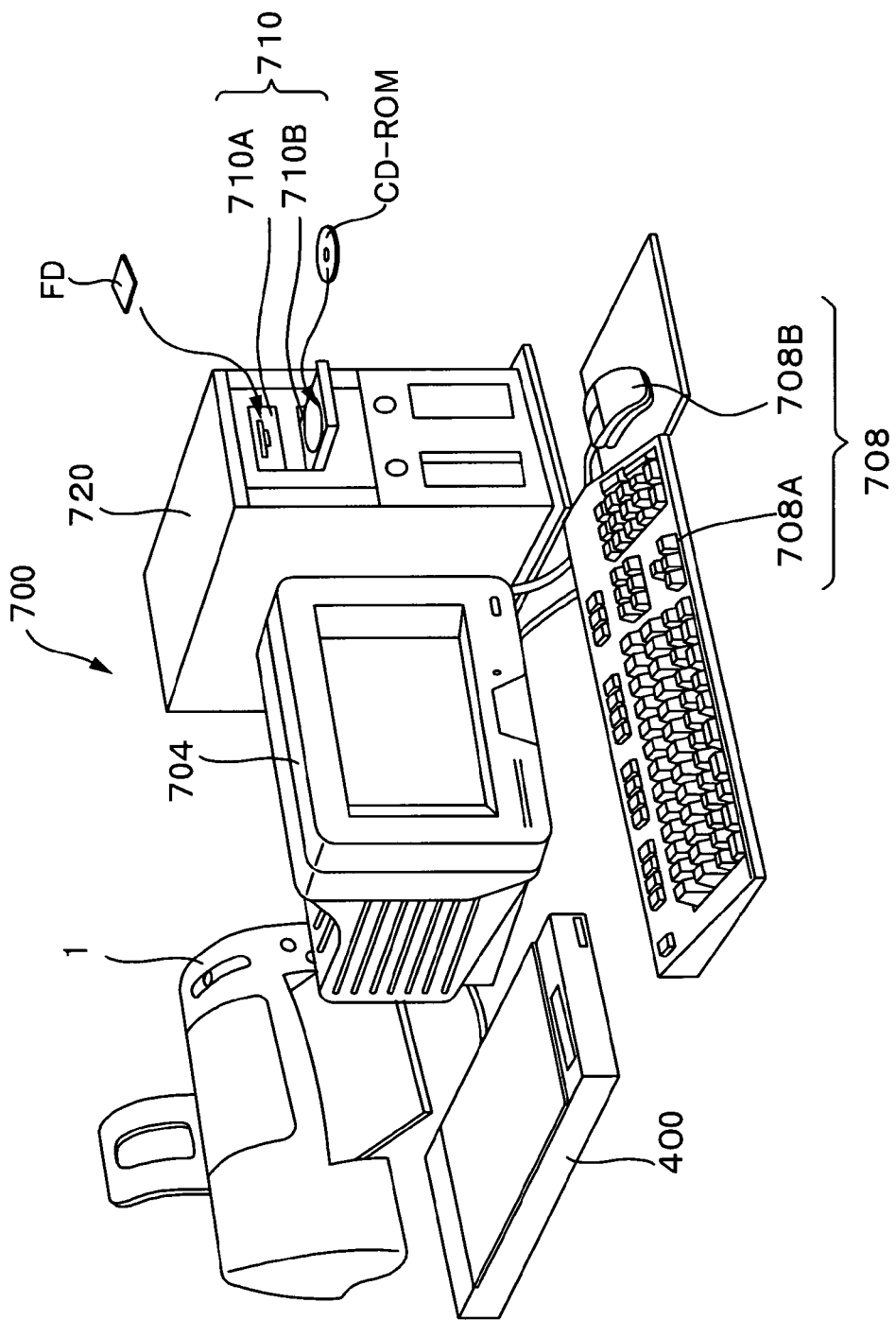
FIG. 1 is an explanatory view showing an appearance configuration of a printing system of a first embodiment.

For a more complete understanding of the present invention and the advantages thereof, reference is now made to the following description taken in conjunction with the accompanying drawings.

DESCRIPTION OF EXEMPLARY EMBODIMENTS

At least the following matters will be made clear by the explanation in the present specification and the description of the accompanying drawings.

A printing method comprises: carrying a medium; and printing, using a nozzle for ejecting ink, a plurality of images respectively having sections to be detected for detecting inclinations of the images with respect to the carried medium.

With this printing method, it is possible to print, on a medium, a plurality of images respectively having sections to be detected for detecting inclinations.

In this printing method, it is preferable that the image includes an adjustment pattern that is used for adjustment. With this printing method, it is possible to print images with which the inclinations of the adjustment patterns used for adjustment can be detected, and information that is necessary for the adjustment can be accurately input or output using the printed images. Thus, the adjustment can be performed better.

In this printing method, it is preferable that a plurality of the nozzles are arranged in a predetermined direction, the images are printed by forming dots on the medium with the ink ejected from a plurality of the nozzles while moving the nozzles in a movement direction that intersects the predetermined direction, based on image data for printing the images, the image data indicates gradation values for respective unit areas formed on the medium, adjustment information is acquired using measured values of darknesses of the adjustment patterns that have been printed based on specific gradation values, and the image data is corrected, by the adjustment so as to suppress darkness non-uniformity between row areas in which dot rows along the movement direction are formed using the nozzles when an image other than the adjustment patterns is printed, based on the adjustment information.

With respect to the row areas of the images to be corrected when the image data is corrected so as to suppress the darkness non-uniformity between the row areas in which the dot rows along the movement direction are formed, the direction is specified by the direction of the dot rows. Thus, an appropriate correction may not be performed unless the direction of the row areas that are provided in the adjustment patterns for acquiring the adjustment information based on which the correction is performed matches the direction of the areas between the dots of the images to be corrected. Furthermore, the adjustment information is acquired using measured values of the darknesses of the printed adjustment patterns, and thus when the adjustment patterns are at an angle, the adjustment information for the areas between the dots matching the direction of the row areas of the images may not be acquired. However, with the printing method as described above, it is possible to detect the inclinations of the adjustment patterns from the printed images, and thus it is possible to correct the image data appropriately after detecting the inclinations of the adjustment patterns and acquiring appropriate adjustment information.

Herein, "unit area" refers to a rectangular area that is virtually defined on a medium such as paper, and its size and shape are determined in accordance with the print resolution. For example, if the print resolution is 720 dpi (movement direction)×720 dpi (carrying direction), then the unit area is a square area with a size of about 35.28 μm×35.28 μm ($\approx$1/720 inch×1/720 inch). Furthermore, if the print resolution is 360 dpi×720 dpi, then the unit area is an oblong area with a size of about 70.56 μm×35.28 μm ($\approx$1/360 inch×1/720 inch). When an ink droplet is ejected in an ideal manner, the ink droplet lands on the center position of this unit area, and then the ink droplet spreads, and a dot is formed on the unit area. Furthermore, "row area" refers to an area that is constituted by a plurality of unit areas arranged in the movement direction. For example, if the print resolution is 720 dpi×720 dpi, then the row area is a band-shaped area with a width of about 35.28 μm ($\approx$1/720 inch) in the carrying direction. When ink droplets are intermittently ejected in an ideal manner from the nozzle moving in the movement direction, a dot row is formed in the row area.

In this printing method, it is preferable that the ink of a plurality of colors is used, the nozzles are provided for the respective colors of the ink, and the adjustment pattern is printed for the respective colors. The ink ejected from the nozzles that are provided for the respective colors may have different ejection characteristics. However, with the printing method described above, the adjustment patterns are printed for the respective colors, and thus it is possible to acquire more accurate adjustment information corresponding to the characteristics of the ink and the characteristics of the nozzles.

In this printing method, it is preferable that the adjustment pattern has a main section and the sections to be detected that are used for the adjustment, and the sections to be detected are provided on both sides of the main section in the movement direction. With this printing method, the sections to be detected for detecting the inclinations of the adjustment patterns are printed on both sides of the main sections that are used for the adjustment. Thus, the sections to be detected emphasize the positional difference caused by the inclinations of the main sections, so that it is possible to detect the inclinations more easily. Accordingly, it is possible to detect the inclinations more accurately.

In this printing method, it is preferable that the sections to be detected are ruled lines that are printed in the movement direction. The sections to be detected are printed as ruled lines along the movement direction that is the same direction as the direction in which the dot rows constituting the images including the adjustment patterns are formed. Thus, it is possible to accurately detect the inclinations of the adjustment patterns.

In this printing method, it is preferable that the ruled lines are formed on an extension line of an outermost dot row that is positioned at the outermost at a front end side of the medium when the medium on which the adjustment patterns have been printed is carried. With this printing method, the ruled lines as the sections to be detected are formed, in the adjustment patterns, on an extension line of the outermost dot row on the frontmost end side when the medium is carried. Thus, the main sections and the sections to be detected are printed at the same position in the carrying direction of the medium that is being carried. Accordingly, disturbance depending on the position on the medium acts in a similar manner on the main sections and the sections to be detected, and thus it is possible to detect the inclinations of the main sections by detecting the inclinations of the sections to be detected.

In this printing method, it is preferable that the ruled lines are formed when the nozzles are moved in order to form the outermost dot row that is positioned at the outermost at a front end side of the medium when the medium on which the adjustment patterns have been printed is carried. With this printing method, the ruled lines are formed when the nozzles are moved in order to form the outermost dot row on the front end side, and thus the ruled lines are formed during a series of operations performed when the outermost dot row on the front end side included in the main sections is formed. Thus, it is possible to detect the inclinations of the main sections more accurately by detecting the inclinations of the ruled lines.

In this printing method, it is preferable that the inclinations of the adjustment pattern are detected based on distances in the predetermined direction between the sections to be detected that are provided on one side of the main section in the movement direction and a front end of the medium, and distances in the predetermined direction between the sections to be detected that are provided on the other side of the main section in the movement direction and the front end of the medium. In the images printed based on this printing method, the inclinations of the adjustment patterns are detected based on the distances in the predetermined direction between the sections to be detected that are provided on one side of the main sections and the front end of the medium, and the distances in the predetermined direction between the sections to be detected that are provided on the other side of the main sections and the front end of the medium. Thus, it is possible to easily and accurately detect the inclinations of the adjustment patterns.

In this printing method, it is preferable that the inclinations of the adjustment pattern are detected for the respective adjustment patterns, data obtained by reading each of the adjustment patterns is adjusted based on the detected inclinations, and the adjustment information is acquired for each adjustment pattern. In the images printed based on this printing method, the inclinations of the adjustment patterns are detected for the respective adjustment patterns, data obtained by reading the adjustment patterns with the reading section is adjusted for the respective adjustment patterns based on the detected inclinations, and the adjustment information is acquired. Thus, it is possible to acquire more accurate adjustment information for each of adjustment patterns.

In this printing method, it is preferable that if it is detected that the inclinations of the adjustment patterns are equal to or more than a predetermined amount, then that detection is notified. With this printing method, when it is detected that the inclinations of the adjustment patterns are a predetermined amount or more, that detection can be reliably notified.

Furthermore, it is also possible to achieve a printing method, comprising: carrying a medium; and printing, using a nozzle for ejecting ink, a plurality of images respectively having sections to be detected for detecting inclinations of the image with respect to the carried medium, wherein the image includes an adjustment pattern that is used for adjustment, a plurality of the nozzles are arranged in a predetermined direction, the images are printed by forming dots on the medium with the ink ejected from a plurality of the nozzles while moving the nozzles in a movement direction that intersects the predetermined direction, based on image data for printing the images, the image data indicates gradation values for respective unit areas formed on the medium, adjustment information is acquired using measured values of darknesses of the adjustment patterns that have been printed based on specific gradation values, the image data is corrected, by the adjustment so as to suppress darkness non-uniformity between row areas in which dot rows along the movement direction are formed using each of the nozzles when an image other than the adjustment patterns is printed, based on the adjustment information, the ink of a plurality of colors is used, the nozzles are provided for the respective colors of the ink, the adjustment pattern is printed for the respective colors, the adjustment pattern has a main section and the sections to be detected that are used for the adjustment, the sections to be detected are provided on both sides of the main section in the movement direction, the sections to be detected are ruled lines that are printed in the movement direction, the ruled lines are formed on an extension line of an outermost dot row that is positioned at the outermost at a front end side of the medium when the medium on which the adjustment patterns have been printed is carried, the ruled lines are formed when the nozzles are moved in order to form the outermost dot row that is positioned at the outermost at a front end side of the medium when the medium on which the adjustment patterns have been printed is carried, the inclinations of the adjustment patterns are detected based on distances in the predetermined direction between the sections to be detected that are provided on one side of the main sections in the movement direction and a front end of the medium, and distances in the predetermined direction between the sections to be detected that are provided on the other side of the main section in the movement direction and the front end of the medium, the inclinations of the adjustment pattern are detected for the respective adjustment patterns, data obtained by reading each of the adjustment patterns is adjusted based on the detected inclinations, and the adjustment information is acquired for each of the adjustment patterns, and if it is detected that the inclinations of the adjustment patterns are equal to or more than a predetermined amount, then that detection is notified.

Furthermore, it is also possible to achieve a storage medium storing a program, wherein the program has a code for letting a printing apparatus having a nozzle for ejecting ink print, using the nozzle, a plurality of images respectively having sections to be detected for detecting inclinations of the image with respect to a medium.

Furthermore, it is also possible to achieve a medium on which an image is printed, wherein the image is a plurality of images that have been printed using a nozzle for ejecting ink and that respectively have sections to be detected for detecting inclinations of the image with respect to the medium.

Furthermore, it is also possible to achieve a printing apparatus, comprising: a nozzle for ejecting ink; and a controller for printing, using the nozzle, a plurality of images respectively having sections to be detected for detecting inclinations of the image with respect to a medium.

A method for detecting an end of an image, comprises: printing, on a medium, an image in which a plurality of dot rows constituted by a plurality of dots that are formed in a predetermined direction are arranged in an intersecting direction that intersects the predetermined direction, and in which the outermost dot row that is positioned at outermost of the plurality of dot rows arranged has extending portions that are formed so as to extend in an area wider than the other dot rows in the predetermined direction; reading the image that has been printed on the medium; and detecting an end of the image based on data obtained by reading the extending portions of the image.

With this method for detecting an end of an image, the outermost dot row of the image that is constituted by a plurality of dot rows arranged in the intersecting direction has extending portions that extends in an area wider than the other dot rows in the predetermined direction. Thus, it is possible to easily detect an end of the image based on the data obtained by reading the extending portions.

In this method for detecting an end of an image, it is preferable that the image is printed with a printing section having a plurality of nozzles for ejecting ink that are provided along the intersecting direction, by forming dots on the medium by ejecting the ink from the plurality of nozzles while moving the nozzles in the predetermined direction based on image data for printing the image. With this method for detecting an end of an image, it is possible to easily detect an end of the image based on the data obtained by reading the dot rows formed by predetermined nozzles in the image that is formed by moving, in the movement direction, the nozzles arranged in the intersecting direction.

In this method for detecting an end of an image, it is preferable that the image includes an adjustment pattern that is used for adjustment. The adjustment pattern is used for adjustment, and thus it is necessary to accurately read the adjustment pattern. With this method for detecting an end of an image, the adjustment pattern has an extending portion, and it is possible to detect an end of the adjustment pattern based on the data obtained by reading the extending portion. Accordingly, when the area of the adjustment pattern is detected based on the detected end of the adjustment pattern, it is possible to accurately read the end and the area of the adjustment pattern.

In this method for detecting an end of an image, it is preferable that the image data for printing an image other than the adjustment pattern is corrected, by the adjustment, so as to suppress darkness non-uniformity between row areas in which the dot rows are formed using each of the nozzles when the image other than the adjustment pattern is printed. With this method for detecting an end of an image, it is possible to acquire accurate data by detecting an end of the adjustment pattern, and based on the acquired accurate data, the image data for printing an image other than the adjustment pattern is corrected. Thus, in the image other than the adjustment pattern, it is possible to print good images by suppressing the darkness non-uniformity between the row areas in which the dot rows are formed using each of the nozzles.

Herein, when a rectangular area that is virtually defined on a medium such as paper is referred to as "unit area" whose size and shape are determined based on the print resolution, "row area" refers to an area that is constituted by a plurality of unit areas arranged in the movement direction. For example, if the print resolution is 720 dpi (movement direction)×720 dpi (carrying direction), then the unit area is a square area with a size of about 35.28 µm×35.28 µm ($\approx 1/720$ inch×$1/720$ inch). Furthermore, if the print resolution is 360 dpi×720 dpi, then the unit area is an oblong area with a size of about 70.56 µm×35.28 µm ($\approx 1/360$ inch×$1/720$ inch). When an ink droplet is ejected in an ideal manner, the ink droplet lands on the center position of this unit area, and then the ink droplet spreads on the medium, and a dot is formed on the unit area. For example, if the print resolution is 720 dpi×720 dpi, then the row area is a band-shaped area with a width of about 35.28 µm ($\approx 1/720$ inch) in the carrying direction. When ink droplets are intermittently ejected in an ideal manner from the nozzle moving in the movement direction, a dot row is formed in the row area.

In this method for detecting an end of an image, it is preferable that the image data indicates gradation values for respective unit areas formed on the medium, and darknesses of the adjustment pattern that has been printed based on specific gradation values is read as darkness data of each minimum reading area in a reading section for reading the image. With this method for detecting an end of an image, it is possible to read, as darkness data, the darkness of each of unit areas of the adjustment pattern that has been printed based on the gradation values indicated by the print data. Thus, it is possible to associate the gradation values indicated by the print data with the darkness data of the adjustment pattern that has been printed based on the gradation values.

In this method for detecting an end of an image, it is preferable that the center of gravity position in a darkness distribution in the intersecting direction is detected based on the darkness data of the minimum reading areas that are arranged in the intersecting direction in the extending portion, and the end of the image is detected based on the detected center of gravity position of the darkness distribution. The center of gravity position in the darkness distribution in the intersecting direction is detected based on the darkness data of the minimum reading areas that are arranged in the intersecting direction in the extending portion. Thus, it is highly possible that the detected position is the extending portion. Accordingly, it is possible to easily detect the extending portion that is formed at the same position as an end of the image in the intersecting direction.

In this method for detecting an end of an image, it is preferable that the reading resolution of the reading section is higher than the print resolution of the printing section. With this method for detecting an end of an image, the reading resolution of the reading section is higher than the print resolution of the printing section. Thus, even in the case of a one-dot dot row printed by the printing section, the darkness data exists over a plurality of minimum reading areas in the intersecting direction. Accordingly, it is possible to acquire more accurate darkness data when the extending portion is read.

In this method for detecting an end of an image, it is preferable that the extending portions extend in both directions, in a certain direction, from a section that is formed in the same area as the other dot rows, the center of gravity position in the darkness distribution in the intersecting direction is detected at each of both sides of the section that is formed in the same area as the other dot rows, and the center of the two detected center of gravity positions is detected as the center position in the intersecting direction of the outermost dot row. With this method for detecting an end of an image, the center of gravity position in the darkness distribution is detected at each of both sides of the section that is formed in the same area as the other dot rows, in the outermost dot row, that is, the section that is originally to be required in the printed image. Thus, even in a case where the center of gravity positions detected at both sides of the section that is originally to be required are different from each other, it is possible to detect their center as the center of the outermost dot row. Accordingly, it is possible to make the difference small between the center position of the outermost dot row that has been detected and the center position of the outermost dot row that is originally to be detected, overall in the entire area in the predetermined direction, and thus it is possible to detect the position of the outermost dot row more precisely.

In this method for detecting an end of an image, it is preferable that information indicating the reading resolution and the print resolution respectively is provided, the number of the successive minimum reading areas that are included within a width in the intersecting direction of the extending portion, and half of the number are calculated based on the reading resolution and the print resolution, and if the number of the successive minimum reading areas that has been calculated is an even number, then an edge of the minimum reading area that is positioned away from an edge, on a side closer to the center position, of the minimum reading area including the detected center position in the intersecting direction of the outermost dot row, by the half of the number toward an outer side in the image, is detected as the end of the image.

The detected center position in the intersection direction of the outermost dot row may not match the edge of the minimum reading area. Thus, when in the minimum reading area including the detected center position in the intersecting direction of the outermost dot row, the edge closer to the center position is specified as the center of the outermost dot row, it is possible to more precisely associate the darkness data of the minimum reading area that is to be specified as the outermost dot row, as the darkness data of the outermost dot row. Then, when the edge of the minimum reading area that is positioned away from the edge of the minimum reading area that is specified as the center of the outermost dot row, by the half of the calculated number towered the outer side in the image, is detected as an end of the image, it is possible to easily and accurately detect the end of the image.

In this method for detecting an end of an image, it is preferable that information indicating the reading resolution and the print resolution respectively is provided, the number of the successive minimum reading areas that are included within a width in the intersecting direction of the extending portion is calculated based on the reading resolution and the print resolution, and if the number of the successive minimum reading areas that has been calculated is an odd number, then half of the number that is smaller by one than the number of the successive minimum reading areas is calculated, the minimum reading area including the detected center position in the intersecting direction of the outermost dot row is taken as a center minimum reading area that is positioned at the center in the intersecting direction in the extending portion of the image, and an edge of the minimum reading area that is positioned away from the center minimum reading area by the half of the number toward an outer side in the image is detected as the end of the image.

With this method for detecting an end of an image, the minimum reading area including the detected center position in the intersecting direction of the outermost dot row is the minimum reading area at the center in the extending portion. Thus, if the number of the successive minimum reading areas that are included in the width in the intersecting direction of the extending portion is an odd number, then the minimum reading area including the detected center position in the intersecting direction of the outermost dot row is taken as the center minimum reading area, and the edge of the minimum reading area that is positioned away, by the half of the number that is smaller by one than the calculated number of the minimum reading areas of the extending portion, toward the outer side in the image is detected as an end of the image, and thus it is possible to accurately detect the end of the image even in a case where the number of the successive minimum reading areas that are included in the width in the intersecting direction of the extending portion is an odd number.

In this method for detecting an end of an image, it is preferable that the darkness data corresponding to areas in the intersecting direction of the adjustment pattern is extracted from data obtained by reading the adjustment pattern with the reading section using as a reference the detected end of the image, and the extracted darkness data is associated with each of the unit areas of the adjustment pattern. With this method for detecting an end of an image, the extracted darkness data is associated with the unit areas of the adjustment pattern, and thus it is possible to acquire accurate darkness data for each of the unit areas.

Furthermore, it is also possible to achieve a method for detecting an end of an image, comprising: printing, on a medium, an image in which a plurality of dot rows constituted by a plurality of dots that are formed in a predetermined direction are arranged in an intersecting direction that intersects the predetermined direction, and in which the outermost dot row that is positioned at outermost of the plurality of dot rows arranged has extending portions that are formed so as to extend in an area wider than the other dot rows in the predetermined direction; reading the image that has been printed on the medium; and detecting an end of the image based on data obtained by reading the extending portion of the image, wherein the image is printed with a printing section having a plurality of nozzles for ejecting ink that are provided along the intersecting direction, by forming dots on the medium by ejecting the ink from the plurality of nozzles while moving the nozzles in the predetermined direction based on image data for printing the image, the image includes an adjustment pattern that is used for adjustment, the image data for printing an image other than the adjustment pattern is corrected, by the adjustment, so as to suppress darkness non-uniformity between row areas in which the dot rows are formed using each of the nozzles when the image other than the adjustment pattern is printed, the image data indicates gradation values for respective unit areas formed on the medium, darknesses of the adjustment pattern that has been printed based on specific gradation values is read as darkness data of each minimum reading areas in a reading section for reading the image, the center of gravity position in a darkness distribution in the intersecting direction is detected based on the darkness data of the minimum reading areas that are arranged in the intersecting direction in the extending portion, and the end of the image is detected based on the detected center of gravity position of the darkness distribution, the reading resolution of the reading section is higher than the print resolution of the printing section, the extending portions extend in both directions, in a certain direction, from a section that is formed in the same area as the other dot rows, the center of gravity position in the darkness distribution in the intersecting direction is detected at each of both sides of the section that is formed in the same area as the other dot rows, the center of the two detected center of gravity positions is detected as the center position in the intersecting direction of the outermost dot row, information indicating the reading resolution and the print resolution respectively is provided, the number of the successive minimum reading areas that are included within a width in the intersecting direction of the extending portion, and half of the number are calculated based on the reading resolution and the print resolution, if the number of the successive minimum reading areas that has been calculated is an even number, then an edge of the minimum reading area that is positioned away from an edge, on a side closer to the center position, of the minimum reading area including the detected center position in the intersecting direction of the outermost dot row, by the half of the number toward an outer side in the image, is detected as the end of the image, if the number of the successive minimum reading areas that has been calculated is an odd number, then half of the number that is smaller by one than the number of the successive minimum reading areas is calculated, the minimum reading area including the detected center position in the intersecting direction of the outermost dot row is taken as a center minimum reading area that is positioned at the center in the intersecting direction in the extending portion of the image, and an edge of the minimum reading area that is positioned away from the center minimum reading area by the half of the number toward an outer side in the image is detected as the end of the image, and the darkness data corresponding to areas in the intersecting direction of the adjustment pattern is extracted from data obtained by reading the adjustment pattern with the reading section using as a reference the detected end of the image, and the extracted darkness data is associated with each of the unit areas of the adjustment pattern.

Furthermore, it is also possible to achieve a storage medium storing a program, wherein the program has a code for letting a printing apparatus having a printing section for printing, on a medium, an image in which a plurality of dot rows constituted by a plurality of dots that are formed in a predetermined direction are arranged in an intersecting direction that intersects the predetermined direction, and in which the outermost dot row that is positioned at outermost of the plurality of dot rows arranged has an extending portion that is formed so as to extend in an area wider than the other dot rows in the predetermined direction, and a reading section for reading the image that has been printed on the medium, detect an end of the image based on data obtained by reading the extending portions of the image.

Furthermore, it is also possible to achieve a printing apparatus, comprising: a printing section for printing, on a medium, an image in which a plurality of dot rows constituted by a plurality of dots that are formed in a predetermined direction are arranged in an intersecting direction that intersects the predetermined direction, and in which the outermost dot row that is positioned at outermost of the plurality of dot rows that are arranged has an extending portion that extends in an area wider than the other dot rows in the predetermined direction; a reading section for reading the image that has been printed on the medium; and a controller for detecting an end of the image based on data obtained by reading the extending portions of the image with the reading section.

Furthermore, it is also possible to achieve a method for detecting carrying unevenness of a medium, comprising: obtaining read data by reading a test pattern that has been obtained by printing, on a medium, one index pair positioned away from each other in a movement direction by ejecting ink while moving a print head in the movement direction, after the one index pair has been printed, by carrying the medium in a carrying direction that intersects the movement direction, and after the medium has been carried, by printing, on the medium, another index pair positioned away from each other in the movement direction by ejecting the ink while moving the print head in the movement direction, and detecting carrying unevenness at one side portion and the other side portion in the movement direction of the medium when the test pattern has been printed on the medium, by obtaining the relationship between a position of the one index pair and a position of the other index pair using the read data.

With this method for detecting carrying unevenness of a medium, carrying unevenness at one side portion and the other side portion in the movement direction of the medium when the test pattern has been printed on the medium is detected by obtaining a relationship between a position of the one index pair and a position of the other index pair that have been printed on the medium, and thus it is possible to precisely detect skew (carrying unevenness at one side portion and the other side portion in the movement direction) during printing.

In this method for detecting carrying unevenness of a medium, it is preferable that when the read data is obtained, the test pattern that has been obtained by printing, on the medium, the one index pair together with a part of a correction pattern for evaluating unevenness in darkness in the carrying direction, and by printing, on the medium, the other index pair together with another part of the correction pattern is read. With this method for detecting carrying unevenness of a medium, the index pair and the other index pair are printed together with the correction pattern, and thus it is possible to precisely detect deformation of the pattern caused by skew.

In this method for detecting carrying unevenness of a medium, it is preferable that when the read data is obtained, the test pattern that has been obtained by printing, on the medium, the one index pair together with the part of the correction pattern such that an index on one side is positioned on one side in the movement direction over the part of the correction pattern and such that an index on the other side is positioned on the other side in the movement direction over the part of the correction pattern, and by printing, on the medium, the other index pair together with the other part of the correction pattern such that an index on one side is positioned on one side in the movement direction over the other part of the correction pattern and such that an index on the other side is positioned on the other side in the movement direction over the other part of the correction pattern, is read.

With this method for detecting carrying unevenness of a medium, the indexes on one side and the indexes on the other side of the one index pair and the other index pair are printed on one side and the other side, in the movement direction, of the correction pattern. Thus, it is possible to precisely detect skew and deformation of the pattern caused by the skew.

In this method for detecting carrying unevenness of a medium, it is preferable that when the read data is obtained, the test pattern that has been obtained by printing, on the medium, the one index pair together with a part of a plurality of the correction patterns arranged in the movement direction, and by printing, on the medium, the other index pair together with another part of the plurality of correction patterns is read.

With this method for detecting carrying unevenness of a medium, the indexes on one side and the indexes on the other side of the one index pair and the other index pair are printed on one side and the other side, in the movement direction, of the plurality of correction patterns that are arranged in the movement direction. Thus, it is possible to more precisely detect skew and deformation of the patterns caused by the skew.

In this method for detecting carrying unevenness of a medium, it is preferable that when the carrying unevenness is detected, the carrying unevenness between the one side portion and the other side portion in the movement direction of the medium when the test pattern has been printed on the medium is detected by obtaining, using the read data, the relationship between a spacing between a position of an index on one side in the movement direction in the one index pair and a position of an index on the one side in the movement direction in the other index pair, and a spacing between a position of an index on the other side in the movement direction in the one index pair and a position of an index on the other side in the movement direction in the other index pair.

With this method for detecting carrying unevenness of a medium, carrying unevenness is detected by obtaining the relationship between a spacing between the position of the one index pair and the position of the other index pair on one side in the movement direction and a spacing between the position of the one index pair and the position of the other index pair on the other side in the movement direction, and thus it is possible to precisely detect skew during printing.

In this method for detecting carrying unevenness of a medium, it is preferable that when the carrying unevenness is detected, the carrying unevenness between the one side portion and the other side portion in the movement direction of the medium is detected by correcting an inclination of the read data based on a position of an index on one side in the movement direction and a position of an index on the other side in the one index pair in the read data, or a position of an index on one side in the movement direction and a position of an index on the other side in the other index pair, and by using the read data in which the inclination has been corrected.

With this method for detecting carrying unevenness of a medium, carrying unevenness of the medium is detected using the read data in which the inclination has been corrected, and thus it is possible to more precisely detect skew during printing.

In this method for detecting carrying unevenness of a medium, it is preferable that when the carrying unevenness is detected, the carrying unevenness at the one side portion and the other side portion in the movement direction of the medium is individually detected.

With this method for detecting carrying unevenness of a medium, carrying unevenness between the one side portion and the other side portion in the movement direction of the medium is individually detected, and thus it is possible to minutely detect the characteristics of skew during printing.

In this method for detecting carrying unevenness of a medium, it is preferable that a detection result of the carrying unevenness at the one side portion and the other side portion in the movement direction of the medium is notified. With this method for detecting carrying unevenness of a medium, the detection result of the carrying unevenness is notified, and thus it is possible to reliably let the operator confirm the detection result.

Furthermore, it is also possible to achieve a method for detecting carrying unevenness of a medium, comprising: obtaining read data by reading a test pattern that has been obtained by printing, on a medium, together with a part of a plurality of correction patterns, one index pair positioned away from each other in a movement direction by ejecting ink while moving a print head in the movement direction, such that an index on one side is positioned on one side in the movement direction over the part of a plurality of correction patterns for evaluating unevenness in darkness in the carrying direction, and such that an index on the other side is positioned on the other side in the movement direction over the part of the correction patterns, after the one index pair has been printed, by carrying the medium in a carrying direction that intersects the movement direction, and after the medium has been carried, by printing, on the medium, together with another part of the correction patterns another index pair positioned away from each other in the movement direction by ejecting the ink while moving the print head in the movement direction, such that an index on one side is positioned on one side in the movement direction over the other part of a plurality of the correction patterns and such that an index on the other side is positioned on the other side in the movement direction over the other part of a plurality of the correction patterns, individually detecting carrying unevenness at one side portion and the other side portion in the movement direction of the medium when the test pattern has been printed on the medium, by correcting an inclination of the read data based on a position of the index on one side in the movement direction and a position of the index on the other side in the one index pair in the read data, or a position of the index on one side in the movement direction and a position of the index on the other side in the other index pair, and by obtaining, using the read data in which the inclination has been corrected, a relationship between a spacing between the position of the index on one side in the movement direction in the one index pair and the position of the index on the one side in the movement direction in the other index pair, and a spacing between the position of the index on the other side in the movement direction in the one index pair and the position of the index on the other side in the movement direction in the other index pair, and a detection result of the carrying unevenness at the one side portion and the other side portion in the movement direction of the medium is notified.

Furthermore, it is also possible to achieve a device for detecting carrying unevenness of a medium, comprising: a scanner for obtaining read data by reading a test pattern that has been obtained by printing, on a medium, one index pair positioned away from each other in a movement direction by ejecting ink while moving a print head in the movement direction, after the one index pair has been printed, by carrying the medium in a carrying direction that intersects the movement direction, and after the medium has been carried, by printing, on the medium, another index pair positioned away from each other in the movement direction by ejecting the ink while moving the print head in the movement direction; and a controller for detecting carrying unevenness at one side portion and the other side portion in the movement direction of the medium when the test pattern has been printed on the medium, by obtaining a relationship between a position of the one index pair and a position of the other index pair using the read data.

First Embodiment

===Configuration of the Printing Apparatus===

An embodiment of a printing system as a printing apparatus of a first embodiment is described with reference to the drawings.

Figure 2:
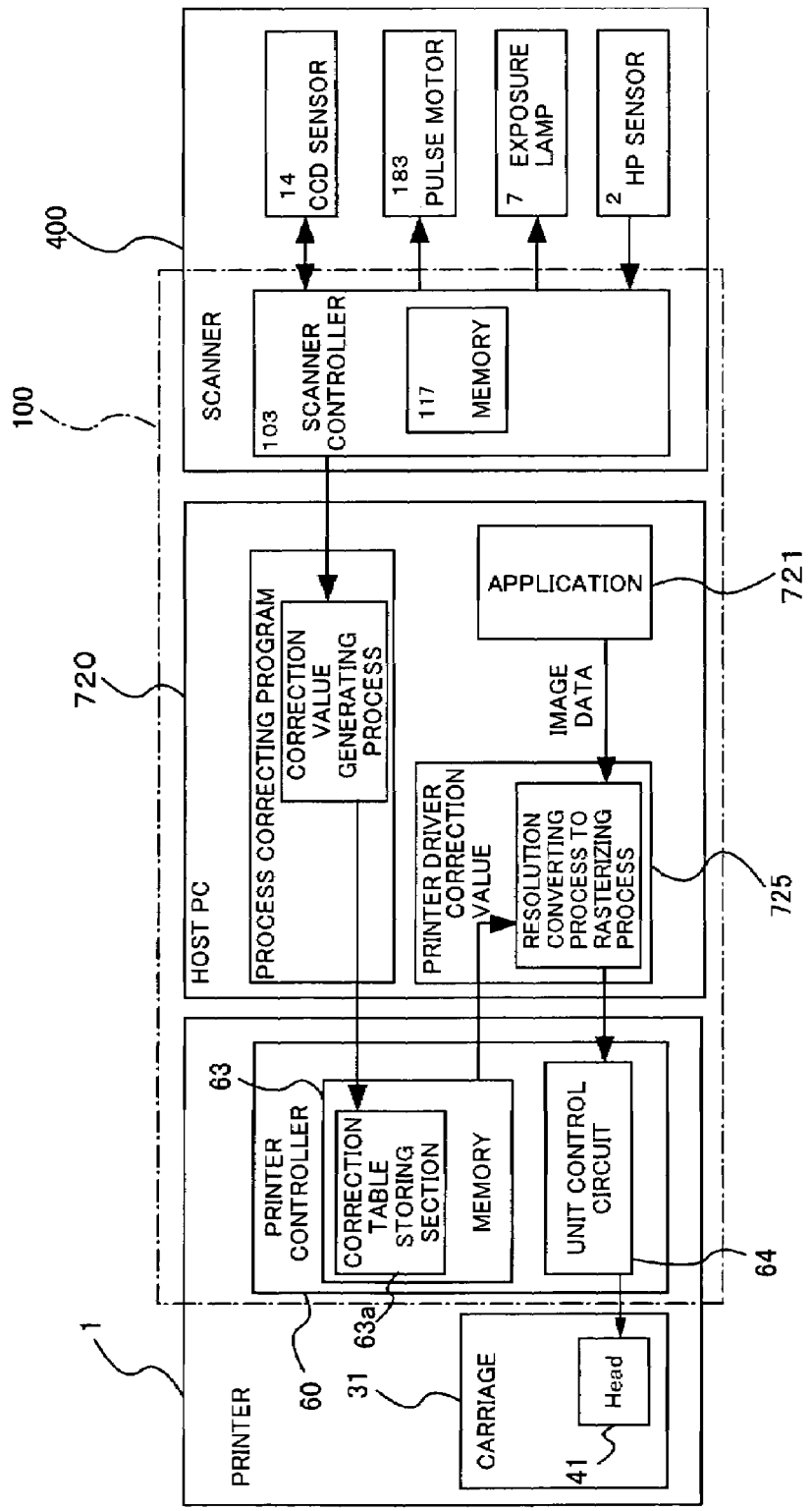
FIG. 2 is a block diagram for illustrating a main section of the printing system of the first embodiment.

FIG. 1 is an explanatory view showing an appearance configuration of the printing system. FIG. 2 is a block diagram for illustrating the main section of the printing system. A printing system 700 is provided with an inkjet printer 1 (hereinafter, referred to as "printer 1" in short) as a printing section, a scanner 400 as a reading section, a computer 720, a display device 704, an input device 708, and a recording and reproducing device 710. The printer 1 can print an image on a medium such as paper, cloth, or film. It should be noted that the following description is made using, as an example, paper S (see FIG. 5), which is a typical medium.

The computer 720 is communicably connected to the printer 1 and the scanner 400, has, for example, an application program and a printer driver 725 (see FIG. 10) installed on it, and outputs print data corresponding to an image to the printer 1 in order to let the printer 1 print the image. Furthermore, by operating an operating section provided in the scanner 400 and the computer 720, information of a document that has been read via the scanner 400 can be loaded into a memory inside the computer 720, and the loaded information can be processed.

A controller 100 of the first embodiment has the computer 720, a printer controller 60 that is provided in the printer 1, and a scanner controller 103 that is provided in the scanner 400, and they are connected to each other via interfaces.

The printer controller 60 is a controller for controlling the printer 1. This printer controller 60 is connected via an interface (not shown) to the computer 720, and has a CPU, a memory 63, and a unit control circuit 64 for controlling units that are provided in the printer 1. Furthermore, data is sent and received between the printer controller 60 and the computer 720, and the CPU controls units 20, 30, and 40 via the unit control circuit 64 in accordance with the program stored in the memory 63. The memory 63 is for securing, for example, areas for storing a program that is to be executed and work areas, has a storing section such as a RAM, an EEPROM, and a ROM, and stores correction values (described later) in a part of the area of the memory 63 in the first embodiment.

The scanner controller 103 is a controller for controlling the scanner 400. This scanner controller 103 is connected via an interface (not shown) to the computer 720, and has a memory 117 constituted by a CPU, an EEPROM, a RAM, or a program ROM, for example, a CCD drive control circuit for driving a CCD image sensor 14 that is provided in the scanner 400, a pulse motor drive control circuit for driving a pulse motor 183, and an exposure lamp control circuit for controlling an exposure lamp 7.

The CPU of the scanner controller 103 is electrically connected to each of the CCD drive control circuit, the pulse motor drive control circuit, and the exposure lamp control circuit, and controls the drive control circuits based on control signals from the computer 720.

The input device 708 is, for example, a keyboard 708A and a mouse 708B, and is used to operate the application program or to input settings of the printer driver 725 and the like. A flexible disk drive 710A and a CD-ROM drive 710B, for example, are used as the recording and reproducing device 710.

The printer driver 725 is a program for achieving the function of displaying, for example, a screen for setting the printing conditions on the display device 704, and also the function of converting image data that has been output from the application program into print data. The printer driver 725 is stored on a storage medium (computer-readable storage medium) such as a flexible disk or a CD-ROM. Furthermore, it is also possible to download the printer driver 725 via the Internet onto the computer 720. This program is constituted by codes for achieving various functions.

It should be noted that "the printing apparatus" was described as a printing system that is connected to a computer in this embodiment, but the printing apparatus may be a single printer 1, or may have a configuration in which the printer 1 is connected via a cable to the scanner 400 or may have a configuration in which the printer 1 and the scanner 400 are provided in a single casing, wherein the printer 1 and the scanner 400 are operated with a single controller.

===Configuration of the Scanner===

Figure 3:
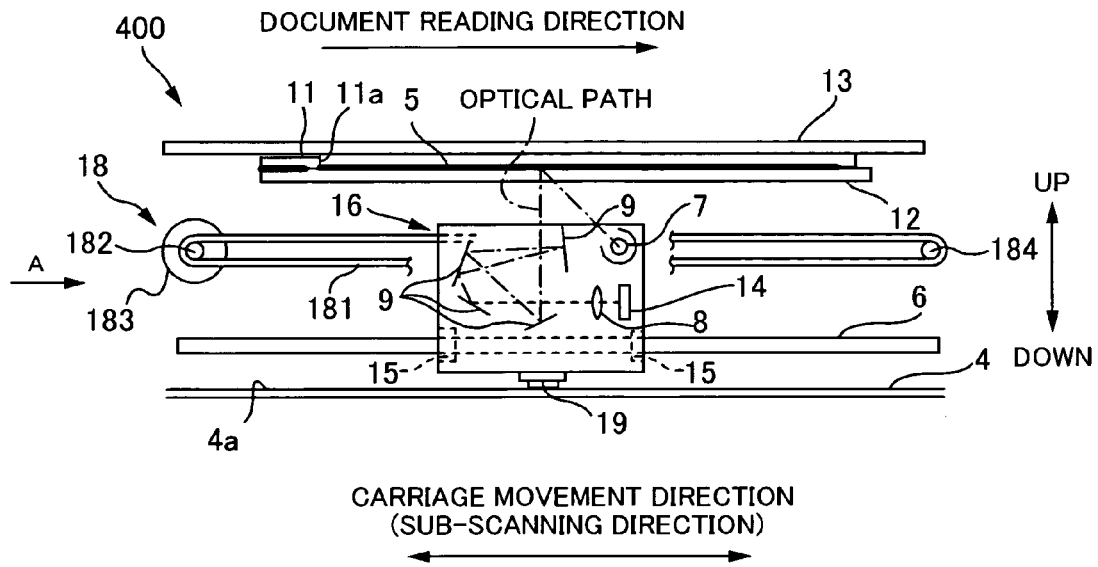
FIG. 3 is a front view for illustrating the configuration of a scanner of the first embodiment.
Figure 4:
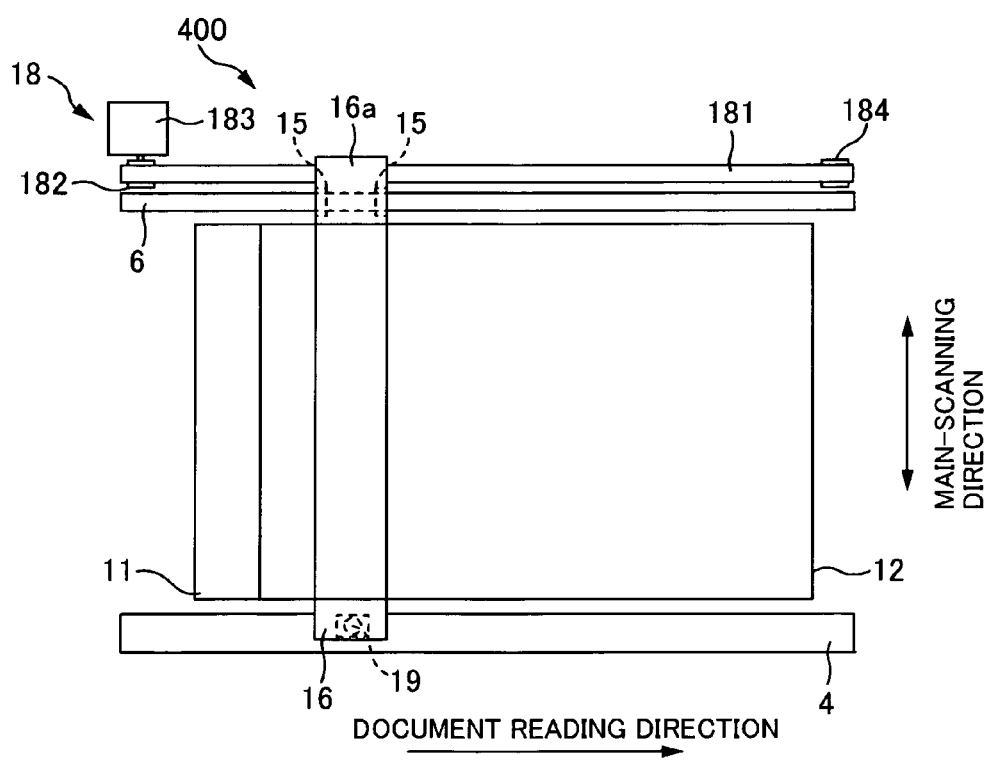
FIG. 4 is a plan view for illustrating the configuration of the scanner of the first embodiment.

FIG. 3 is a front view for illustrating the configuration of the scanner 400. FIG. 4 is a plan view for illustrating the configuration of the scanner 400. It should be noted that in FIG. 4, a document platen cover 13 has been removed for the sake of convenience.

The scanner 400 has a document platen glass 12 on which a document 5 is placed, the document platen cover 13 for pressing the reading surface of the document 5 that has been placed on the document platen glass 12 toward the document platen glass 12, a reading carriage 16 for driving along the document 5 while keeping a constant spacing between the reading carriage 16 and the document 5 in opposition thereto via the document platen glass 12, a drive section 18 for driving the reading carriage 16, a regulating guide 6 for regulating a movement direction of the reading carriage 16 to a predetermined direction, and a support rail 4 for supporting the reading carriage 16.

The reading carriage 16 has an exposure lamp 7 as a light source for irradiating light onto the document 5 via the document platen glass 12, a lens 8 for focusing the light reflected by the document 5, four mirrors 9 for guiding the light reflected by the document 5 to the lens 8, a CCD image sensor 14 for receiving the reflected light that has passed through the lens 8, and guide reception sections 15 that are engaged with the regulating guide 6.

The CCD image sensor 14 is constituted by a linear sensor in which photodiodes for converting a light signal into an electrical signal are arranged in a line. The CCD image sensor 14 is disposed in a direction (hereinafter, referred to as "main-scanning direction") that is substantially perpendicular to the movement direction (hereinafter, referred to as "sub-scanning direction") of the reading carriage 16, and each of the photodiodes detects the amount of light that is irradiated within a predetermined time.

The regulating guide 6 and the support rail 4 are arranged to have a spacing in the main-scanning direction such that a document reading area is interposed therebetween and their longitudinal directions are along the sub-scanning direction.

The regulating guide 6 is made of a stainless cylindrical material, and passes through the guide reception sections 15 that are made of thrust bearings provided at two locations on the end portion on one side in the main-scanning direction of the reading carriage 16. The guide reception sections 15 that are provided at two locations on the reading carriage 16 are arranged to have a spacing therebetween in the sub-scanning direction such that the reading carriage 16 stably performs scanning.

The support rail 4 has a support face 4a that is in parallel with the document platen glass 12, and the end portion, opposite to the guide reception sections 15, of the reading carriage 16 is placed on this support face 4a. More specifically, the CCD image sensor 14 of the reading carriage 16 is configured so as to be in parallel with the document platen glass 12 in a state where the CCD image sensor 14 is supported by the regulating guide 6 and the support rail 4.

The drive section 18 is provided with a ring-shaped timing belt 181 that is fixed on the reading carriage 16, and a pulley 182 that is meshed with the timing belt 181, and is constituted by the pulse motor 183 that is disposed on the end portion on one side in the sub-scanning direction, and an idler pulley 184 that is disposed on the end portion on the other side and applies the tensile force to the timing belt 181. Then, the reading carriage 16 moves along the regulating guide 6 when one end 16a in the main-scanning direction is fixed on the timing belt 181 and the ring-shaped timing belt 181 is carried by the pulse motor 183.

The pulse motor 183 is driven by the scanner controller 103 of the controller 100. A read image can be enlarged and reduced in the sub-scanning direction in accordance with the scanning speed of the reading carriage 16 that is changed in accordance with the speed of the pulse motor 183.

Furthermore, on the upstream side in a document reading direction, the scanner 400 has a home position sensor (hereinafter, referred to as "HP sensor") 2 for detecting that the reading carriage 16 has reached a reference position (hereinafter, referred to as "home position"). The HP sensor 2 is a transmission optical sensor. When light of the HP sensor 2 is blocked by a shading plate (not shown) that is projected from the reading carriage 16 while the reading carriage 16 is moved in a direction opposite to the document reading direction, it is detected that the reading carriage 16 has reached the home position. The position of the reading carriage 16 is controlled by the scanner controller 103, using the home position as the reference, based on the number of pulses given to the pulse motor, after being detected by the HP sensor 2, and the movement amount of the reading carriage 16 with one pulse.

A document regulating plate 11 against which the front end of the document 5 abuts is provided on the upstream side in the document reading direction using the reading carriage 16, on the upper face of the document platen glass 12, that is, a document placing face 12a. The position of a document abutting section 11a, of the document regulating plate 11, against which the document 5 abuts serves as a document reading starting position of the scanner 400, that is, a reference position for read data.

In the scanner 400, the reading carriage 16 is moved along the document 5 while irradiating the document 5 with light of the exposure lamp 7 and forming an image of the reflected light via the four mirrors 9 and the lens 8 on the CCD image sensor 14. At that time, an image for the distance over which the reading carriage 16 has moved within one period is loaded as line data by reading, in a predetermined period, a voltage value indicating the amount of light that has been received by the CCD image sensor 14.

===Configuration of the Printer===

<Regarding the Configuration of the Printer>

Figure 5:
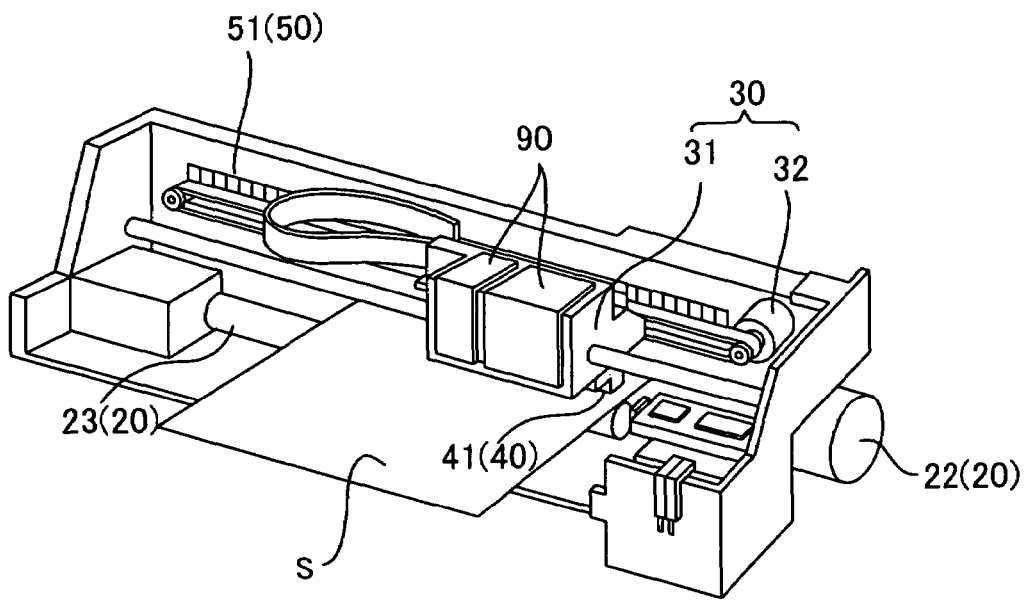
FIG. 5 is a schematic view of the overall configuration of a printer of the first embodiment.
Figure 5:
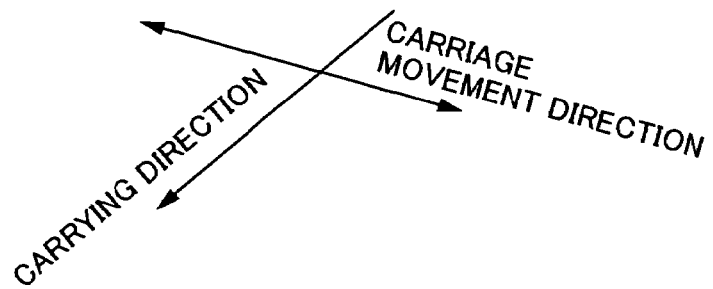
Figure 6:
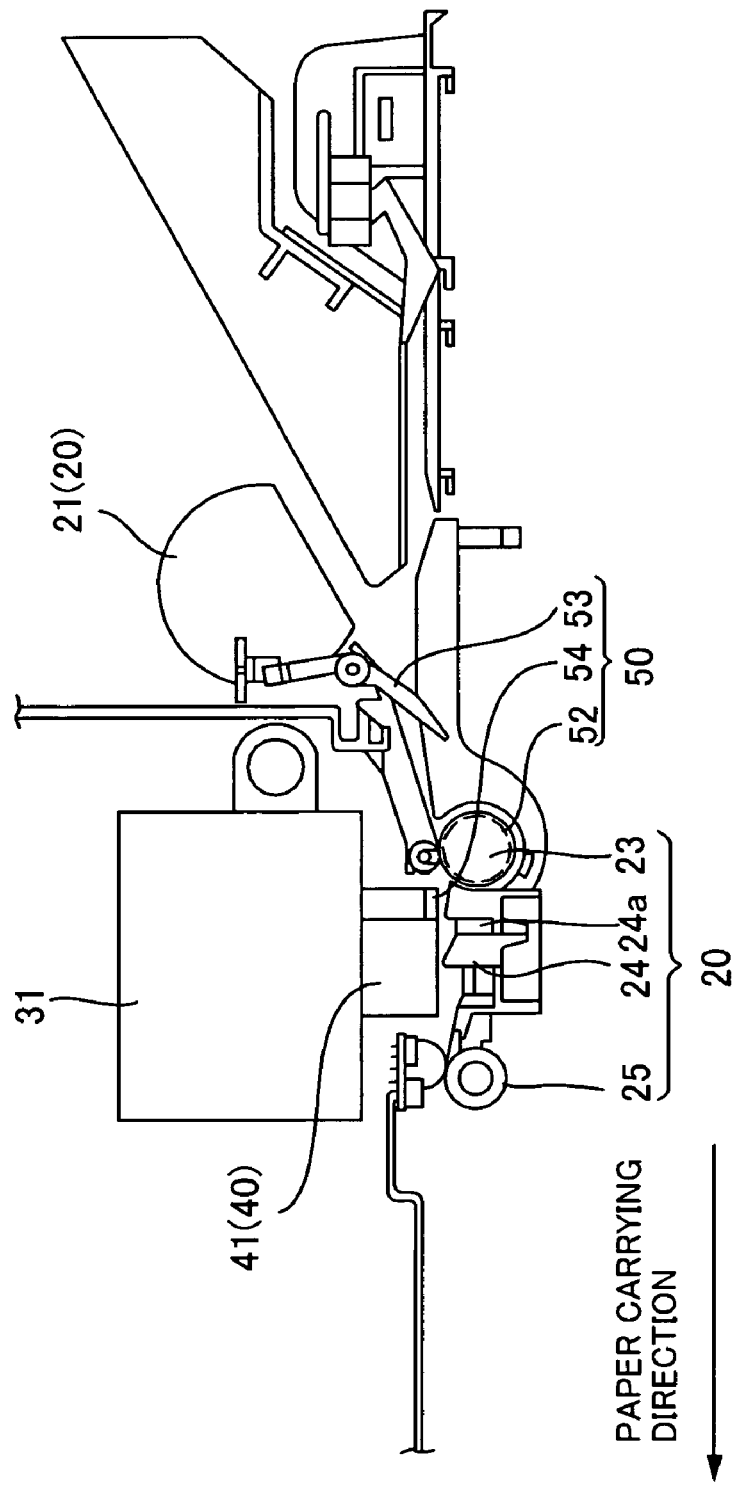
FIG. 6 is a side cross-sectional view of the overall configuration of the printer of the first embodiment.
Figure 7:
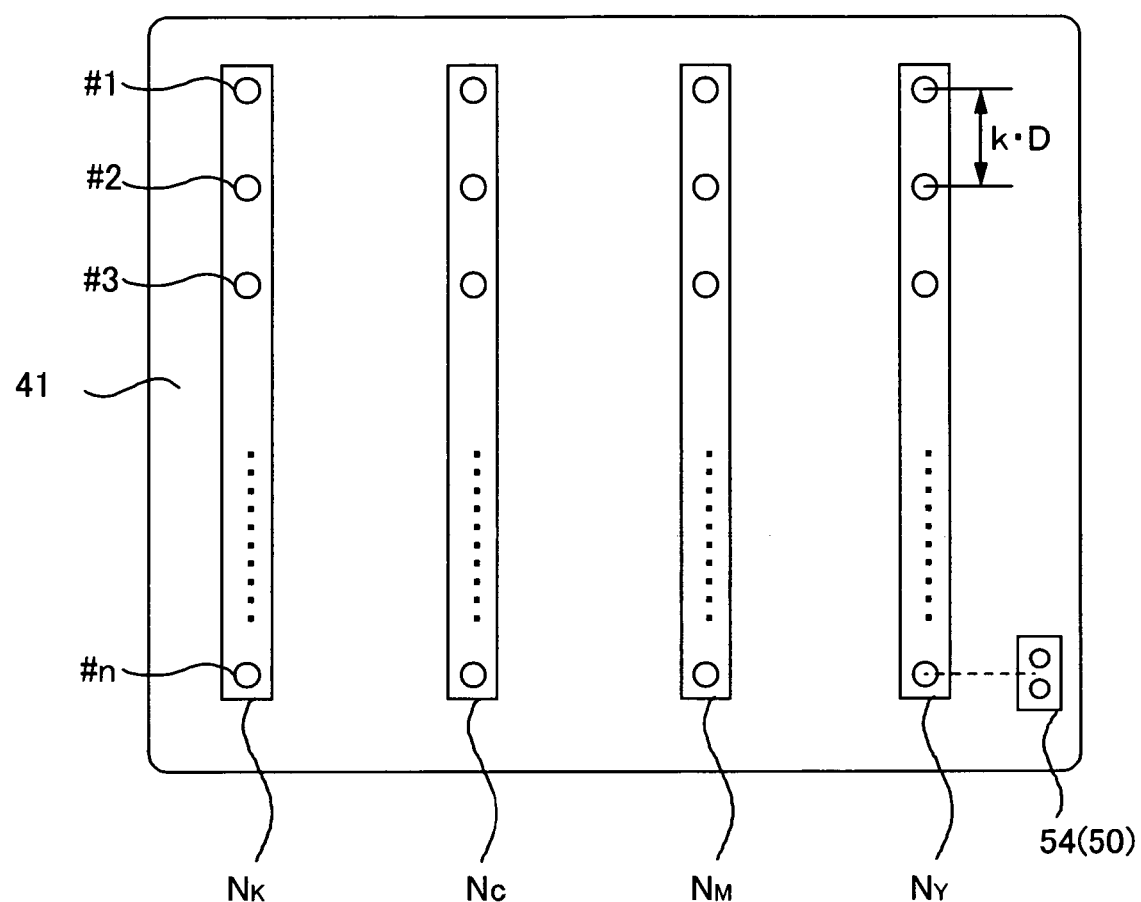
FIG. 7 is an explanatory diagram showing the arrangement of nozzles on a lower face of a head of the first embodiment.
Figure 7:
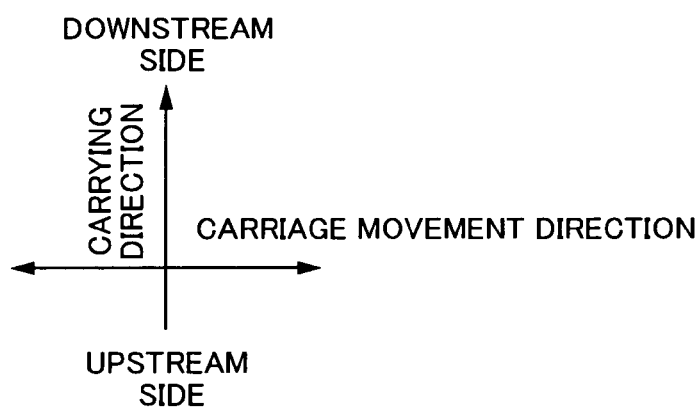

FIG. 5 is a schematic view of the overall configuration of the printer 1 of the first embodiment. FIG. 6 is a side cross-sectional view of the overall configuration of the printer 1 of the first embodiment. FIG. 7 is an explanatory diagram showing the arrangement of nozzles on the lower face of a head 41. The following is a description concerning the basic configuration of the printer 1 of the first embodiment with reference to these drawings.

The inkjet printer 1 of the first embodiment has the carry unit 20, the carriage unit 30, the head unit 40, a sensor 50, and the printer controller 60. The printer 1 that has received print data from the computer 720 that is an external device controls the units (the carry unit 20, the carriage unit 30, and the head unit 40) using the printer controller 60. The printer controller 60 controls the units based on the print data received from the computer 720 to print an image on the paper S. The sensor 50 monitors conditions inside the printer 1, and the detection result is output by the sensor 50 to the printer controller 60. The printer controller 60 controls the units based on the detection result that is output from the sensor 50, instruction signals of the computer 720 and the like.

The carry unit 20 functions as a carry mechanism for carrying the paper S and is for carrying the paper S to a printable position, and is also for carrying the paper S by a predetermined carrying amount in a predetermined direction (hereinafter, referred to as "carrying direction") during printing.

The carry unit 20 has a paper supply roller 21, a carry motor 22 (also referred to as "PF motor"), a carry roller 23, a platen 24, and a paper discharge roller 25. The paper supply roller 21 is a roller for supplying the paper S that has been inserted into a paper insert opening into the printer 1. The paper supply roller 21 has a D-shaped cross-section, and the length of its circumferential portion is set to be longer than the carry distance up to the carry roller 23. Therefore, it is possible to let the front end of the paper S reach the carry roller 23 by rotating the paper supply roller for one turn from a state in which the circumferential portion is away from the paper surface, thus carrying the paper S by the length of the circumferential portion. The carry motor 22 is a motor for carrying paper in the carrying direction, and is constituted by, for example, a DC motor. The carry roller 23 is a roller for carrying the paper S that has been supplied by the paper supply roller 21 up to a printable area, and is driven by the carry motor 22. The platen 24 supports the paper S that is being printed, from the rear face side of the paper S. The paper discharge roller 25 is a roller for carrying the paper S in the carrying direction, on the downstream side of the platen 24 in the carrying direction. The paper discharge roller 25 rotates in synchronization with the carry roller 23.

The carriage unit 30 is provided with a carriage 31 and a carriage motor 32 (hereinafter, also referred to as "CRmotor"). The carriage motor 32 is a motor for moving the carriage 31 back and forth in a predetermined direction (hereinafter, referred to as "carriage movement direction"), and is constituted by, for example, a DC motor. The carriage 31 detachably holds ink cartridges 90 containing ink. Furthermore, the head 41 for ejecting ink from the nozzles serving as ejection sections is attached to the carriage 31. Thus, when the carriage 31 moves back and forth, the head 41 and the nozzles also move back and forth in the carriage movement direction (movement direction).

The head unit 40 is for ejecting ink onto the paper S. The head unit 40 has the head 41. The head 41 has a plurality of nozzles, and ejects ink intermittently from each of the nozzles. When ink is intermittently ejected from the nozzles while the head 41 moves in the carriage movement direction, raster lines as dot rows are formed on the paper S along the carriage movement direction. The arrangement of the nozzles, the configuration of the head 41, the drive circuit for driving the head 41, and the method for driving the head 41 are described later.

The sensor 50 includes, for example, a linear encoder 51, a rotary encoder 52, a paper detection sensor 53, and a paper width sensor 54. The linear encoder 51 is for detecting the position in the carriage movement direction, and has a belt-shaped slit plate provided to extend in the carriage movement direction, and a photo interrupter that is attached to the carriage 31 and detects slits formed in the slit plate. The rotary encoder 52 is for detecting the rotation amount of the carry roller 23, and has a disk-shaped slit plate that rotates as the carry roller 23 rotates, and a photo interrupter for detecting slits formed in the slit plate.

The paper detection sensor 53 is for detecting the position of the front end of the paper S to be printed. The paper detection sensor 53 is provided at a position at which the position of the front end of the paper S can be detected, at a point midway in a process in which the paper supply roller 21 carries the paper S toward the carry roller 23. It should be noted that the paper detection sensor 53 is a mechanical sensor for detecting the front end of the paper S through a mechanical mechanism. More specifically, the paper detection sensor 53 has a lever that can rotate in the paper carrying direction, and this lever is disposed so as to project into the path over which the paper S is carried. As the paper S is carried, the front end of the paper is brought into contact with the lever and the lever is rotated. Therefore, the paper detection sensor 53 detects the position of the front end of the paper S and whether or not the paper S is present, by detecting the movement of this lever with the photo interrupter and other components.

The paper width sensor 54 is attached to the carriage 31. In the first embodiment, as shown in FIG. 7, it is attached to substantially the same position as the nozzles that are on the most upstream side with respect to the position in the carrying direction. The paper width sensor 54 is a reflective optical sensor, and receives, with a light-receiving section, the reflected light of the light that has been irradiated from a light-emitting section onto the paper S, and detects whether or not the paper S is present based on the intensity of the light that is received by the light-receiving section. The paper width sensor 54 detects the width of the paper S by detecting the positions of the end portions of the paper S while being moved by the carriage 31. Furthermore, the paper width sensor 54 also can detect the front end of the paper S depending on the conditions.

<Regarding the Arrangement of the Nozzles and the Configuration of the Head>

As shown in FIG. 7, a black ink nozzle row Nk, a cyan ink nozzle row Nc, a magenta ink nozzle row Nm, and a yellow ink nozzle row Ny are formed on the lower face of the head 41. Each of the nozzle rows is provided with n (for example, n=180) nozzles that are ejection openings for ejecting ink of the respective colors. The plurality of nozzles of each of the nozzle rows are arranged in a row at a constant spacing (nozzle pitch: k·D) in a direction that intersects the movement direction of the carriage 31, that is, in the carrying direction of the paper S. Herein, D is the minimum dot pitch in the carrying direction, that is, the spacing of dots formed on the paper S at the highest resolution. Also, k is an integer of 1 or more. For example, if the nozzle pitch is 180 dpi (1/180 inch) and the dot pitch in the carrying direction is 720 dpi (1/720 inch), then k=4. In the example shown in the diagram, the nozzles of each of the nozzle rows are assigned numbers (#1 to #n) that become smaller toward the nozzles on the downstream side. More specifically, the nozzle #1 is positioned on the downstream side of the nozzle #n in the carrying direction. When these nozzle rows are provided in the head 41, the range in which dots are formed in a single dot forming operation is widened, and thus it is possible to shorten the printing time. Furthermore, these nozzle rows are provided for the respective ink colors, and thus by ejecting ink as appropriate from each of these nozzle rows, it is possible to perform multicolor printing.

Furthermore, the nozzles have ink channels that are in communication with the ink cartridges 90 containing ink, and are provided with pressure compartments (not shown) midway in the ink channels. Each of the pressure compartments are configured such that their volume is constricted and expanded by, for example, piezo elements (not shown) as driving elements that are provided for letting ink droplets be ejected from each of the nozzles.

<Regarding the Driving of the Head>

Figure 8:
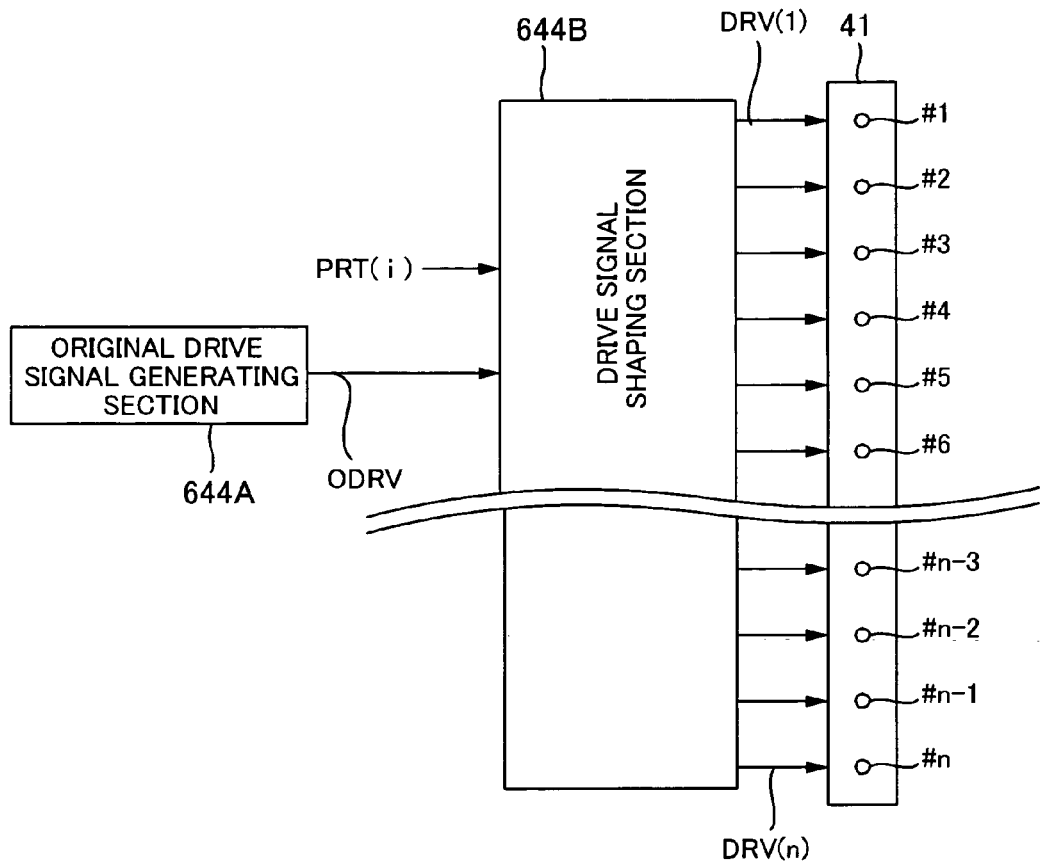
FIG. 8 is an explanatory diagram of a drive circuit of the head of the first embodiment.

FIG. 8 is an explanatory diagram of a drive circuit of the head 41. This drive circuit is provided within the unit control circuit 64 described above. As shown in the diagram, the drive circuit is provided with an original drive signal generating section 644A and a drive signal shaping section 644B. In the first embodiment, the drive circuit is provided for each of the nozzle rows, that is, for each of the nozzle rows of the colors black (K), cyan (C), magenta (M), and yellow (Y) such that the piezo elements are driven individually for each of the nozzle rows. The number in parentheses at the end of each signal name in the diagram indicates the number of the nozzle to which the signal is supplied.

The piezo element described above is deformed each time a drive pulse W1 or W2 (see FIG. 9) is supplied thereto, and thus the pressure on the ink within the pressure compartment is fluctuated. More specifically, when a voltage of a predetermined duration is applied between electrodes provided at both ends of the piezo element, the piezo element is deformed in accordance with the duration of voltage application and deforms an elastic membrane (side wall) partitioning a part of the pressure compartment. The volume of the pressure compartment changes as the piezo element is deformed, and due to this change in the volume of the pressure compartment, the pressure on the ink within the pressure compartment is fluctuated. Due to this fluctuation generated in the pressure on the ink, an ink droplet is ejected from the corresponding nozzle #1 to #n.

The original drive signal generating section 644A generates an original drive signal ODRV that is used in common by each of the nozzles #1 to #n. The original drive signal ODRV in the first embodiment is a signal in which two types of drive pulses W1 and W2 are output once during the time in which the carriage 31 moves over the distance of one unit area corresponding to the print resolution.

A print signal PRT(i) is input together with the original drive signal ODRV from the original drive signal generating section to the drive signal shaping section 644B. The print signal PRT(i) is a signal whose level changes based on the two-bit print data described above. The drive signal shaping section 644B shapes the original drive signal ODRV in accordance with the level of the print signal PRT(i) and outputs the original drive signal ODRV toward the piezo element of each of the nozzles #1 to #n as a drive signal DRV(i). The piezo element of each of the nozzles #1 to #n is driven based on the drive signal DRV from the drive signal shaping section 644B.

<Regarding the Drive Signals of the Head>

Figure 9:
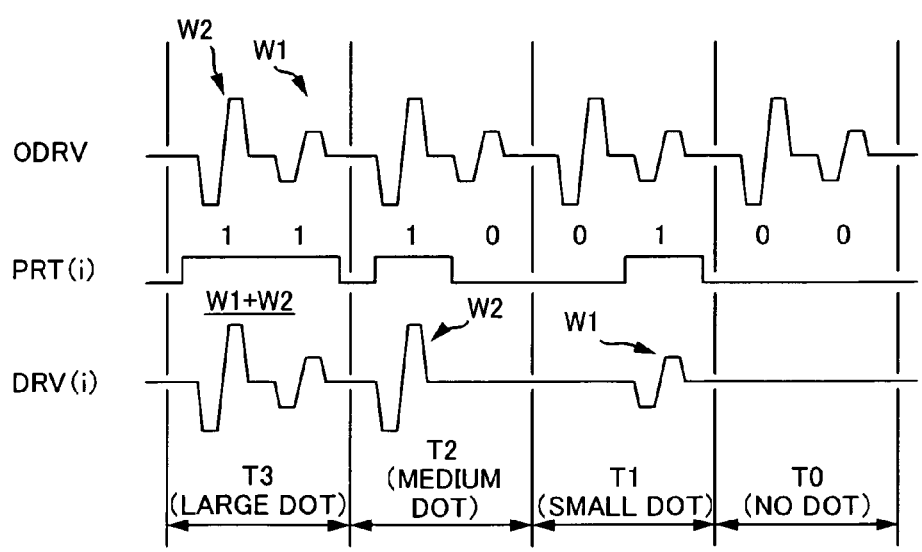
FIG. 9 is a timing chart illustrating signals of the first embodiment.

FIG. 9 is a timing chart illustrating the signals. More specifically, FIG. 9 shows a timing chart of each of the signals, namely the original drive signal ODRV, the print signal PRT (i), and the drive signal DRV(i).

The original drive signal ODRV is a signal that is used in common for the nozzles #1 to #n, and is output from the original drive signal generating section 644A to the drive signal shaping section 644B. The original drive signal ODRV of the first embodiment has two pulses, that is, a first pulse W1 and a second pulse W2, during the time (hereinafter, referred to as "one unit area period") in which the carriage 31 moves over the distance of one unit area corresponding to the print resolution. Furthermore, the first pulse W1 is a drive pulse for letting an ink droplet of a small size (hereinafter, referred to as "small ink droplet") be ejected from the nozzle. The second pulse W2 is a drive pulse for letting an ink droplet of a medium size (hereinafter, referred to as "medium ink droplet") be ejected from the nozzle. In other words, when the first pulse W1 is supplied to the piezo element, a small ink droplet is ejected from the nozzle. Then, when this small ink droplet lands on the paper S, a dot of small size (small dot) is formed. In a similar manner, when the second pulse W2 is supplied to the piezo element, a medium ink droplet is ejected from the nozzle. Then, when this medium ink droplet lands on the paper S, a dot of medium size (medium dot) is formed.

The print signal PRT (i) is a signal corresponding to each unit area data that is allocated to each unit area in the print data that has been transferred from the computer and the like. More specifically, the print signal PRT(i) is a signal corresponding to unit area data included in the print data. The print data PRT (i) of the first embodiment is a signal having two-bit information with respect to one unit area. It should be noted that the drive signal shaping section 644B shapes the original drive signal ODRV in accordance with the signal level of the print signal PRT (i), and outputs the drive signal DRV(i).

The drive signal DRV is a signal that is obtained by blocking the original drive signal ODRV in accordance with the level of the print signal PRT. More specifically, if the print data is "1", then the print signal PRT becomes high level, and the drive signal shaping section 644B allows the drive pulse corresponding to the original drive signal ODRV to pass without any processing and sets it as the drive signal DRV(i). On the other hand, if the print data is "0", then the print signal PRT becomes low level, and the drive signal shaping section 644B blocks the drive pulse corresponding to the original drive signal ODRV. Then, the drive signal DRV(i) from the drive signal shaping section 644B is individually supplied to the corresponding piezo element. The piezo element is driven in accordance with the supplied drive signal DRV(i).

When the print signal PRT (i) corresponds to two-bit data "01", then only the first pulse W1 is output in the first half of one unit area period. Accordingly, a small ink droplet is ejected from the nozzle, and thus a small dot is formed on the paper S. When the print signal PRT(i) corresponds to two-bit data "10", then only the second pulse W2 is output in the second half of one unit area period. Accordingly, a medium ink droplet is ejected from the nozzle, and thus a medium dot is formed on the paper S. When the print signal PRT(i) corresponds to two-bit data "11", then both the first pulse W1 and the second pulse W2 are output in one unit area period. Accordingly, a small ink droplet and a medium ink droplet are successively ejected from the nozzle, and thus a dot of a large size (large dot) is formed on the paper S. In other words, the printer 1 can form dots of a plurality of sizes (three sizes in this embodiment). Furthermore, when the print signal PRT(i) corresponds to two-bit data "00", then neither the first pulse W1 nor the second pulse W2 is output in one unit area period. Accordingly, no ink droplet of any size is ejected from the nozzle, and thus no dot is formed on the paper S.

As described above, the drive signal DRV(i) in one unit area period has been shaped so as to have four different waveforms corresponding to the four different values of the print signal PRT(i).

===Printer Driver===

<Regarding the Printer Driver>

Figure 10:
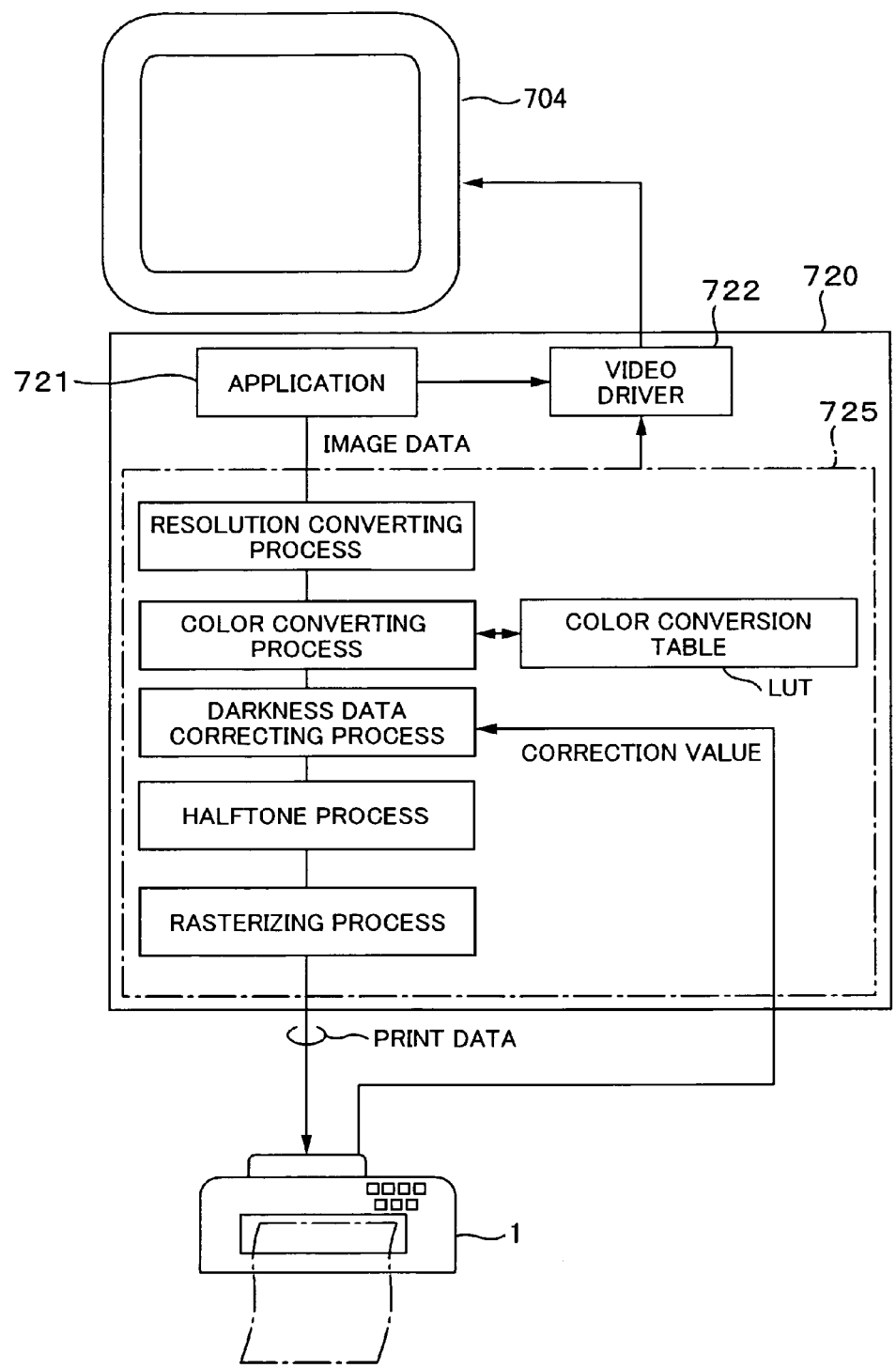
FIG. 10 is a schematic explanatory diagram of a basic process performed by a printer driver in the first embodiment.

FIG. 10 is a schematic explanatory diagram of a basic process performed by the printer driver 725. It should be noted that structural elements that have already been described are assigned identical reference numerals and are not further explained.

On the computer 720, computer programs such as a video driver 722, an application program 721, and the printer driver 725 operate under an operating system installed on the computer 720.

The video driver 722 has the function of displaying a predetermined screen on the display device 704 in accordance with display commands from the application program 721 and the printer driver 725.

The application program 721 has, for example, the function of editing an image or the like, and is a program for creating data (image data) relating to an image. A user can give an instruction to print an image edited by the application program 721, via a user interface of the application program 721. When the print instruction is received, the image data is output by the application program 721 to the printer driver 725, for example.

The printer driver 725 receives the image data from the application program 721, converts the received image data into print data that can be printed, and outputs the converted print data to the printer 1. The image data has unit area data as data corresponding to each unit area of the image to be printed. Each unit area data is expressed by a gradation value for each of the colors such as RGB or CMYK. The gradation value, for example, is converted in accordance with the stages of processes described later, and is ultimately converted into print data (data such as the color and the size of a dot) corresponding to a dot to be formed on paper, at the stage of the print data. Herein, the gradation value corresponding to each unit area indicated by the image data indicates that each of the unit area has the darkness that is set at the gradation value. For example, if printing is performed using black ink, then the setting is such that the gradation value indicating the darkness 0 (white color) is "0", and the gradation value indicating the darkness 100% (black color) is "255".

Print data is data in a format that can be interpreted by the printer 1, and is data that has the unit area data and various types of command data. The command data is data for instructing the printer 1 to perform a specific operation, and is data indicating, for example, the carrying amount.

The printer driver 725 performs, for example, a resolution converting process, a color converting process, an image data correcting process, a halftone process, and a rasterizing process in order to convert the image data that has been output from the application program 721 or the image data that has been read by the scanner 400 into print data. The following is a description concerning the various processes performed by the printer driver 725.

The resolution converting process is a process for converting image data (such as text data and image data) that has been output from the application program 721 into the resolution (spacing between dots when printing; also referred to as "print resolution") when an image is printed on the paper S. For example, if the print resolution is specified as 720×720 dpi, then the image data that has been received from the application program 721 is converted into image data having a resolution of 720×720 dpi.

The conversion method includes interpolation and thinning out of unit area data. For example, if the resolution of the image data is lower than the specified print resolution, then linear interpolation, for example, is performed so that new unit area data is created between adjacent unit area data. On the other hand, if the resolution of the image data is higher than the print resolution, then the unit area data is thinned out at a constant ratio, for example, so that the resolution of the image data becomes equal to the print resolution.

Furthermore, in the resolution converting process, the size adjustment is also performed in which the image data is processed so as to correspond to the size of a print area (referring to an area onto which ink is actually ejected) to be printed.

It should be noted that the unit area data in the image data that has been output from the application program 721 represents gradation values of multiple grades (such as 256 grades) expressed in RGB color space. Hereinafter, the unit area data indicating RGB gradation values is referred to as "RGB unit area data", and the image data constituted by the RGB unit area data is referred to as "RGB image data".

The color converting process is a process for converting RGB unit area data of RGB image data into data indicating gradation values of multiple grades (such as 256 grades) expressed in CMYK color space. Herein, C, M, Y and K are colors of ink provided in the printer 1. More specifically, C stands for cyan, M stands for magenta, Y stands for yellow, and K stands for black, respectively. Hereinafter, the unit area data indicating CMYK gradation values is referred to as "CMYK unit area data", and the image data constituted by the CMYK unit area data is referred to as "CMYK image data". The color converting process is performed by the printer driver 725 referring to a table (color conversion lookup table LUT) in which RGB gradation values are associated with CMYK gradation values.

The image data correcting process is a process that is performed for each row area in order to suppress darkness non-uniformity between row areas in an image printed in multiple colors. The image data correcting process is described later in detail.

The halftone process is a process for converting CMYK unit area data having gradation values of multiple grades into CMYK unit area data having gradation values of a few grades that can be expressed by the printer 1. For example, with the halftone process, CMYK unit area data indicating gradation values of 256 grades is converted into two-bit CMYK unit area data indicating gradation values of four grades. The two-bit CMYK unit area data is data that indicates, for each color, "no dot formation" (binary value "00"), "small dot formation" (binary value "01"), "medium dot formation" (binary value "10"), and "large dot formation" (binary value "11"), for example.

As the halftone process, for example, dithering is used to create two-bit CMYK unit area data with which the printer 1 can form dispersed dots. Furthermore, the method used for the halftone process is not limited to dithering, and it is also possible to use, for example, γ-correction or error diffusion.

The rasterizing process is a process for rearranging the CMYK image data on which the halftone process has been performed into the data order in which it is to be transferred to the printer 1. Data on which the rasterizing process has been performed is output to the printer 1 as the print data described above.

It should be noted that the processes of the printer driver 725 can be performed on the image data that has been read by the scanner 400, and for example, it is possible to create print data by performing the resolution converting process, the color converting process, the image data correcting process, the halftone process, and the rasterizing process on image data having RGB components read by the scanner 400, and to print an image on paper and others with the printer 1 based on the image data read by the scanner 400.

===Regarding the Printing Operation===

Figure 11:
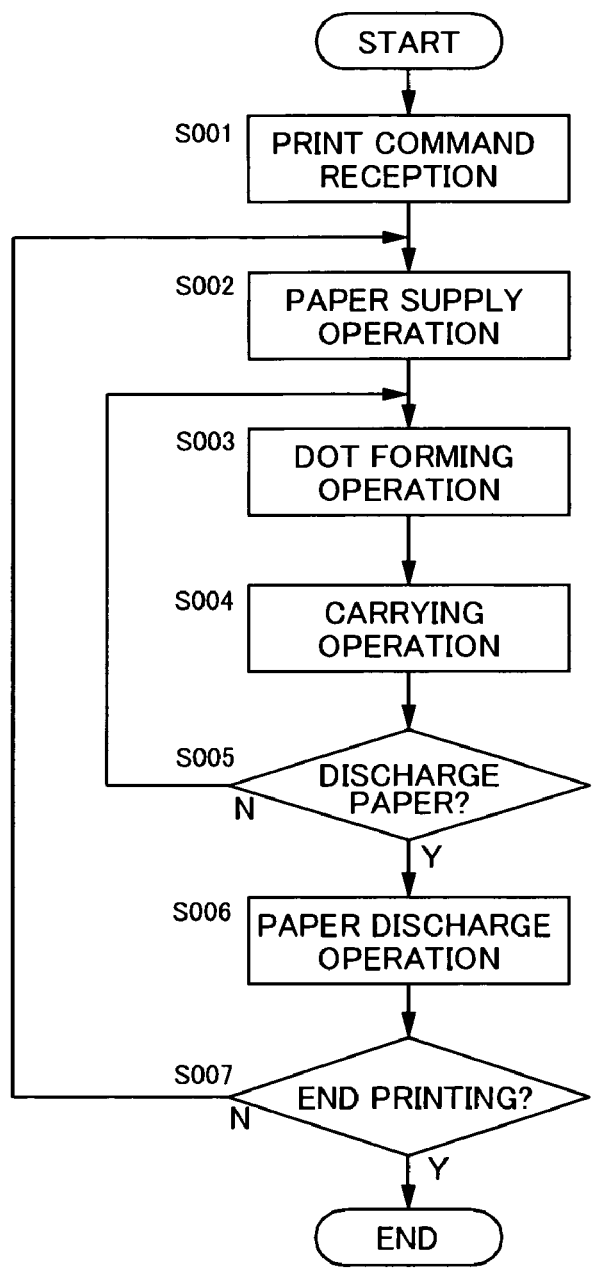
FIG. 11 is a flowchart of operations during printing in the first embodiment.

FIG. 11 is a flowchart of operations during printing. Each of the operations described below are performed by the printer controller 60 controlling each of the units in accordance with the program stored in the memory. This program has codes for performing each of the operations.

Receive print command (S001): The printer controller 60 receives a print command via an interface from the computer 720. This print command is included in the header of the print data sent from the computer 720. The printer controller 60 analyzes the content of various commands included in the received print data and performs a paper supply operation, a carrying operation, and a dot forming operation described below using each of the units.

Paper supply operation (S002): The printer controller 60 performs the paper supply operation. "Paper supply operation" refers to a process for moving the paper S that is to be printed so as to be positioned at a print starting position (so-called print start position). In other words, the printer controller 60 sends the paper S to be printed up to the carry roller 23 by rotating the paper supply roller 21. Subsequently, the printer controller 60 positions the paper S that has been sent from the paper supply roller 21 at the print starting position by rotating the carry roller 23. It should be noted that when the paper S is positioned at the print starting position, at least some of the nozzles of the head 41 are opposed to the paper S.

Dot forming operation (S003): The printer controller 60 performs the dot forming operation. "Dot forming operation" refers to an operation in which dots are formed on the paper S by letting ink be intermittently ejected from the head 41 moving in the carriage movement direction. At that time, the printer controller 60 moves the carriage 31 in the carriage movement direction by driving the carriage motor 32. Furthermore, the printer controller 60 lets ink be ejected from the head 41 based on the print data while the carriage 31 moves. When ink ejected from the head 41 lands on the paper S, dots are formed on the paper S as described above. At that time, if ink is ejected from the nozzles while the carriage 31 is moved, then raster lines in the movement direction are formed on the paper S.

Carrying operation (S004): The printer controller 60 performs the carrying operation. "Carrying operation" refers to a process for moving the paper S relative to the head 41 in the carrying direction. The printer controller 60 carries the paper S in the carrying direction by driving the carry motor 22 and thus rotating the carry roller 23. Through this carrying operation, the head 41 can form dots at a position different from the position of dots that have been already formed in the dot forming operation described above.

Paper discharge determination (S005): The printer controller 60 determines whether or not to discharge the paper S that is being printed. In this determination, if there is data left to be printed on the paper S that is being printed, then the paper is not discharged. Then, the printer controller 60 repeats in alternation the dot forming operation and the carrying operation until there is no data to be printed, gradually printing an image that is constituted by dots on the paper S. If there is no data left to be printed on the paper S that is being printed, then the printer controller 60 discharges the paper S. More specifically, the printer controller 60 discharges the printed paper S to the outside by rotating the paper discharge roller 25. It should be noted that it is possible to determine whether or not to discharge the paper based on a paper discharge command included in the print data.

Print ending determination (S007): The printer controller 60 determines whether or not to continue the printing. If there is a following paper S to be printed, then new paper is supplied in the paper supply operation (S002) to continue the printing, and thus the printing is continued. If there is no following paper S to be printed, then the printing operation is ended.

===Regarding the Cause of Darkness Non-uniformity in an Image===

Darkness non-uniformity that occurs in an image printed in multiple colors using CMYK inks is basically caused by darkness non-uniformity that occurs in each of those ink colors. Thus, darkness non-uniformity in a multicolor printed image is suppressed by suppressing darkness non-uniformity in each of the ink colors separately.

Figure 12:
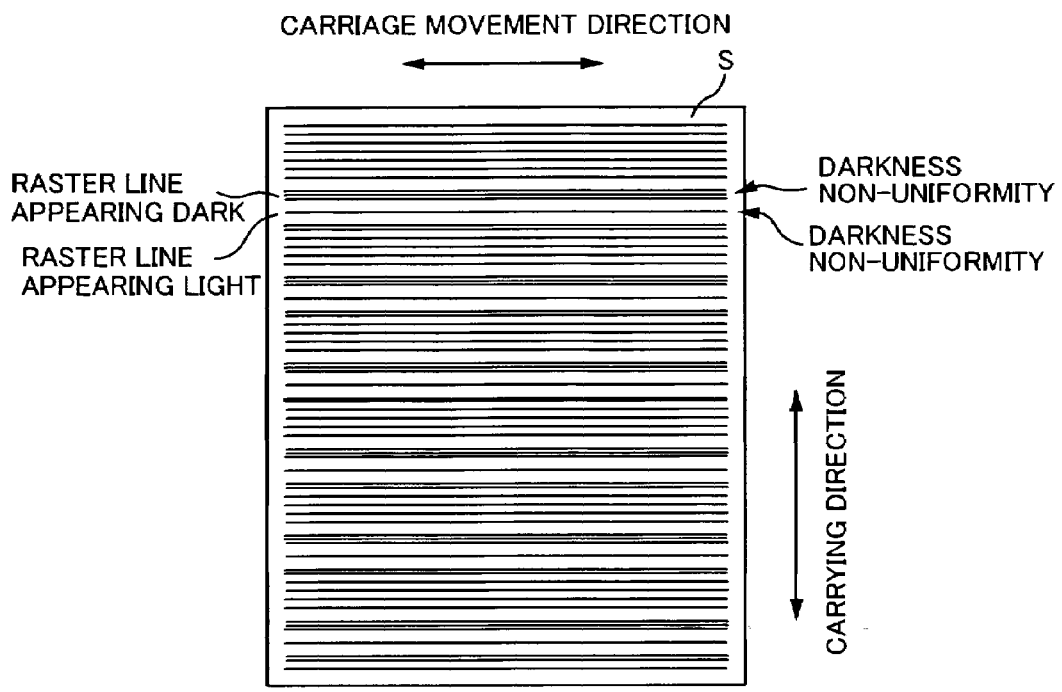
FIG. 12 is a diagram for illustrating darkness non-uniformity that occurs in the carrying direction of paper S in a monochrome printed image.

Accordingly, the following is a description concerning the cause of darkness non-uniformity that occurs in a monochrome printed image with ink of any one of the colors. FIG. 12 is a diagram for illustrating darkness non-uniformity that occurs in a monochrome printed image in the carrying direction of the paper S.

The darkness non-uniformity in the carrying direction shown as an example in FIG. 12 appears as horizontal stripes that are in parallel with the carriage movement direction. The darkness non-uniformity in the shape of such horizontal stripes is caused by, for example, unevenness in the ink ejection amount from nozzle to nozzle, but it is also caused by unevenness in the processing precision of the nozzles. More specifically, when the processing precision of the nozzles is uneven, the direction in which ink that is ejected from the nozzles fly becomes uneven. When the flying direction is uneven, the dot formation positions with ink that lands on the paper S may be displaced in the carrying direction with respect to the target formation positions. In this case, the formation positions of raster lines that are constituted by the dots are inevitably displaced from the target formation positions with respect to the carrying direction. Thus, the spacing between adjacent raster lines in the carrying direction becomes periodically wider or narrower. When viewed macroscopically, this state appears as darkness non-uniformity in the shape of horizontal stripes. More specifically, when the spacing between adjacent raster lines becomes relatively wider or narrower, a row area appears macroscopically darker if dots or a part of dots more than dots that are originally to be formed are formed in the row area, and a row area appears macroscopically lighter if dots or a part of dots that are originally to be formed in the row area are formed in an adjacent row area. Herein, the raster lines are dot rows that are formed in the carriage movement direction by letting ink be intermittently ejected while the carriage 31 is moved.

It should be noted that the cause of the darkness non-uniformity is also applied to other ink colors. If even one color of CMYK has this tendency, then darkness non-uniformity appears in an image printed in multiple colors.

===Regarding the Image Printing Method According to the First Embodiment===

Figure 13:
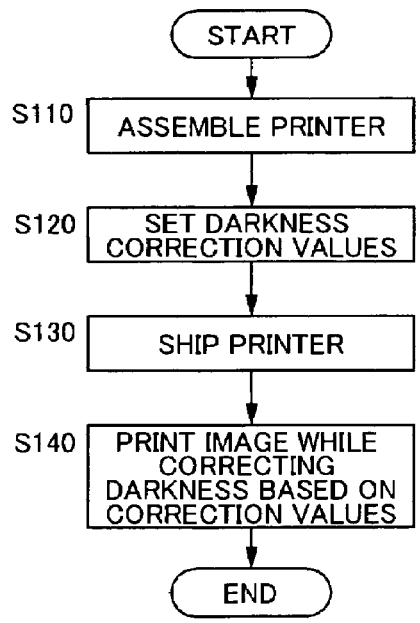
FIG. 13 is a flowchart showing the flow of, for example, steps relating to an image printing method according to the first embodiment.

FIG. 13 is a flowchart showing the flow of, for example, steps relating to an image printing method according to the first embodiment. The following is an outlined description concerning the steps with reference to this flowchart. First, the printer 1 is assembled on the manufacturing line (S110). Next, correction values that are associated with some specific darknesses and that serve as adjustment information for correcting the darkness for each of the row areas are set, and a process that is stored in the printer 1 is performed by, for example, an operator in charge of the inspection (S120). The correction values are values that are set for the row areas in which raster lines are formed in order to correct gradation values associated with each of the unit areas and supplied as data of an image to be printed.

In the first embodiment, a correction pattern having sub patterns that are printed based on the gradation values associated with five types of specific darknesses is printed for each ink color, the darknesses of the row areas in which raster lines constituting the sub patterns of the printed correction pattern are each detected, the average value of the darkness detected for each of the row areas is calculated, and the darkness non-uniformity between the row areas is suppressed by correcting the gradation values of the image data using, as the target darkness, the calculated average value of the darkness so that the darknesses of the row areas achieve the target darkness. For this reason, first, the correction values for correcting the gradation values indicating some specific darknesses among the five types of specific darknesses are obtained. More specifically, in the correction patterns, only the specific darknesses are printed, and correction values associated with any one specific darkness of the printed specific darknesses are obtained based on read darkness data obtained by reading the darknesses of the correction patterns that have been actually printed. Then, as for darknesses other than the specific darknesses associated with the correction values, the gradation values after the correction associated with the darknesses are obtained by performing linear interpolation on the gradation values after the correction of the specific darknesses obtained based on the correction values.

Next, the printer 1 is shipped (S130). Then, a user who has purchased this printer 1 performs actual printing of an image. At the time of actual printing, the printer 1 corrects the darkness of image data based on the correction values for the stored row areas, and prints the image on the paper S based on the corrected image data (S140). Herein, "actual printing" refers to printing of a desired image such as natural images performed by the user, in contrast to printing of a predetermined test pattern such as a correction pattern and the like. The setting (Step S120) of the correction values according to the first embodiment is described in detail.

<Step S120: Setting of the Correction Values for Suppressing Darkness Non-Uniformity>

Figure 14:
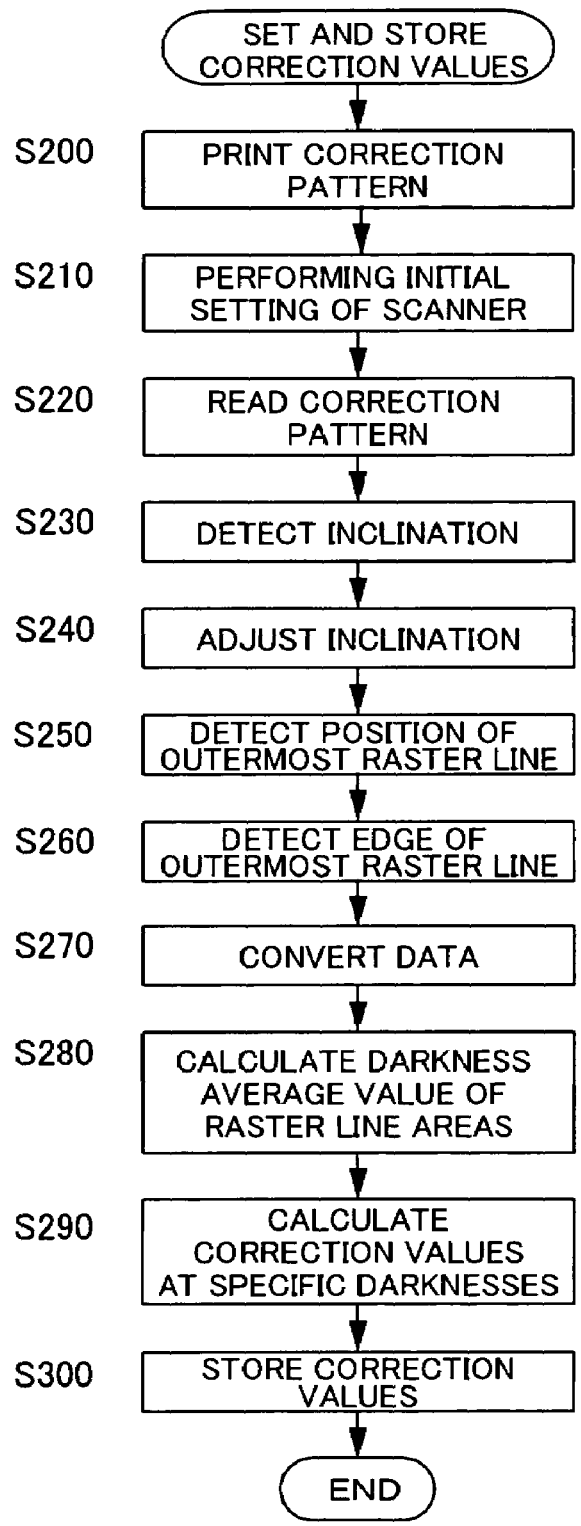
FIG. 14 is a flowchart showing the procedure of a process for setting correction values in the first embodiment.

FIG. 14 is a flowchart showing the procedure of a process for setting correction values. The following is a description concerning the procedure for setting correction values with reference to this flowchart.

The method for setting correction values includes a step (S200) of printing the correction pattern CP as an adjustment pattern using a printer for which the correction values are to be set, a step (S210) of performing the initial setting of a scanner for reading the correction pattern, a step (S220) of reading the printed correction pattern CP, a step (S230) of detecting the inclination of the read data, a step (S240) of adjusting the inclination of the read data, a step (S250) of detecting the positions of raster lines at the outermost (outermost raster lines) in a desired area in the data whose inclination has been adjusted, a step (S260) of detecting the edges of the correction pattern in the sub-scanning direction, a step (S270) of converting the data in order to associate the row areas with the data corresponding to data between the detected outermost raster lines, a step (S280) of calculating the average values of the darknesses of the row areas based on the converted data, a step (S290) of calculating correction values of the specific darknesses based on the calculated average values of the darknesses, and a step (S300) of storing the calculated correction values in the memory. The following is a description concerning each of the steps. In the first embodiment, the specific gradation values indicating the specific darknesses that are printed as the correction pattern are set to be, for example, five types of gradation values corresponding to darknesses of 10%, 30%, 50%, 70%, and 100%. Herein, the darkness range that can be set is from a darkness of 0 to a darkness of 100%, and the gradation value corresponding to a darkness of 0 is the lowest value "0", and the gradation value corresponding to a darkness of 100% is the highest value "255".

(1) Step S200: Printing of the Correction Pattern CP

In step S200, the correction pattern CP is printed on the paper S for each ink color. Herein, an operator in charge of the inspection and the like communicably connects the printer 1 to the computer 720 installed on the inspection line, and prints the correction pattern CP using this printer 1. In other words, the operator performs an operation in which the correction pattern CP is printed, via a user interface of the computer 720. Through this operation, the print data, of the correction pattern CP, that is stored in the memory is output by the computer 720 to the printer 1. The printer 1 prints the correction pattern CP on the paper S based on the print data. It should be noted that the printer 1 printing the correction pattern CP is the printer 1 for which the correction values are to be set. In other words, the correction values are set for each printer 1.

<<Correction Pattern>>

Figure 15:
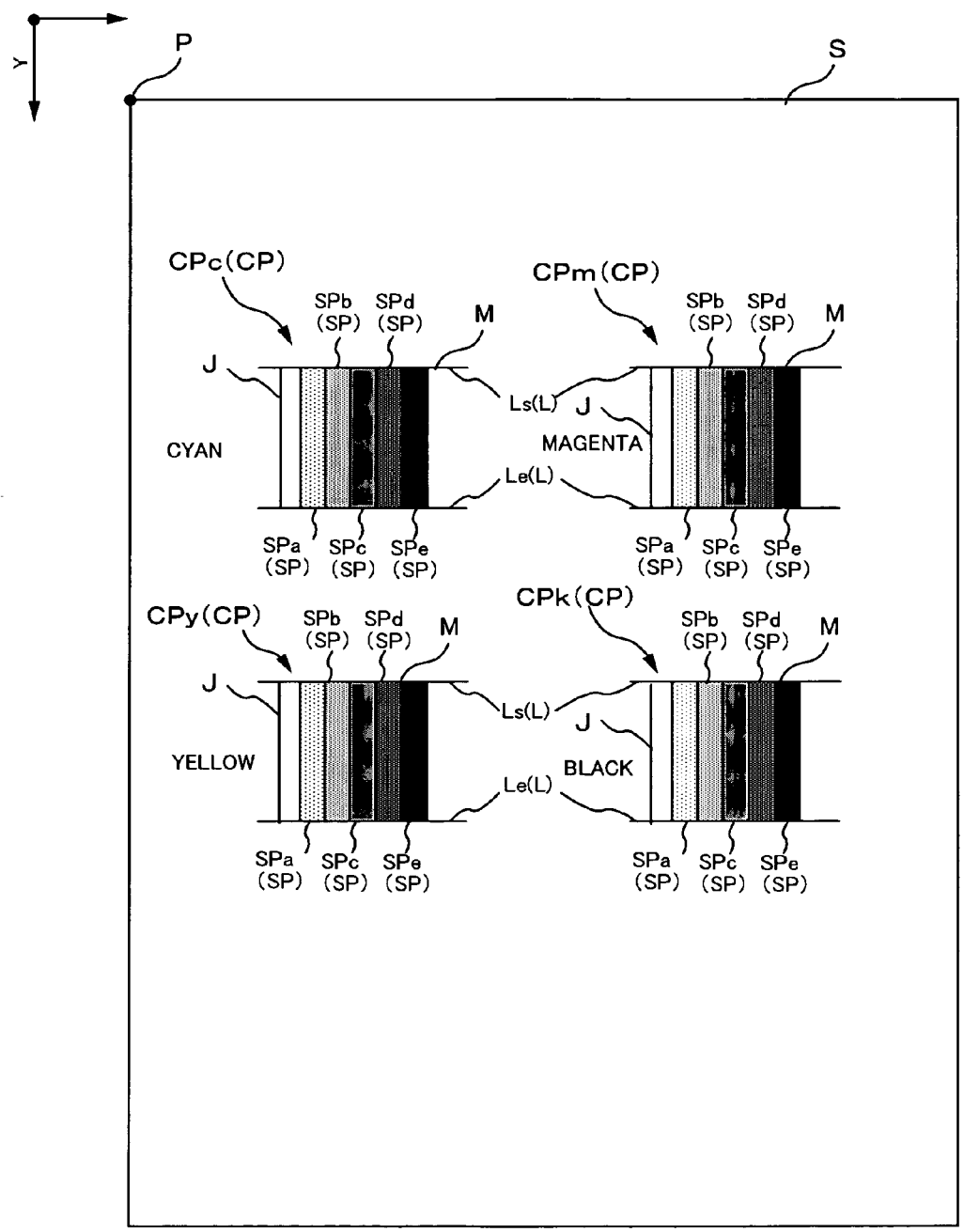
FIG. 15 is a diagram for illustrating one example of correction patterns CP that have been printed in the first embodiment.

FIG. 15 is a diagram for illustrating one example of the correction patterns CP that have been printed. As shown in the diagram, four correction patterns CP for the respective colors are printed on one sheet of paper in the first embodiment. Each of the correction patterns CP has a plurality of sub patterns SP whose darknesses are different from each other, and is printed for each ink color. In this example, the sub patterns SP are printed respectively based on the specific gradation values indicating the five types of specific darknesses described above for each ink color.

The print data for printing each of the sub patterns SP of the correction patterns CP are print data that is created when the C=image data is considered in which specific gradation values corresponding to the respective darknesses are allocated to all virtual areas for forming one dot on paper, that is, unit areas, and the halftone process and the rasterizing process have been performed on the considered CMYK image data using the printer driver. Thus, the print data, of the correction patterns CP, that is stored in the memory is set such that, when the band-shaped sub patterns SP are each printed with an ideal printer based on the gradation values indicating the respective darknesses, then they are each printed with uniform darkness. More specifically, each of the sub patterns SP that are printed with an ideal printer are each printed at a substantially constant darkness along the carrying direction. Herein, "ideal printer" refers to a printer that is processed and manufactured as designed and with which dots are formed at the target positions by ink droplets ejected from the nozzles. In FIG. 15, for the sake of convenience, letters indicating the ink colors printed for each of the correction patterns CP are printed, but it is not necessary to print the letters indicating the ink colors. Furthermore, in the description below, in the correction patterns, the side of the raster line that is printed first, that is, the front end side when carrying printed paper is referred to as "front end side" also in the case of the correction patterns, and the side of the raster line that is printed last, that is, the rear end side when carrying printed paper is referred to as "rear end side" also in the case of the correction patterns.

The difference between the correction patterns CP, for the respective ink colors, having the five sub patterns SP is basically only the color of ink. Thus, in the description below, a black (K) correction pattern CPk having five sub patterns SP is described as a typical example of the four correction patterns CP.

As shown in FIG. 15, four correction patterns CP of the first embodiment are printed on one sheet of paper for the respective colors K, C, M, and Y. In each of the correction patterns CP, band-shaped sub patterns SP that extend in the carrying direction of the paper are printed at five types of darknesses based on the five types of specific gradation values, and the five sub patterns SP are arranged side by side in the carriage movement direction. More specifically, each of the correction patterns CP has a sub pattern group including the five sub patterns SP.

Furthermore, as described above, darkness non-uniformity in multicolor printing is suppressed for each ink color that is used for the multicolor printing, but the method that is used for suppression is the same. Thus, a following description is given for black (K) as a typical example. In the description below, only one color of black (K) is described in some parts, but the same description can be applied also to the other ink colors C, M, and Y.

In the correction pattern CPk for black (K), sub patterns SPka, SPkb, SPkc, SPkd, and SPke at five types of darknesses are arranged side by side in the carriage movement direction. More specifically, each of the sub patterns SPka, SPkb, SPkc, SPkd, and SPke have the configuration in which a plurality of raster lines (dot rows) formed in the carriage movement direction are arranged side by side in the carrying direction that is a direction intersecting the carriage movement direction. The raster lines constituted by dots that are formed at the same positions in the carrying direction in the sub patterns SPka, SPkb, SPkc, SPkd, and SPke are formed by ejecting ink from the same nozzles in the same movement operation of the carriage 31.

The printer 1 repeats in alternation the operation in which the carriage 31 is moved while ink is ejected and the operation in which paper is carried, when an image is printed. Thus, printing is performed with nozzles that are set for each block with a predetermined width that is determined based on the paper carrying amount and the number of the nozzles that are used. More specifically, an image is basically formed by joining a plurality of blocks with the predetermined width in the carrying direction, and when the image is printed on one sheet of paper, there are the plurality of blocks in which dots that are formed with the nozzles are arranged in a similar manner. Thus, the correction pattern CP is set to include at least one of the blocks in which each of the raster lines are formed with the nozzles that are different from each other.

Furthermore, in the correction pattern CP that is formed for each color, the outermost raster lines that are positioned at the outermost of the plurality of raster lines that are arranged side by side in the carrying direction of paper have extending portions L, with a width of one dot, that extend in an area wider than other raster lines in the carriage movement direction. The extending portions L are formed, at a darkness of 100%, with an outermost raster line Ls that is positioned on the front end side of the correction pattern CP and an outermost raster line Le that is positioned on the rear end side extending longer than the other raster lines. Herein, with respect to the outermost raster line Ls at the front end side and the outermost raster line Le at the rear end side, it is not necessarily required that the extending portions L are joined to a portion (hereinafter, referred to as "main section") M that is constituted by the five sub patterns SP, and it is sufficient if, in the same movement operation as the movement operation of the carriage 31 when the main section M is printed, the extending portions L are formed by ejecting ink from the nozzles forming the outermost raster lines. More specifically, the extending portions L are ruled lines that are formed in the movement direction of the carriage 31 in order to detect the inclination of each of the correction patterns CP, and in the first embodiment, the extending portion L of the outermost raster line Ls at the front end side of the each of the correction patterns CP corresponds to the section to be detected for detecting the inclination of an image.

Furthermore, in the correction patterns CP for the respective colors, a single dot line J that joins between the extending portion L at the front end side and the extending portion L at the rear end side, that is disposed in parallel with the sub patterns SP, and that is configured by arranging dots in one line is provided with a spacing interposed from the sub patterns SP.

In the first embodiment, an example was shown in which the four correction patterns CP that are formed for the respective colors are printed on one sheet of paper, but the correction patterns CP are printed on one sheet of paper for every print mode by changing the paper carrying amount and the ink ejection timing of the nozzles, in accordance with each of the print modes such as interlaced mode and band supply mode. More specifically, the raster lines of an image printed in the modes such as the interlaced mode and the band supply mode, and the nozzles forming each of the raster lines are different from each other depending on the print mode, and thus it is desirable that the correction patterns for suppressing darkness non-uniformity between the row areas in which the raster lines are to be formed are printed at the paper carrying amount and the ink ejection timing of each of the nozzles that are actually used in actual printing, that is, in each print mode and each print processing mode. For example, in the band supply mode, paper is carried by the length of the nozzle row, and printing is performed at least for one block in a print processing mode in which raster lines with the same pitch as the nozzle pitch are formed. In the interlaced mode, printing is performed at least for one block each in a processing mode in which front end and rear end portions of paper are printed in actual printing with a specific few nozzles while carrying the paper only by a slight amount, and in a print processing mode in which the portions other than the front end and rear end portions are printed by forming raster lines using as many nozzles as possible while carrying the paper by a fixed amount. Furthermore, in the case of so-called borderless printing in which the paper is printed without a margin, printing is performed at least for one block each in a mode in which printing is performed as at the front end and rear end portions of the paper using only the nozzles that are opposed to a groove 24a (see FIG. 6) provided on the platen 24, and in a print processing mode in which the portions other than the front end and rear end portions are printed by forming raster lines using as many nozzles as possible while carrying the paper by a fixed amount. When the darkness is corrected using the correction values that are obtained based on each of the printed correction patterns in each print mode in which printing is performed at the paper carrying amount and the ink ejection timing of each of the nozzles that are the same as in actual printing in this manner, the precision in the correction is improved, and thus it is possible to reliably suppress darkness non-uniformity.

In the first embodiment, an example using correction patterns printed based on the gradation values associated with the five types of specific darknesses for each color was described, but the specific darknesses for each color, that is, the type of the gradation values is not limited to five types. When the type of the gradation values is increased, it is possible to correct the darkness more appropriately, but the time used for the step of printing the correction patterns, the step of setting the correction values by reading the correction patterns, and the correcting process, for example, is increased. On the other hand, when the type of the gradation values is decreased, the correction may not be performed as appropriate. Thus, it is desirable that the gradation values of the specific darknesses are set to be about five types.

(2) Step S210: Step of Performing the Initial Setting of the Scanner

In the scanner 400 for reading the printed correction patterns CP, an initial setting operation is performed. The initial setting operation may be performed when the power of the scanner 400 is turned on. The scanner 400 moves the reading carriage 16 in a predetermined direction and detects the position of the reading carriage 16. The light of the exposure lamp 7 is turned on and the light-emitting amount is stabilized. Furthermore, a document at a reference darkness is read, the output of the CCD image sensor 14 is detected, and the necessary light amount is confirmed and the gain is adjusted. Then, the reading carriage 16 is moved to the home position and put on standby. This initial setting process of the scanner 400 may be performed at the same time when the printer 1 prints the correction patterns CP.

(3) Step S220: Step of Reading the Correction Pattern CP

The darkness of each of the correction patterns shown in FIG. 15 is read by the scanner 400.

The reading resolution of the scanner 400 of the first embodiment is set higher than the print resolution of the printer 1, and the width in the sub-scanning direction of the unit area in the printed correction patterns is set to substantially four times the width that is read by one photodiode provided on the CCD image sensor 14. More specifically, an ideal raster line corresponds to substantially four times the width in the sub-scanning direction of the minimum reading area that is the minimum unit that can be read by the scanner 400.

Figure 16:
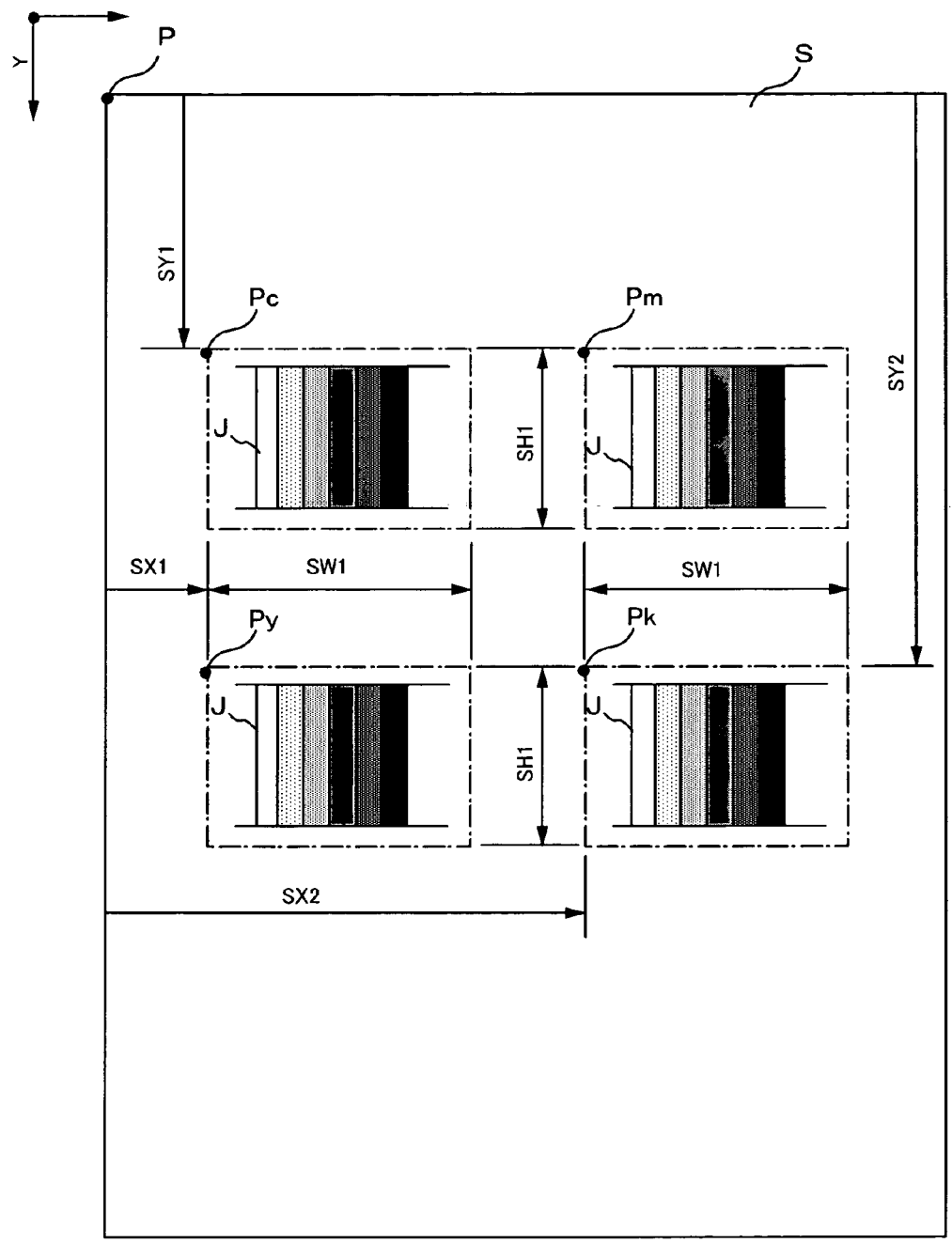
FIG. 16 is a diagram for illustrating reading reference positions and reading areas when the correction patterns are read in the first embodiment.

FIG. 16 is a diagram for illustrating reading reference positions and reading areas when the correction patterns are read.

When the correction patterns are read, the front end portion of paper (hereinafter, referred to as "correction document") on which the correction patterns CP are printed by the printer 1 is led to abut against the document abutting section 11a of the document regulating plate 11, and a corner section on one side at the front end of the correction document is positioned at the reference position in the main-scanning direction, and the correction document is placed on the document platen glass 12. Herein, the position at which the corner section on one side at the front end of the correction document is positioned is referred to as "absolute reference position P".

Then, while the reading carriage 16 is moved in the sub-scanning direction, the output of the CCD image sensor 14 at areas of a predetermined size including the correction patterns is stored together with the positional information in the memory 117. In the first embodiment, the setting is such that images in areas with a width of SW1 in the main-scanning direction and a length of SH1 in the sub-scanning direction are read using, for the cyan correction pattern, a position at a distance of SX1 in the main-scanning direction and a distance of SY1 in the sub-scanning direction from the absolute reference position P, for the magenta correction pattern, a position at a distance of SX2 in the main-scanning direction and a distance of SY1 in the sub-scanning direction from the absolute reference position P, for the yellow correction pattern, a position at a distance of SX1 in the main-scanning direction and a distance of SY2 in the sub-scanning direction from the absolute reference position P, and for the black correction pattern, a position at a distance of SX2 in the main-scanning direction and a distance of SY2 in the sub-scanning direction from the absolute reference position P, respectively as reference positions (hereinafter, referred to as "reading reference positions") Pc, Pm, Py, and Pk when reading each of the correction patterns. More specifically, the scanner 400 moves the reading carriage 16 in the sub-scanning direction, and when the reading carriage 16 has reached the position at which the position (reading position) of an image that is formed on the CCD image sensor 14 is the document abutting section 11a, and then has moved by the distance SY1, the loading of the output of the CCD image sensor 14 is started. At that time, the output of the photodiodes that are arranged in the range of the width SW1 in the main-scanning direction from the reading reference position Pc and the output of the photodiodes that are arranged in the range of the width SW1 in the main-scanning direction from the reading reference position Pm are periodically read as the read darkness data as the measured values of the cyan correction pattern CPc and the read darkness data as the measured values of the magenta correction pattern CPm, and are stored in the memory 117 in association with the positional information of the respective minimum reading areas. The cyan and magenta correction patterns CPc and CPm are read continuously during the time in which the reading carriage 16 moves by the length SH1 from the reading reference position Pc and the reading reference position Pm.

Then, when the reading carriage 16 has moved by the distance SY2 from the absolute reference position P, the loading of the output of the CCD image sensor 14 is again started. At that time, the output of the photodiodes that are arranged in the range of the width SW1 in the main-scanning direction from the reading reference position Py and the output of the photodiodes that are arranged in the range of the width SW1 in the main-scanning direction from the reading reference position Pk are periodically read as the read darkness data as the measured values of the yellow correction pattern CPy and the read darkness data as the measured values of the black correction pattern CPk, and are stored in the memory 117 in association with the positional information of the respective minimum reading areas. The yellow and black correction patterns CPy and CPk are read continuously during the time in which the reading carriage 16 moves by the length SH1 from the reading reference position Py and the reading reference position Pk. In this manner, data in the areas including each of the correction patterns CP is stored in the memory 117 in association with the positional information of the respective minimum reading areas, as the read darkness data for the respective minimum reading areas that are defined by the size of the photodiodes provided on the CCD image sensor 14, the moving speed of the reading carriage 16, the projection magnification in the optical system, and the reading speed of the CCD image sensor 14. In the first embodiment, for example, the reading resolution of the scanner 400 is 2880 dpi and the minimum reading area is an area in which one side is 1/2880 inch.

The read darkness data that is read at that time is stored while the maximum value (white level) of the output of the photodiode is associated with a read darkness of "0" and the minimum value (highest darkness level) of the output is associated with a read darkness of "255" in each ink color.

(4) Step S230: Step of Detecting the Inclination of the Read Data

The correction pattern CP is a pattern that is printed by the printer 1, and thus due to the paper carry characteristics of the printer 1, the correction pattern CP is not always printed without being at an angle on paper. Furthermore, even when the correction pattern is printed without being at an angle on paper that has been accurately carried, if the paper is not accurately disposed when the paper is placed on the document glass platen, for example, then the correction pattern may be read at an angle.

Herein, the correction that is performed based on the correction value that is generated based on the read darkness data of the correction pattern CP is correction for suppressing darkness non-uniformity between row areas in which raster lines are formed, and the correction value is generated for each row area. Thus, when the correction pattern CP at an angle is read by the scanner 400, the read darkness data may be read over a plurality of different row areas even when it is intended to read one row area along the sub-scanning direction, and the accurate correction value may not be obtained because the inaccurate read darkness data is treated as the read darkness data of the one row area.

Thus, using the read darkness data of the black correction pattern CPk that has been read in step S220, the inclination of the black correction pattern CPk is detected and then adjusted such that the inclination is eliminated.

Figure 17:
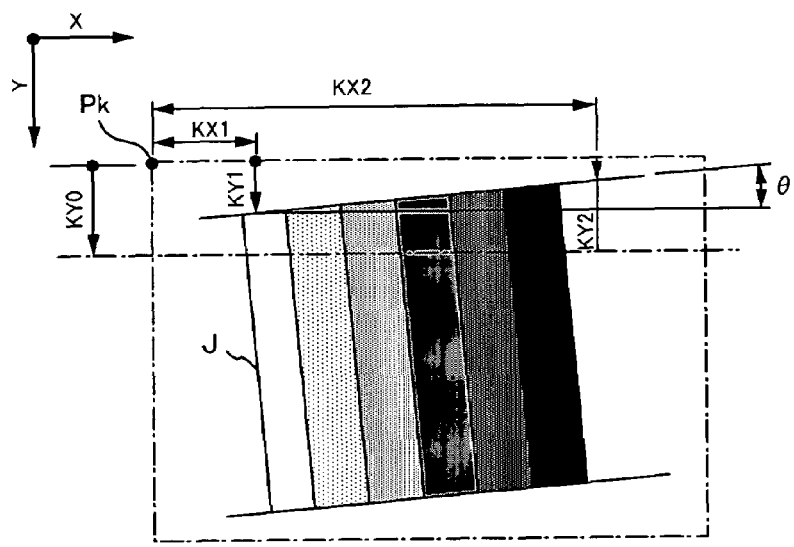
FIG. 17 is a diagram for illustrating a process for detecting the inclination of a black correction pattern of the first embodiment.

FIG. 17 is a diagram for illustrating a process for detecting the inclination of the black correction pattern. It is assumed that the black correction pattern CPk is read at an angle as shown in the diagram. The dashed dotted line in the diagram indicates the entire area that has been read.

In the first embodiment, when the inclination of each correction pattern is detected, the extending portions L of the outermost raster lines that are positioned at the outermost in the sub-scanning direction among the raster lines constituting the correction pattern are detected. The extending portions L are printed at a section in which other raster lines are not printed in the sub-scanning direction, and thus it is possible to detect the center of gravity positions in the darkness distribution in the read darkness data in the sub-scanning direction as the positions of the extending portions L. Herein, the position of the outermost raster line that is positioned at the front end side of the correction document in the sub-scanning direction is detected at two locations that have a spacing interposed therebetween in the main-scanning direction, and the inclination is detected by the difference between the positions detected at the two locations. More specifically, the inclination is detected by extracting the read darkness data read by two photodiodes that are provided on the CCD image sensor 14 and that have a spacing interposed therebetween, and by comparing the distance between the reading reference position Pk in the sub-scanning direction and the center of gravity position in the darkness distribution in the sub-scanning direction, between the extracted read darkness data at the two locations.

The process for detecting the inclination of the correction pattern is performed based on a predetermined program that is executed by the computer 720 connected to the scanner 400.

When the program for detecting the inclination of the correction pattern is executed by the computer 720, a reference is made to the read darkness data that has been read in step S220 and stored in the memory 117 of the scanner 400, and the read darkness data that has been read by the photodiodes arranged at positions at a distance of KX1 and a distance of KX2 in the main-scanning direction from the reading reference position Pk is extracted only for the distance KY0 in the sub-scanning direction from the reading reference position Pk.

At that time, when the correction pattern is read at an angle as shown in FIG. 17, the distance between the reading reference position Pk in the sub-scanning direction and the center of gravity position in the darkness distribution in the sub-scanning direction is different between the read darkness data that has been read by the photodiode corresponding to the position at the distance KX1 and the photodiode corresponding to the position at the distance KX2.

Figure 18:
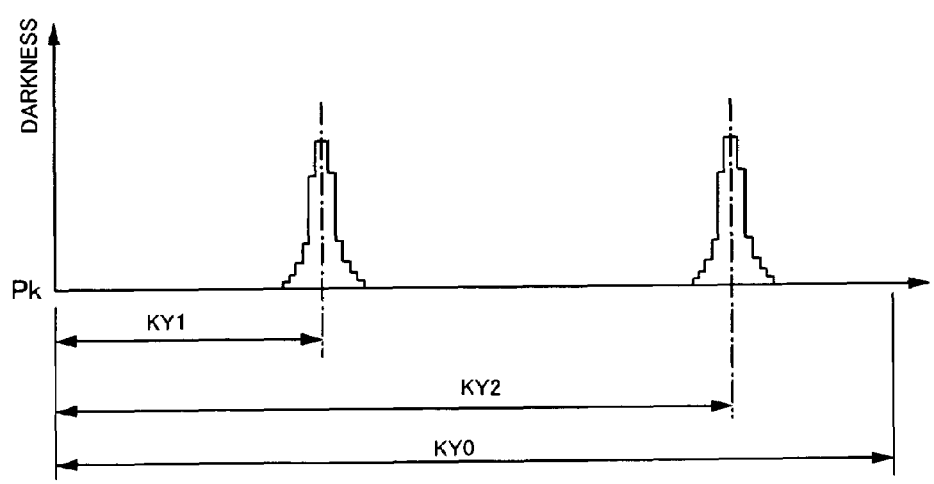
FIG. 18 is a diagram for illustrating the difference in the distance from a reading reference position Pk to the center of gravity position in the darkness distribution in a sub-scanning direction, between a distance KX1 and a distance KX2, in the first embodiment.

FIG. 18 is a diagram for illustrating the difference in the distance from the reading reference position Pk to the center of gravity position in the darkness distribution in the sub-scanning direction, between the distance KX1 and the distance KX2.

The respective read darkness data that has been read by the photodiodes corresponding to the position at the distance KX1 and the position at the distance KX2 is expressed in the graph as shown in FIG. 18, and the distance from the reading reference position Pk to the center of gravity position in the darkness distribution in the sub-scanning direction are different between them.

More specifically, the center of gravity position in the darkness distribution in the sub-scanning direction is different from the distance (KX2−KX1) in the main-scanning direction, by the distance (KY1−KY2).

Thus, an inclination angle θ of the correction pattern can be obtained based on Equation (1).

$$\theta = \tan^{-1}\{(KY1-KY2)/(KX2-KX1)\} \quad (1)$$

At that time, the computer 720 detects that the read correction pattern is at an angle by the angle θ.

(5) Step S240: Step of Adjusting the Inclination of the Read Data

The computer 720 that has detected that the read darkness data that has been read is at an angle performs a so-called a rotation process of the image data in which the data is processed in such a manner that the image is rotated based on the positional information associated with the read darkness data so as to eliminate the inclination based on the detected angle θ, with respect to the read darkness data that is stored in the memory 117.

Figure 19:
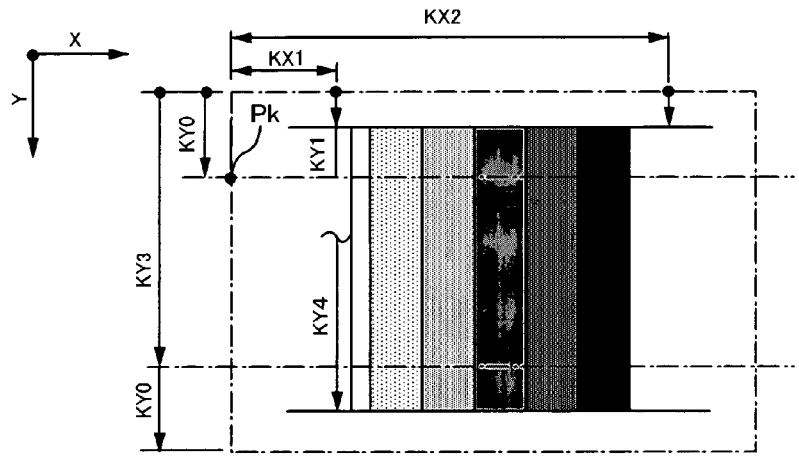
FIG. 19 is a diagram showing an image of read darkness data after a rotation process of the image data has been performed based on the detected inclination in the first embodiment.

FIG. 19 is a diagram showing an image of the read darkness data after the rotation process of the image data has been performed based on the detected inclination.

As shown in the diagram, when the rotation process of the image data is performed based on the read darkness data that has been read, it is possible to adjust the inclination of the correction pattern in such a manner that that the image based on the read image data is rotated. In this manner, in the read darkness data whose inclination has been adjusted, the direction of the raster lines constituting the correction pattern matches the direction of the raster lines that are formed based on data corresponding to the row areas in which the corresponding raster lines are to be formed in the read darkness data that has been read.

(6) Process for Fetching Data in a Desired Area of the Data Whose Inclination has Been Adjusted The data whose inclination has been adjusted, that is, the read darkness data in which it is assumed that the correction pattern CP is read in an accurately disposed state without being at an angle includes the read darkness data of a margin portion in addition to the read darkness data of the correction pattern, and thus the position of the row areas constituting the correction pattern is not clear. Furthermore, the width in the sub-scanning direction of the row area in the printed correction pattern is four times the minimum reading area (reading resolution) of the scanner 400, and thus the number of sets of data in the sub-scanning direction in the read darkness data does not match the number of the row areas in the correction pattern. Also, the correction pattern that has been read by the scanner 400 has been printed, and thus the printing is not always performed such that the width in the sub-scanning direction of the raster lines is an ideal width because, for example, ink smudges. In addition, due to an error in the speed of the reading carriage when the correction document is read or in the timing at which the data is loaded into the CCD image sensor 14, for example, the width that corresponds to four times the minimum reading area when the correction pattern is read does not always match the width in the sub-scanning direction of the raster line. Thus, a process is performed in which the read darkness data corresponding to the main section M of the correction pattern CP in the read image data whose inclination has been adjusted is extracted, and the extracted read darkness data is associated with the row areas constituting the correction pattern CP.

First, the read darkness data of the main section M of the correction pattern CP is extracted from the read darkness data whose inclination has been adjusted.

<Extraction of Read Darkness Data Corresponding to the Main Section of the Correction Pattern>

When the read darkness data corresponding to the main section M of the correction pattern CP is extracted from the read darkness pattern whose inclination has been adjusted, edges in the sub-scanning direction of the main section M of the correction pattern CP are detected at two locations and the read darkness data corresponding to data between the edges is extracted as the read darkness data of the main section M of the correction pattern CP. It is possible to detect the edges of the main section M of the correction pattern CP when edges of the outermost raster lines as the outermost raster lines that are positioned at the outermost in the sub-scanning direction of the main section M of the correction pattern CP are detected from the read darkness data whose inclination has been detected. In the first embodiment, the edges of the outermost raster lines are detected using the extending portions L of the outermost raster lines of the correction pattern.

First Example of First Embodiment

Step S250: Step of Detecting the Positions of the Outermost Raster Lines

Figure 20:
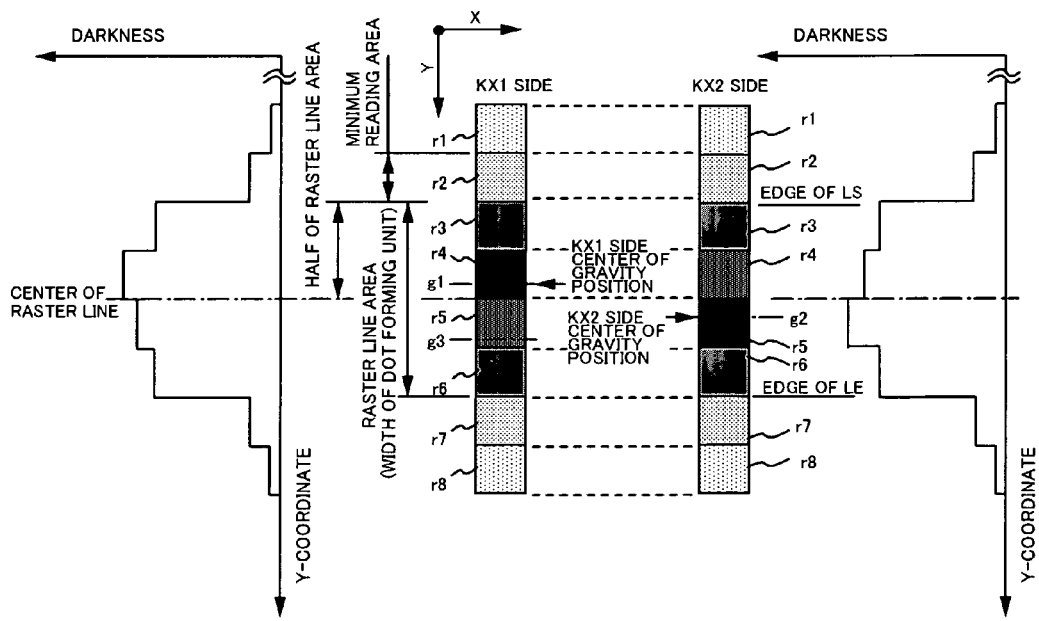
FIG. 20 is a diagram for illustrating a first example of a process for detecting edges using extending portions of outermost raster lines in the first embodiment.

FIG. 20 is a diagram for illustrating a first example of a process for detecting edges using the extending portions of the outermost raster lines.

The process for detecting the positions of the outermost raster lines is performed, for example, as shown in FIG. 19, by using the read darkness data that has been read by the photodiodes corresponding to the positions at the distance KX1 and the distance KX2 in the main-scanning direction from the reading reference position Pk in the read darkness data whose inclination has been adjusted. Herein, the correction pattern has the two outermost raster lines in the sub-scanning direction, and thus the detection of the position of the outermost raster line is performed on each of the outermost raster lines. More specifically, the read darkness data corresponding to the distance KY0 in the sub-scanning direction from the reading reference position Pk is extracted as the read darkness data for detecting the position of the outermost raster line Ls on the front end side of the correction document, and the read darkness data corresponding to the distance KY0 in the sub-scanning direction from the position away from the reading reference position Pk in the sub-scanning direction by the distance KY3 is extracted as the read darkness data for detecting the position of the outermost raster line Le on the rear end side of the correction document.

The center portion in FIG. 20 shows the images of the read darkness data, in the vicinity of the outermost raster lines L, that has been read by the photodiodes corresponding to the positions at the distance KX1 and the distance KX2, the graph at the left shows the image of the read darkness data at the distance KX1, and the graph at the right shows the image of the read darkness data at the distance KX2.

In the example shown in FIG. 20, in the read darkness data in the vicinity of the outermost raster lines, eight minimum reading areas r that have the darkness in contrast to the margin portion are detected in the sub-scanning direction. The extending portion L is one raster line (raster line formed in one row area), and thus the extending portion L is originally to be detected as four minimum reading areas that are arranged side by side in the sub-scanning direction. More specifically, among the eight minimum reading areas r1 to r8 in which the darkness is detected, the four minimum reading areas r are data indicating the extending portion L, and the other four minimum reading areas r originally do not exist. Thus, the four minimum reading areas indicating the extending portion L are specified, and the outer edge of the minimum reading area that is positioned on the outer side in the correction pattern CP, among the four minimum reading areas, is detected as the edge of the main section M of the correction pattern CP. The following is a description mainly concerning a process for detecting the edge of the outermost raster line at the front end side, and points in which the processes are different from each other between the outermost raster line at the front end side and the outermost raster line at the rear end side are respectively described later.

Information indicating the print resolution when the correction pattern is printed and the reading resolution when the printed correction pattern is read by the scanner 400 is stored in the computer 720. The computer 720 calculates the number of the successive minimum reading areas that are included in the width in the sub-scanning direction of the extending portion L based on the stored print resolution and reading resolution. In the first embodiment, the calculation result is "4". Furthermore, if the calculated number of the minimum reading areas is an even number, then a half of the calculated number of the minimum reading areas is also calculated in order to obtain the distance from the center of the width to the edge in the sub-scanning direction of the extending portion L. In the first embodiment, the calculation result is "2".

The computer 720 extracts the read darkness data (hereinafter, referred to as "front end side read darkness data") corresponding to the distance KY0 in the sub-scanning direction from the reading reference position Pk, and the read darkness data (hereinafter, referred to as "rear end side read darkness data") corresponding to the distance KY0 in the sub-scanning direction from the position away from the reading reference position Pk in the sub-scanning direction by the distance KY3, in the minimum reading areas that are positioned at the distance KX1 and the distance KX2 in the main-scanning direction.

Based on the extracted front end side read darkness data, the center of gravity position in the darkness distribution in the sub-scanning direction is detected at each of the distance EX1 and the distance EX2. In the example shown in FIG. 20, a position g1 at the lower end side below the center of the fourth minimum reading area r4 is detected as the center of gravity position in the darkness distribution in the sub-scanning direction at the distance KX1, and a position g2 at the upper end side above the center of the fifth minimum reading area r5 is detected as the center of gravity position in the darkness distribution in the sub-scanning direction at the distance KX2.

When the two center of gravity positions in the darkness distribution in the sub-scanning direction are detected, the computer 720 detects their center position. In the example shown in FIG. 20, the boundary between the fourth minimum reading area r4 and the fifth minimum reading area r5 is detected as the center position of the outermost raster line L. At that time, if the position detected as the center position of the outermost raster line L is not the boundary between the two minimum reading areas, for example, if a position g3 at the lower end side below the center of the fifth minimum reading area r5 is detected, then the edge closer to the position g3 of the minimum reading area including the position g3, that is, the boundary between the fifth minimum reading area r5 and the sixth minimum reading area r6 is set to be detected as the center position of the outermost raster line L.

Step S260: Step of Detecting the Edges of the Correction Pattern in the Sub-Scanning Direction The computer 720 detects the edges of the main section M of the correction pattern CP, based on the positional information of the boundary between the two detected minimum reading areas r4 and r5, and a half "2" of the calculated number of the minimum reading areas included in the width in the sub-scanning direction of the extending portion L.

For example, in the example shown in FIG. 20, among the eight minimum reading areas r1 to r8 in which the darkness is detected, the boundary between the fourth minimum reading area r4 and the fifth minimum reading area r5 from the front end side in the sub-scanning direction is detected as the center position of the outermost raster line L, that is, the center of the extending portion L, and thus the edge of the minimum reading area away from the center of the extending portion L by two toward the outer side in the correction pattern CP is detected as the edge of the correction pattern CP.

Then, if FIG. 20 shows the read darkness data when the extending portion L that is positioned at the front end side of the correction pattern is read, then the edge on the front end side of the third minimum reading area r3 that is positioned away from the boundary between the fourth minimum reading area r4 and the fifth minimum reading area r5 that has been detected as the center position of the outermost raster line Ls, by two in the outer direction in the correction pattern CP, is detected as the edge on the front end side of the correction pattern CP. A trimming process is performed in which data in the minimum reading areas outer than the third minimum reading area r3 is deleted from the read darkness data corresponding to the correction pattern CP.

Furthermore, if FIG. 20 shows the read darkness data when the extending portion L that is positioned at the rear end side of the correction pattern is read, then the edge on the rear end side of the sixth minimum reading area r6 that is positioned away from the boundary between the fourth minimum reading area r4 and the fifth minimum reading area r5 that has been detected as the center position of the outermost raster line Le, by two in the outer direction in the correction pattern CP, is detected as the edge on the rear end side of the correction pattern CP. A trimming process is performed in which data in the minimum reading areas outer than the sixth minimum reading area r6 is deleted from the read darkness data corresponding to the correction pattern CP.

Next, a process is described in which the edge is detected using the extending portion in a case where the number of the successive minimum reading areas that are included in the width of the extending portion in the sub-scanning direction is an odd number.

If the calculated number of the successive minimum reading areas that are included in the width of the extending portion in the sub-scanning direction is an odd number, then the half of the number that is smaller by one than the calculated number of the minimum reading areas is calculated. For example, if the calculated number of the successive minimum reading areas that are included in the width in the sub-scanning direction of the extending portion is "3", then the calculation result is "1". It is assumed that the position g1 shown in FIG. 20 is detected as the center position of the outermost raster line L, based on the center of gravity position in the darkness distribution in the sub-scanning direction at the distance KX1 and the center of gravity position in the darkness distribution in the sub-scanning direction at the distance KX2 (step: S250). In this case, the minimum reading area including the position g1 that is the detected center of the outermost raster line L, that is, the fourth minimum reading area r4 is detected as a center minimum reading area that is positioned at the center in the sub-scanning direction in the extending portion.

Subsequently, the computer 720 detects the edge at the front end side of the third minimum reading area r3 and the edge at the rear end side of the fifth minimum reading area r5 as the edges of the main section M of the correction pattern CP based on the positional information of the detected center minimum reading area r4 and the calculated number "1" (step: S260).

Second Example of First Embodiment

Step S250: Step of Detecting the Positions of the Outermost Raster Lines

Figure 21:
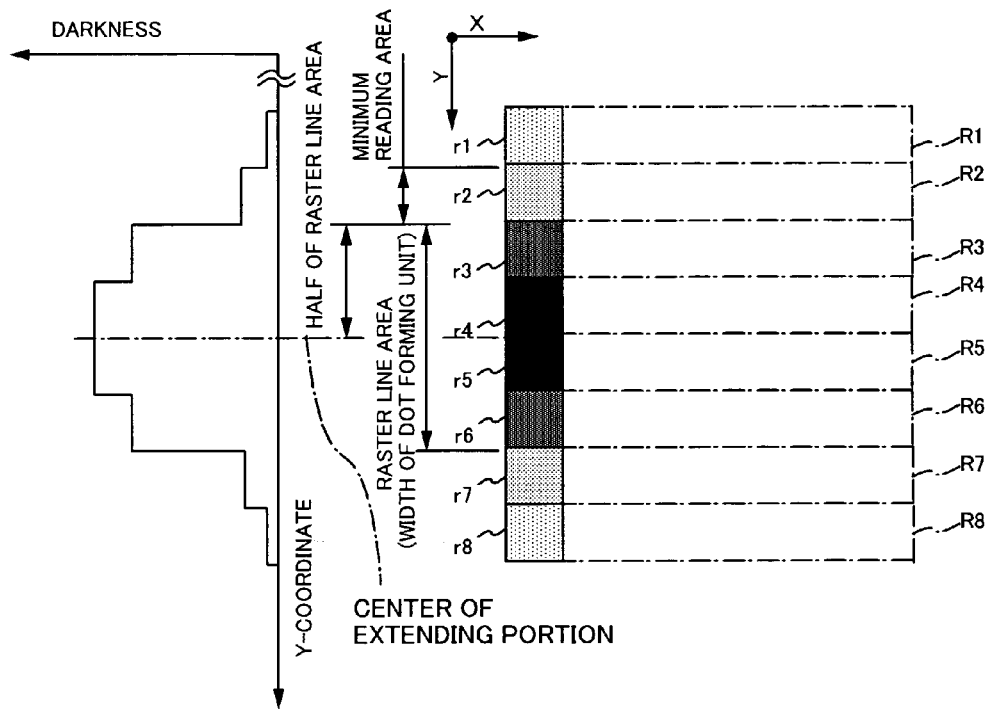
FIG. 21 is a diagram for illustrating a second example of a process for detecting edges using extending portions of outermost raster lines in the first embodiment.

FIG. 21 is a diagram for illustrating a second example of a process for detecting edges using the extending portions of the outermost raster lines of the correction pattern.

The graph on the left in FIG. 21 shows, in a graph, an image of the read darkness data in the vicinity of the outermost raster line, of the data that has been read by one photodiode on the CCD image sensor 14, in the read darkness data whose inclination has been adjusted. Furthermore, the diagram on the right in FIG. 21 is a diagram showing an image of the extending portion L in the read image in the case of the read darkness data indicating the darkness as in the graph on the left. FIG. 21 shows the read darkness data that has been read by the photodiode corresponding to the position at the distance KX1 in the main-scanning direction from the reading reference position Pk and that corresponds to the distance KY0 in the sub-scanning direction from the reading reference position Pk, as the read darkness data in the vicinity of the outermost raster line.

Information indicating the print resolution when the correction pattern is printed and the reading resolution when the printed correction pattern is read by the scanner 400 is stored in the computer 720, and the computer 720 calculates the number "4" of the successive minimum reading areas that are included in the width in the sub-scanning direction of the extending portion L, and the half "2" of the number, based on the stored print resolution and reading resolution, as in the first example.

The computer 720 detects the minimum reading area in which the darkness has its peak, of the read darkness data corresponding to the distance KY0 in the sub-scanning direction from the reading reference position Pk, and the read darkness data corresponding to the distance KY0 in the sub-scanning direction from the position away from the reading reference position Pk in the sub-scanning direction by the distance KY3, and stores the positional information. At that time, if the number of the successive minimum reading areas that are included in the width in the sub-scanning direction of the extending portion L is an even number, then as the minimum reading area in which the darkness has its peak, two minimum reading areas with the highest darkness are detected, and the positional information is stored. More specifically, it is detected that the boundary that is the center of the two detected minimum reading areas is the center of the extending portion L. In the example shown in FIG. 21, as the minimum reading areas in which the darkness has its peak, the fourth and the fifth minimum reading areas r4 and r5 are detected, and the positional information is stored. Then, it is detected that the center of the detected minimum reading areas r4 and r5 is the center of the extending portion L.

Subsequently, as in the first embodiment, the process is performed in which in step S260, the edges of the main section M of the correction pattern CP are detected based on the positional information of the boundary between the two detected minimum reading areas, and the half "2" of the calculated number of the minimum reading areas included in the width in the sub-scanning direction of the extending portion L.

Next, a process is described in which the edge is detected using the extending portion in a case where the number of the successive minimum reading areas that are included in the width of the extending portion in the sub-scanning direction is an odd number.

It is assumed that the minimum reading area with the highest darkness, for example, the fourth minimum reading area r4 is detected as the minimum reading area in which the darkness has its peak in a case where the calculated number of the successive minimum reading areas that are included in the width of the extending portion in the sub-scanning direction is an odd number. In this case, the fourth minimum reading area r4 with the highest darkness is detected as the center minimum reading area that is positioned at the center in the sub-scanning direction in the extending portion L.

Subsequently, the computer 720 detects the edges of the main section M of the correction pattern CP as the edge at the front end side of the third minimum reading area r3 and the edge at the rear end side of the fifth minimum reading area r5, based on the positional information of the detected center minimum reading area r4 and the calculated number "1" (step: S260).

In the case of the second example, the positions are detected in the unit of the minimum reading area, and thus the process for detecting the edges is easy, but the precision in the detected positions is lowered. Furthermore, the center position of the extending portion is specified by the minimum reading area in which the darkness has its peak, and thus the influence of unevenness in the darkness becomes large depending on the reading position, and a detection error is easily caused by dust and the like. Accordingly, more stable results can be obtained in the first example in which the center position of the extending portion is specified by the center of gravity position in the darkness distribution.

(7) Step S270: Step of Converting the Data so as to be Associated with the Number of the Raster Lines that are Provided in the Correction Pattern (Step of Converting the Data in Order to Associate the Row Areas with the Data Corresponding to Data Between the Detected Outermost Raster Lines)

The computer 720 extracts, as the read darkness data of the correction pattern CP, the read darkness data from the minimum reading area having the edge at the front end side to the minimum reading area having the edge at the rear end side of the detected correction pattern CP.

Next, the computer 720 converts the data into the read darkness data that is associated with each row area, based on the data extracted as the read darkness data of the correction pattern and the number of the raster lines provided in the correction pattern CP. More specifically, using all of the data extracted as the read darkness data of the correction pattern CP, the conversion is performed using, for example, a bicubic method such that one set of the read darkness data is associated with each row area. At that time, the conversion is performed such that in the main-scanning direction, four sets of read darkness data are unit area data associated with one unit area. The read darkness data after the conversion is unit area darkness data indicating the darkness associated with each unit area constituting the correction pattern CP.

(8) Step S280: Step of Calculating the Average Values of the Darknesses of the Row Areas Based on the Converted Data Next, the computer 720 extracts the unit area darkness data of the plurality of unit areas for each of the row areas included in the sub patterns SP for the respective darknesses, in the row areas in which the raster lines constituting the main section M of the correction pattern CP are to be formed, from the unit area darkness data corresponding to the main section M of the correction pattern CP in the converted data, and then calculates the average value.

Positional information indicating the distance in the main-scanning direction between the single dot line J and the sub patterns SP of the correction pattern CP is stored in the memory of the computer 720.

The computer 720 detects the center position of the single dot line J by extracting the unit area darkness data of the unit areas that are provided in predetermined row areas, for example, the row areas at the center in the sub-scanning direction of the converted data, by referring to the unit area darkness data from the side of the reading reference position in the main-scanning direction, and by detecting the center of gravity position in the darkness distribution. The method for detecting the center of the single dot line J is the same as the method for detecting the center of the extending portion L in the sub-scanning direction of the correction pattern CP, except for the direction.

Based on the detected position of the single dot line J, and the positional information stored in the memory and indicating the distance in the main-scanning direction between the single dot line J and the sub patterns SPka, SPkb, SPkc, SPkd, and SPke, the unit area darkness data of the plurality of unit areas provided in the row areas in which the raster lines constituting the sub patterns SPka, SPkb, SPkc, SPkd, and SPke are to be formed is extracted, the average values of the plurality of sets of extracted unit area darkness data are obtained, and the obtained values are taken as the darkness data of the row areas.

Figure 22:
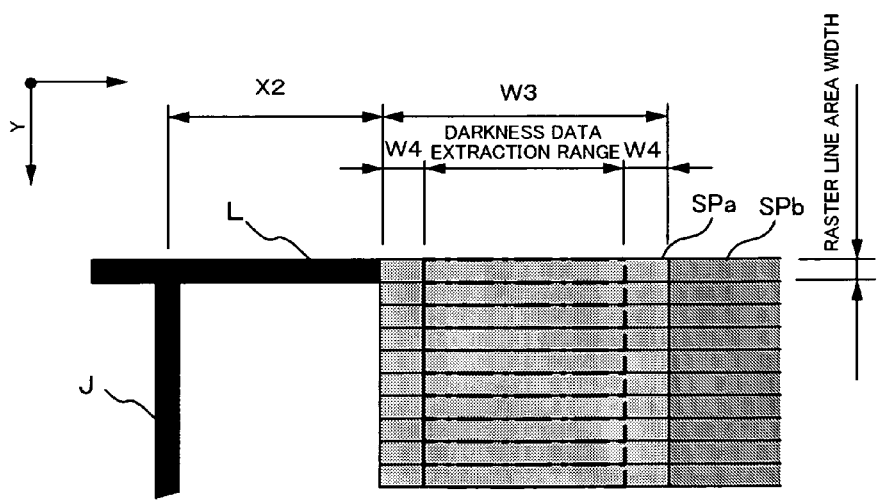
FIG. 22 is a diagram for illustrating a process for extracting unit area darkness data of unit areas provided in each of row areas constituting sub patterns in the first embodiment.

FIG. 22 is a diagram for illustrating a process for extracting the unit area darkness data of the unit areas provided in the row areas constituting the sub patterns. Herein, the sub pattern SPka (sub pattern at a darkness of 10%) that is disposed closest to the single dot line J in the correction pattern CP is described as an example.

The computer 720 detects the center position of the single dot line J for each of the row areas, and then based on the positional information stored in the memory, extracts the unit area darkness data of the unit areas on the center side, except for the unit areas that are present in the width W4 on both sides in the main-scanning direction, of the sub pattern at the darkness 10% that is present in the area of the width W3 from the position away from the detected center position of the single dot line J in the main-scanning direction by X2, calculates the average value of the extracted unit area darkness data, and obtains the average value as the darkness data of the row areas in the sub pattern at the darkness 10%.

In this manner, the darkness data for each of the row areas that are provided in the sub pattern SPka at the darkness 10% is obtained from the row area at the front end side to the row area at the rear end side of the correction pattern. Furthermore, this process is performed in a similar manner also on the sub pattern SPkb at the darkness 30% that is present in the area of the width W3 from the position away from the position at which the center of the single dot line J is detected, in the main-scanning direction by X2+W3, the sub pattern SPkc at the darkness 50% that is present in the area of the width W3 from the position away from the position at which the center of the single dot line J is detected, in the main-scanning direction by X2+W3×2, the sub pattern SPkd at the darkness 70% that is present in the area of the width W3 from the position away from the position at which the center of the single dot line J is detected, in the main-scanning direction by X2+W3×3, and the sub pattern SPke at the darkness 100% that is present in the area of the width W3 from the position away from the position at which the center of the single dot line J is detected, in the main-scanning direction by X2+W3× 4.

More specifically, the unit area darkness data of the unit areas on the center side, except for the width W4 from both sides in the main-scanning direction, of the width W3 of each of the sub patterns SPkb, SPkc, SPkd, and SPke is extracted, and the average values of the unit area darkness data of each of the row areas are calculated based on the plurality of sets of extracted unit area darkness data. The calculated average values of the unit area darkness data are taken as read darkness values. Herein, the read darkness values are obtained simply by calculating the average values of the unit area darkness data based on the read darkness data that has been read by the scanner 400, and thus as the read darkness data, the values are expressed as "0" in the case of the white color level at which the darkness is lowest, and as "255" in the case of the maximum darkness level at which the darkness is highest.

(9) Step S290: Step of Calculating Correction Values of the Specific Darknesses Based on the Read Darkness Values The correction values in two specific darknesses are calculated based on the calculated read darkness values.

In the first embodiment, the average values of the darknesses of the row areas that are provided in the sub patterns SP are taken as the target darkness values of the specific darknesses that are associated with the sub patterns SP, and darkness non-uniformity between each of the row areas is suppressed by correcting the gradation values of the print data such that the darknesses of each of the row areas achieve the target darkness values. Thus, the average values of the darknesses of the row areas constituting the respective sub patterns SP are calculated for the respective specific darknesses. The calculated average values of the darknesses are the target darkness values in the respective specific darknesses.

Next, the correction values of each of the row areas are obtained based on the calculated target darkness values. Herein, it is not necessarily required to obtain the correction values for all specific darknesses, and it is sufficient to obtain the correction values associated with some specific darknesses. In the first embodiment, the correction values are calculated with respect to two specific darknesses, namely the specific darkness 30% and the specific darkness 50%.

Figure 23:
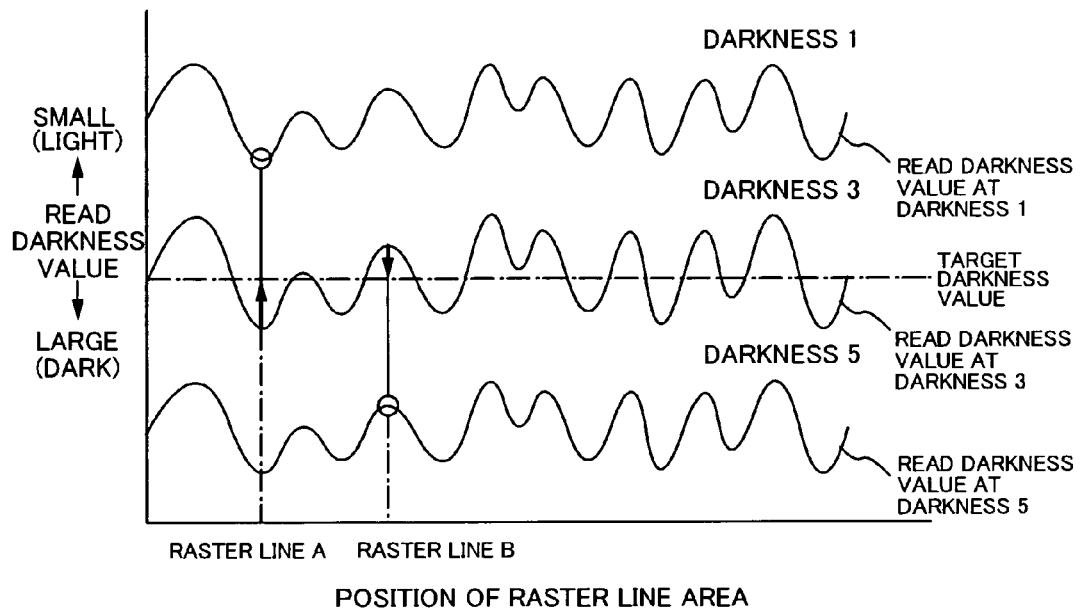
FIG. 23 is a diagram for illustrating a concept for obtaining a correction value at a specific darkness of the first embodiment.

FIG. 23 is a diagram for illustrating a concept for obtaining the correction value at the specific darkness.

As shown in the diagram, the read darkness value of a predetermined row area at a specific darkness 3 is compared with the target darkness value, and the correction value is obtained using the read darkness value of a row area A at a specific darkness (herein, darkness 1) in which the darkness is lower than the specific darkness 3 if the read darkness value of the row area A is larger than the target darkness value as in the row area A, and using the read darkness value of a row area B at a specific darkness (herein, darkness 5) in which the darkness is higher than the specific darkness 3 if the read darkness value is smaller than the target darkness value as in the row area B.

For example, the read darkness value of a predetermined row area at the specific darkness 50% is compared with the target darkness value, and the correction value is obtained using the read darkness value of the area at the same row at the specific darkness 10% if the read darkness value is larger than the target darkness value, and using the read darkness value of the area at the same row at the specific darkness 100% if the read darkness value is smaller than the target darkness value. The reason for this is that the gradation value that is to be specified in order to print a predetermined row area at the target darkness value in the predetermined row area is present between the read darkness value at the specific darkness 50% and the read darkness value at the specific darkness 10% if the read darkness value of the predetermined row area at the specific darkness 50% is larger than the target darkness value, and is present between the read darkness value at the specific darkness 50% and the read darkness value at the specific darkness 100% if the read darkness value of the predetermined row area at the specific darkness 50% is smaller than the target darkness value.

Then, a correction value $\alpha 50$ at the specific darkness 50% is obtained based on Equations (2) and (3).

If the read darkness value at the specific darkness 50% is larger than the target darkness value $$\alpha 50 = (C50-C10) \times (T-Z50)/\{(Z10-Z50) \times C50\} \quad (2)$$

T: target darkness value
C50: gradation value at darkness 50% before correction
C10: gradation value at darkness 10% before correction
Z50: read darkness value at darkness 50%
Z10: read darkness value at darkness 10%

If the read darkness value at the specific darkness 50% is smaller than the target darkness value $$\alpha 50 = (C100-C50) \times (T-Z50)/\{(Z100-Z50) \times C50\} \quad (3)$$

C100: gradation value at darkness 100% before correction
Z100: read darkness value at darkness 100%

In the first embodiment, an example was described in which the read darkness values at the specific darknesses 10% and 100% are used when the correction value $\alpha 50$ at the specific darkness 50% is obtained, but any specific darknesses may be used as long as they are two specific darkness values having interposed therebetween a specific darkness value that is to be obtained. However, it is desirable to determine the specific darknesses that are used, so as to set the correction values such that the output darkness changes as linearly as possible with respect to changes in the specified gradation value.

In the first embodiment, the correction values a are obtained with respect to the specific darkness 50% and the darkness 30% among the five types of specific darknesses. When the correction value $\alpha 30$ at the darkness 30% is to be obtained, for example, the correction value $\alpha 30$ is obtained based on Equations (4) and (5) using the read darkness value at the darkness 10% and the read darkness value at the darkness 70%.

If the read darkness value at the specific darkness 30% is larger than the target darkness value $$\alpha 30 = (C30-C10) \times (T-Z30)/\{(Z10-Z30) \times C30\} \quad (4)$$

T: target darkness value
C30: gradation value at darkness 30% before correction
C10: gradation value at darkness 10% before correction
Z30: read darkness value at darkness 30%
Z10: read darkness value at darkness 10%

If the read darkness value at the specific darkness 30% is smaller than the target darkness value $$\alpha 30 = (C70-C30) \times (T-Z30)/\{(Z70-Z30) \times C30\} \quad (5)$$

C70: gradation value at darkness 70% before correction
Z70: read darkness value at darkness 70%

In this manner, the correction values corresponding to the row areas are obtained for two types of specific darknesses and are stored in the memory (S300).

When printing is performed based on the gradation value that is given as the image data of an image to be printed, darkness non-uniformity occurs between row areas, and thus the obtained correction value $\alpha 50$ indicates, for each row area, the ratio at which the given gradation value is to be corrected in order to suppress the darkness non-uniformity. In the first embodiment, the setting is such that the image data indicates the darkness of each unit area with the gradation value 0 to 255, and the darkness 0 to 100% is expressed at the gradation of 256 levels with the gradation values 0 to 255. More specifically, the change rate of the gradation value that is specified by the image data is equal to the change rate of the gradation value that indicates the darkness to be printed. Thus, when the gradation value specifying the darkness 50%, for example, "128" is specified by the image data, the gradation value after the correction is "128×(1+$\alpha 50$)". Furthermore, in the case of the darkness 30%, when the gradation value specifying the darkness 30%, for example, "77" is specified by the image data, the gradation value after the correction is "77×(1+$\alpha 30$)".

The gradation values after the correction with respect to darknesses other than the darkness 30% and the darkness 50% are obtained by performing interpolation between the gradation values at the darkness 30% and the darkness 50% that have been corrected based on the obtained correction values at the darkness 30% and the darkness 50%, and the gradation values at the darkness 0 and the darkness 100%. At that time, the gradation value specifying the darkness 0 is "0", and the gradation value specifying the darkness 100% is "255", and they are the extreme values of the gradation values, so that they are not corrected. In other words, both the correction values $\alpha 0$ and $\alpha 100$ at the darkness 0 and the darkness 100% are "0".

Figure 24:
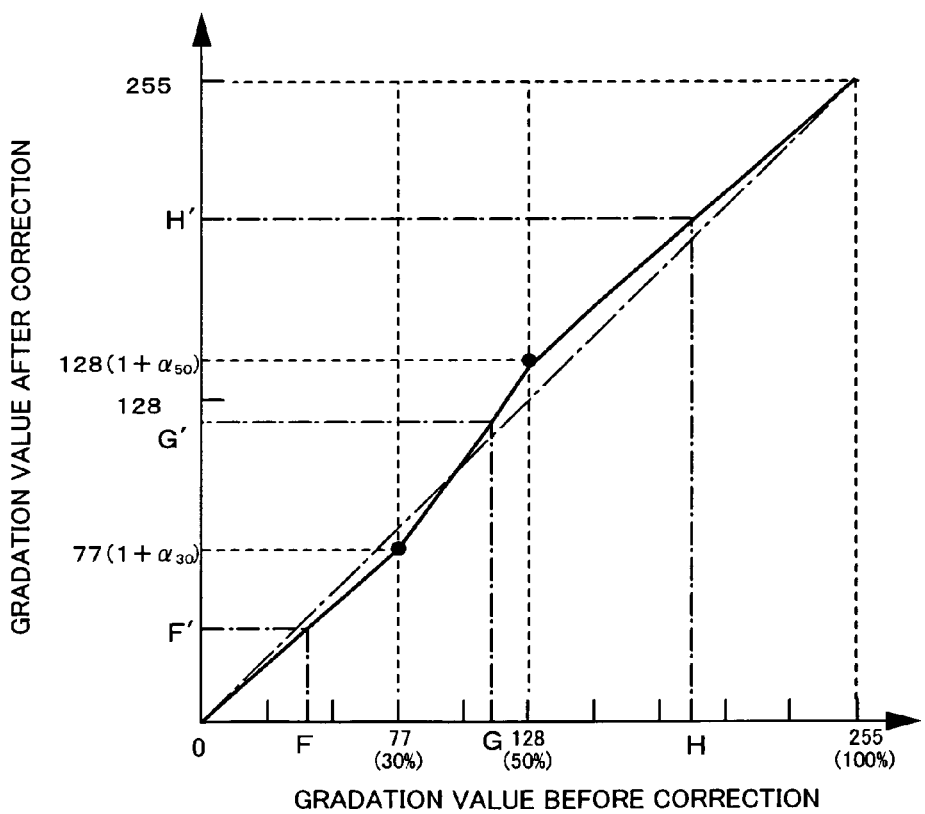
FIG. 24 is a diagram for illustrating a concept of a process in which image data is corrected based on a calculated correction value in the first embodiment.

FIG. 24 is a diagram for illustrating a concept of a process in which the image data is corrected based on the calculated correction value.

As shown in the diagram, for example, if a gradation value F is given as the image data, then the gradation value F is converted into a gradation value F' after the correction that is obtained by performing a linear interpolation between the gradation value "0" at the darkness 0 and the gradation value "77×(1+$\alpha 30$)" after the correction at the darkness 30%. If a gradation value G is given as the image data, the gradation value G is converted into a gradation value G' after the correction that is obtained by performing a linear interpolation between the gradation value "77×(1+$\alpha 30$)" after the correction at the darkness 30% and the gradation value "128×(1+$\alpha 50$)" after the correction at the darkness 50%. If a gradation value H is given as the image data, then the gradation value H is converted into a gradation value H' after the correction that is obtained by performing a linear interpolation between the gradation value "128×(1+$\alpha 50$)" after the correction at the darkness 50% and the gradation value "255" at the darkness 100%.

When a print command is detected together with the image data to be printed, the printer driver first performs the resolution converting process and the color converting process described above. Then, with respect to the gradation value of each unit area of the image data on which the color converting process has been performed, for each row area and each ink color, the gradation value after the correction is obtained based on the two stored correction values, and the conversion into image data with the obtained new gradation value is performed. The halftone process and the rasterizing process are performed on the converted image data, and the data is output as the print data to the printer 1. Then, the printer 1 prints the image based on the input image data.

[First Feature in First Embodiment]

With the printing system 700 of the first embodiment, in each of the plurality of correction patterns CP that are printed on paper, the outermost raster line Ls at the front end side has the extending portions L for detecting the inclination of each correction pattern CP, and thus it is possible to detect, for each image, the inclination of the correction pattern CP with respect to paper on which the correction pattern CP is printed. More specifically, with the printing system 700 of the first embodiment, it is possible to detect the inclination of the correction pattern CP that is used for adjustment, and information that is necessary for adjustment can be accurately input or output. Thus, adjustment can be performed better.

Furthermore, with respect to the row areas of an image to be corrected when the image data is corrected so as to suppress darkness non-uniformity between the row areas in which the raster lines along the movement direction are formed, the direction is specified by the direction of the formed raster lines. Thus, an appropriate correction may not be performed unless the direction of the raster lines that are provided in the correction pattern CP for obtaining correction values based on which the correction is performed matches the direction of the row areas of the image to be corrected. Then, the correction values are acquired using measured values of the darkness of the printed correction pattern CP, and thus when the correction pattern CP is at an angle, the correction values of the row area whose direction matches the direction of the raster lines of the image may not be obtained. However, with the printing system 700 of the first embodiment, it is possible to detect the inclination of the correction pattern CP, and thus it is possible to correct the image data as appropriate after detecting the inclination of the correction pattern CP and acquiring appropriate correction values.

Furthermore, with the printing system 700 according to the first embodiment, the nozzles provided in the printer 1 are provided for each of the colors of ink and the nozzles each may have different ejection characteristics, and thus when the correction pattern is printed for each color and the correction values are acquired based on each correction pattern, it is possible to acquire more accurate correction values corresponding to the characteristics of the ink and the characteristics of the nozzles.

Furthermore, the correction pattern CP has the main section M and the extending portions L that are used for adjustment, and the extending portions L are provided on both sides of the main section M in the movement direction of the carriage 31. Thus, the extending portions L emphasize the positional difference caused by the inclination of the main section M, so that it is possible to detect the inclination more easily. Accordingly, it is possible to detect the inclination of the correction pattern CP more accurately.

The extending portions L as the sections to be detected for detecting the inclination of an image are ruled lines along the movement direction of the carriage 31 that is the same direction as the direction in which the raster lines constituting the image including the correction pattern CP are formed, and thus it is possible to accurately detect the inclination of the correction pattern CP.

With the printing system 700 of the first embodiment, in the correction pattern CP, the extending portion L is formed on the extension line of the outermost raster line Ls on the most front end side when the paper is carried, and thus the main section M and the extending portion L are to be printed on the same position in the carrying direction of the paper that is being carried. Thus, disturbance depending on the position on the paper S acts in a similar manner on the main section M and the extending portion L, so that it is possible to detect the inclination of the main section M by detecting the inclination at the extending portion L.

Furthermore, the extending portion is formed when the nozzles are moved in order to form the outermost raster line Ls at the front end side, and thus the extending portion L is formed during a series of operations performed when the outermost raster line Ls at the front end side included in the main section M is formed. Thus, it is possible to detect the inclination of the main section M more accurately by detecting the inclination of the extending portion L.

Furthermore, with the printing system 700 of the first embodiment, the inclination of the correction pattern CP is detected based on the distance in the carrying direction of paper between the extending portion L provided on one side of the main section M in the carriage movement direction and the front end of the paper, and the distance in the carrying direction of the paper between the extending portion L provided on the other side of the main section M and the front end of the paper. Thus, the inclination is detected based on the distance between the extending portion L and the front end of the paper, between the two points with a spacing, interposed therebetween, that is at least wider than the width in the carriage movement direction of the main section M, and thus it is possible to detect the inclination of the correction pattern CP more accurately than in a case where the inclination is detected based on the distance between the raster lines constituting the main section M and the front end of the paper.

Furthermore, with the printing system 700 of the first embodiment, the inclination of the correction pattern CP is detected for each correction pattern CP, the data obtained by reading the correction pattern CP with the scanner 400 is adjusted, for each correction pattern CP, based on the detected inclination, and correction values are obtained. Thus, it is possible to acquire more accurate correction values for each correction pattern CP.

In the first embodiment, an example was described in which the inclination of the correction pattern CP is detected and the rotation process is performed on the image data such that the inclination is eliminated, but a process is also possible in which a tolerance amount (such as a tolerance angle) of the inclination is set in advance, and if the detected inclination is equal to or larger than the tolerance amount, then the rotation process is not performed, and for example, then a user is notified that the inclination is equal to or larger than the tolerance amount by displaying the notification on the display device 704 as a notifying section that is connected to the computer 720. At that time, the notifying section is not limited to the display device 704 that is connected to the computer 720, and it is also possible to use a display section such as a liquid crystal display, a lamp, a buzzer or the like that are provided on the printer 1 and the scanner 400. Furthermore, in addition to the simple notification, information urging that the correction pattern be again printed by the printer 1 or that the correction pattern be again read by the scanner 400 may be notified using the display section.

[Second Feature in First Embodiment]

With the printing system 700 of the first embodiment, the correction pattern CP that is read in order to obtain correction values is an image that is configured by arranging the plurality of raster lines in an intersecting direction, and the outermost raster lines of the correction pattern CP have the extending portions L that extend in an area wider than other raster lines in the movement direction of the carriage 31. Thus, it is possible to easily detect the edges in the sub-scanning direction of the correction pattern CP based on the read darkness data obtained by reading the extending portions L.

Furthermore, in the printer 1, the carriage 31 is provided with a plurality of nozzles for ejecting ink along an intersecting direction of the movement direction of the carriage 31. The correction pattern CP is printed on the paper S by letting ink be ejected from the nozzles based on the image data for printing the correction pattern CP while the carriage 31 is moved, so that it is possible to easily detect the edges in the sub-scanning direction of the correction pattern CP based on the data obtained by reading the row areas in which the raster lines are formed by predetermined nozzles.

In particular, the correction pattern CP is a pattern that is used for adjustment, and thus it is necessary to accurately read the correction pattern CP. The correction pattern CP has the extending portions L, and it is possible to detect the edges of the correction pattern CP based on the data obtained by reading the extending portions L. Accordingly, it is possible to accurately read the read darkness data of the correction pattern CP without including unnecessary data, by detecting the area of the correction pattern CP based on the detected edges of the correction pattern CP.

Furthermore, with the printing system 700 of the first embodiment, the image data for printing images other than the correction pattern CP is corrected based on accurate data obtained by detecting the edges of the correction pattern CP. Thus, in actual printing in which images other than the correction pattern CP are printed, it is possible to print good images by suppressing darkness non-uniformity between the row areas in which the raster lines are formed using the respective nozzles.

Furthermore, the image data indicates the gradation values for the unit areas that are formed on the paper S, that is, for the unit areas, and the scanner 400 reads the darkness of the correction pattern CP that has been printed based on the specific gradation values, as the read darkness data of each of the minimum reading areas for the scanner 400. Thus, it is possible to read, as the read darkness data, the darkness of each of the unit areas of the correction pattern that has been printed based on the gradation values indicated by the image data. More specifically, it is possible to associate the gradation values indicated by the image data with the read darkness data when the scanner 400 reads the printed correction pattern CP.

Furthermore, the reading resolution of the scanner 400 is higher than the print resolution of the printer 1, and thus even in the case of a one-dot raster line printed by the printer 1, the read darkness data exists over a plurality of minimum reading areas in the sub-scanning direction. Thus, it is possible to read the extending portions L constituted by one-dot lines more minutely than the print resolution, and thus it is possible to acquire accurate darkness data by more precisely reading the extending portions L.

In the first example in which the positions of the extending portions L are detected in the first embodiment, the center of gravity positions in the darkness distribution in the sub-scanning direction are detected, of the darkness data of the minimum reading areas arranged side by side in the sub-scanning direction (intersecting direction), and the positions of the extending portions L are detected based on the detected center of gravity positions. Thus, it is highly possible that the positions detected as the center of gravity positions in the darkness distribution in the sub-scanning direction are the extending portions, so that it is possible to easily detect the extending portions L in the sub-scanning direction.

Furthermore, when the outermost raster line is detected, the center of gravity positions in the darkness distribution are detected using the extending portions L that are provided on both sides in the main-scanning direction of the main section M of the correction pattern CP, and thus even in a case where the center of gravity positions detected at both sides of the main section M that is originally to be required are different from each other, it is possible to detect their center as the center of the outermost raster line. Thus, it is possible to make the difference small overall between the center position of the outermost raster line that has been detected and the center position of the outermost raster line that is originally to be detected, in the entire area in the main-scanning direction, and thus it is possible to detect the position of the outermost raster line more precisely.

Incidentally, the center position in the sub-scanning direction of the detected outermost raster line may not match the edge of the minimum reading area. Thus, when in the minimum reading area including the detected center position in the sub-scanning direction of the outermost raster line, the edge closer to the center position is specified as the center of the outermost raster line, then it is possible to more precisely associate the darkness data of the minimum reading area that is to be specified as the outermost raster line, as the darkness data of the outermost raster line. Then, when the edge of the minimum reading area that is positioned away from the edge of the minimum reading area that is specified as the center of the outermost raster line, by the half of the calculated number toward the outer side in the correction pattern CP, is detected as the edge of the correction pattern CP, then it is possible to easily and accurately detect the edge of the correction pattern CP.

Furthermore, if the number of the successive minimum reading areas that are included in the width in the sub-scanning direction of the extending portion L is an odd number, then the minimum reading area including the detected center position in the sub-scanning direction of the outermost raster line is taken as the center minimum reading area, and the edge of the minimum reading area that is positioned away, by the half of the number that is smaller by one than the calculated number of the minimum reading areas of the extending portion, toward the outer side in the correction pattern CP is detected as the edge of the correction pattern CP, and thus it is possible to accurately detect the edge of the correction pattern CP even in a case where the number of the successive minimum reading areas that are included in the width in the sub-scanning direction of the extending portion L is an odd number.

Furthermore, in the second example in which the positions of the extending portions L are detected, in order to detect the area of the correction pattern CP, first, the computer 720 as a controller detects the minimum reading areas in which the read darkness data has its peak, of the read darkness data of the minimum reading areas arranged in the sub-scanning direction in the extending portions L that are provided in the correction pattern CP, and the edges of the correction pattern CP are detected based on the detected minimum reading areas. With respect to the minimum reading areas in which the read darkness data has its peak, the detecting process is easier than a process in which the minimum reading areas are specified based on a predetermined threshold value. Thus, it is possible to easily detect the edges of the correction pattern CP based on the detected minimum reading areas in which the read darkness data has its peak.

Furthermore, when the edges of the correction pattern CP in the sub-scanning direction are detected, the read darkness data corresponding to the area of the correction pattern CP in the sub-scanning direction is extracted, and the extracted read darkness data is associated with each of the unit areas of the correction pattern CP, and thus it is possible to acquire accurate read darkness data for each of the unit areas in the sub-scanning direction, that is, for each of the row areas.

===Other Examples in the First Embodiment===

In the foregoing example, mainly the printing system was described, but it goes without saying that the disclosure of, for example, the printer 1, printing apparatuses, and printing methods is included.

Furthermore, a printing system as one embodiment was described as an example, but the foregoing embodiment is for the purpose of facilitating the understanding of the first example of the present invention and is not to be interpreted as limiting the present invention. The invention can of course be altered and improved without departing from the gist thereof and includes functional equivalents. In particular, the embodiments noted below are also included in the present invention.

Furthermore, in the foregoing example, a printing system and a printing method for correcting darkness non-uniformity that occurs in the paper carrying direction were described, but it is also possible to apply the correction to darkness non-uniformity that is in the shape of vertical stripes that occurs in the direction along the carrying direction caused by mechanisms constituting the printer 1 by vibrations accompanying the movement of the carriage on which the head is mounted, for example.

<Regarding the Printer>

In the foregoing example, the printer 1 was described as a printing section, but this is not a limitation. For example, technology similar to that of this embodiment also may be applied to various types of storing devices that use inkjet technology, including color filter manufacturing devices, dyeing devices, fine processing devices, semiconductor manufacturing devices, surface processing devices, three-dimensional shape forming machines, liquid vaporizing devices, organic EL manufacturing devices (particularly macromolecular EL manufacturing devices), display manufacturing devices, film formation devices, and DNA chip manufacturing devices. Moreover, methods and manufacturing methods of these are also within the scope of application.

<Regarding the Ink>

In the foregoing example, a dye ink or a pigment ink was ejected from the nozzles of the printer 1. However, the ink that is ejected from the nozzles is not limited to such inks.

<Regarding the Nozzles>

In the foregoing example, ink was ejected using piezoelectric elements. However, the mode for ejecting ink is not limited to this. Other modes such as a mode for generating bubbles in the nozzles through heat also may be employed.

<Regarding the Carriage Movement Direction in which Ink is Ejected>

The foregoing example was made using, as an example, single-direction printing in which ink is ejected only when the carriage 31 is moving forward, but this is not a limitation, and it is also possible to perform so-called bi-directional printing in which ink is ejected during the bi-directional movement in which the carriage 31 is moving forward and backward.

<Regarding the Ink Colors Used for Printing>

The foregoing example was described using, as an example, multicolor printing in which dots are formed by ejecting ink of four colors, namely cyan (C), magenta (M), yellow (Y), and black (K) onto the paper S, but the ink colors are not limited to these. For example, it is also possible to use other inks in addition to these, such as light cyan (LC) and light magenta (LM).

Alternatively, it is also possible to perform single-color printing using only one of these four ink colors.

<Regarding the Correction Pattern>

In the foregoing example, a correction pattern was described using, as an example, the correction pattern that is used when the image data is corrected so as to suppress darkness non-uniformity between the row areas in which dot rows along the movement direction of the carriage are formed, but the correction pattern may be correction patterns that are used when other corrections such as a correction of the carrying amount of a medium and a correction of the print magnification are performed. However, since with respect to the row areas to be corrected when the image data is corrected so as to suppress darkness non-uniformity between the row areas, the direction is specified by the direction of the dot rows that are formed, it is necessary to adjust, in particular, the inclination of the printed correction pattern, and when the image data is corrected so as to suppress darkness non-uniformity between the row areas, it is necessary to accurately detect the area of the image in the carrying direction. Thus, the present invention is particularly effective for the correction pattern that is used when the image data is corrected so as to suppress darkness non-uniformity between the row areas.

Second Embodiment

===Regarding the Correction Value Setting System===

<Outline of the Correction Value Setting System>

Figure 25:
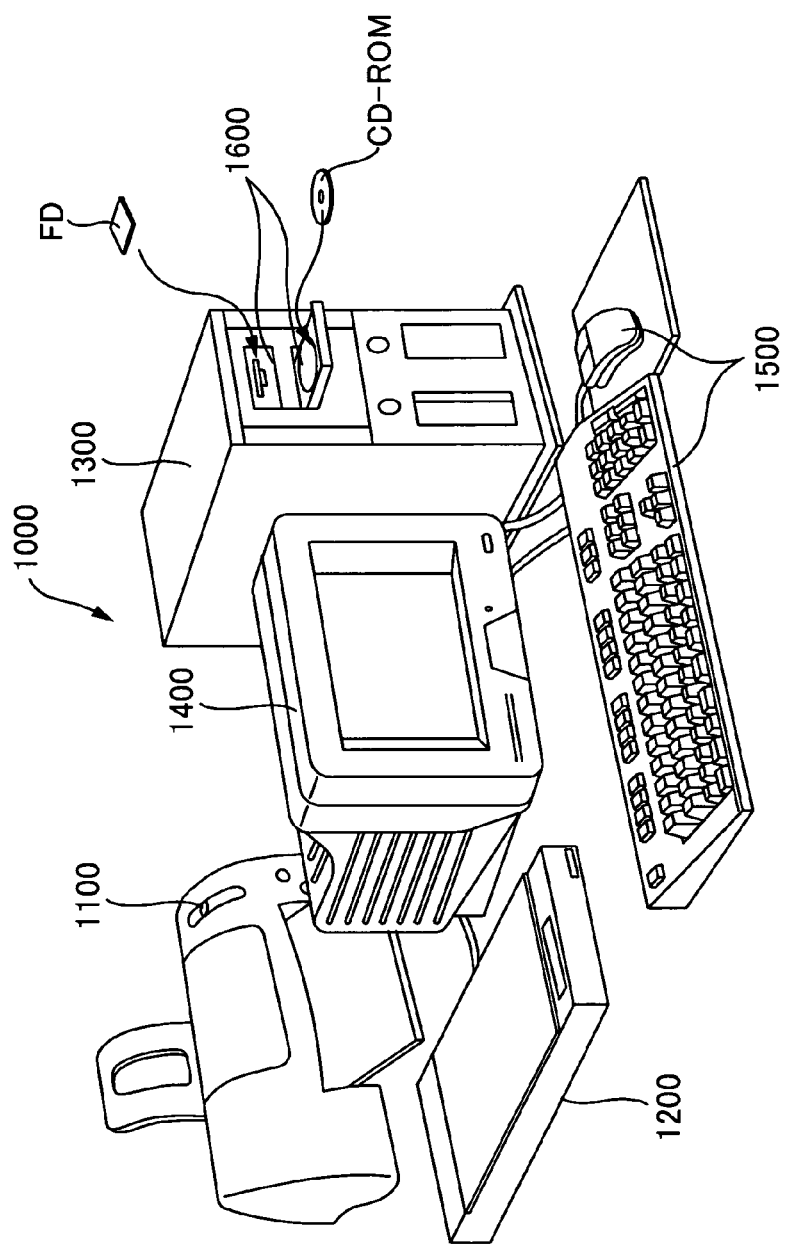
FIG. 25 is a view illustrating the configuration of a correction value setting system of a second embodiment.

FIG. 25 is a view illustrating the configuration of a correction value setting system 1000. The correction value setting system 1000 is a system for setting the correction values for correcting the darkness of a print image in a printing apparatus, and is installed in, for example, a plant. It should be noted that it is possible for a user to construct the correction value setting system 1000. The correction value setting system 1000 in this case is a system for setting new correction values (that is, for updating the correction values). Furthermore, the printing apparatus is an apparatus for printing an image on a medium, represented by printers, plotters, and facsimiles. For the sake of convenience, the following description is made using, as an example, a printer 1100, that is a typical printing apparatus and the paper S (see FIG. 32), that is a typical medium.

The correction value setting system 1000 includes at least a darkness reading device for reading the darkness of a test pattern, and a correction value setting control device communicably connected to the darkness reading device and the printing apparatus for which the correction values are to be set. The correction value setting system 1000 shown as an example in FIG. 25 has a scanner 1200 as the darkness reading device, a computer 1300 as the correction value setting control device, a display device 1400, an input device 1500, and a recording and reproducing device 1600. In FIG. 25, the printer 1100 is shown as the printing apparatus for which the correction values are set. Furthermore, a keyboard and a mouse are shown as the input device 1500, and a flexible disk drive and a CD-ROM drive are shown as the recording and reproducing device 1600. The following is a description concerning the devices constituting the correction value setting system 1000.

<Regarding the Computer 1300>

Figure 26:
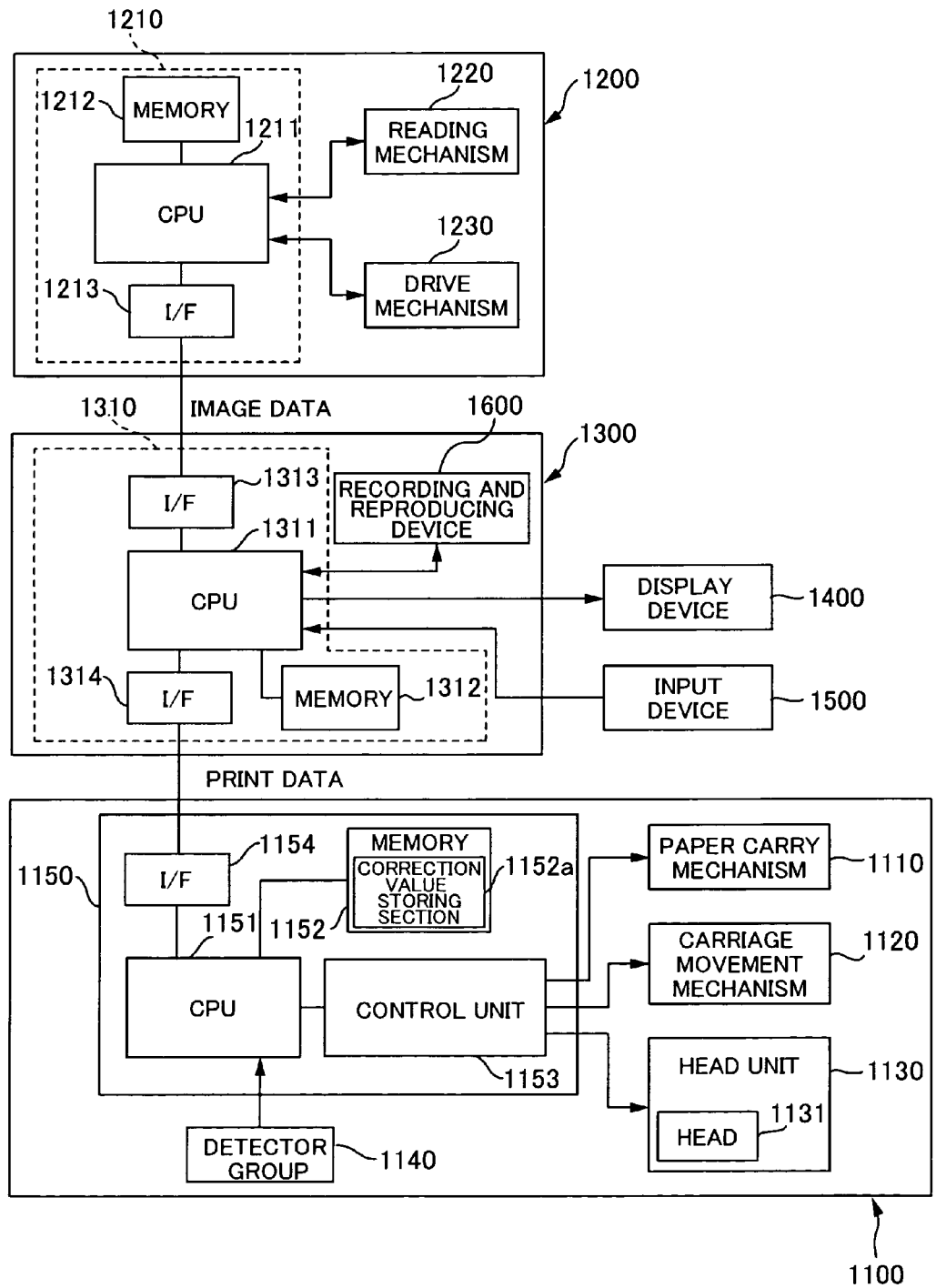
FIG. 26 is a block diagram illustrating the overall configuration of the correction value setting system of the second embodiment.
Figures 27, 28:
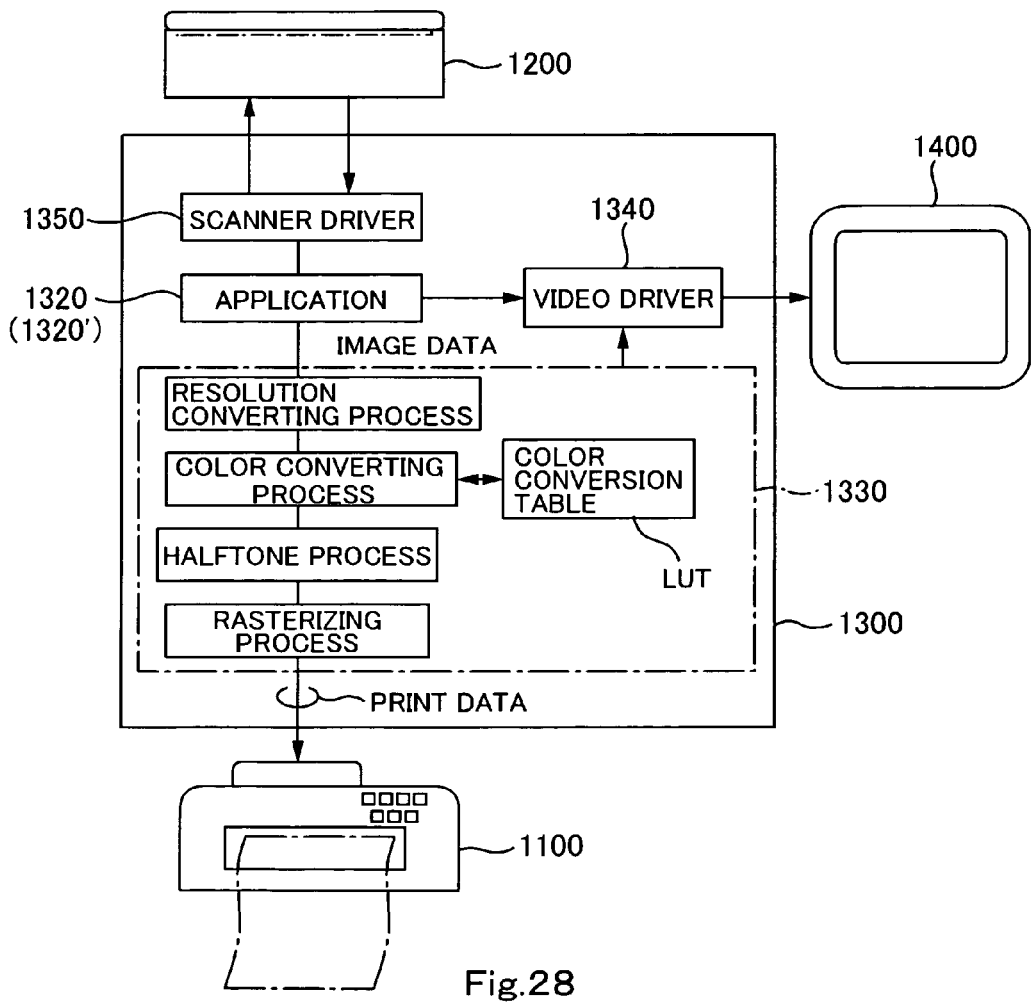
FIG. 27 is a diagram for illustrating a read darkness data table of the second embodiment.
FIG. 28 is a diagram illustrating a process based on a printer driver of the second embodiment.
Figure 29:
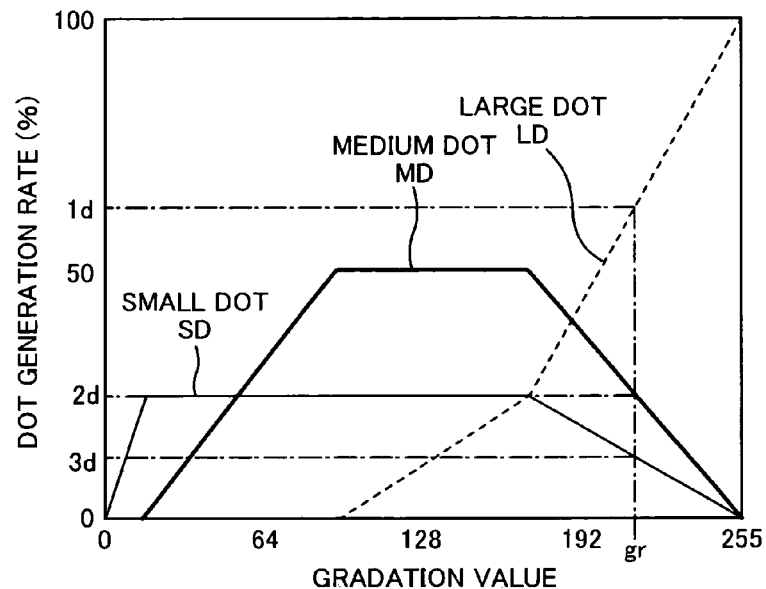
FIG. 29 is a diagram illustrating the relationship between a gradation value and a dot generation rate of the second embodiment.

First, the computer 1300 is described. Here, FIG. 26 is a block diagram illustrating the overall configuration of the correction value setting system 1000. FIG. 27 is a diagram for illustrating a read darkness data table that is set at a part of a memory 1312 provided in the computer 1300. FIG. 28 is a diagram illustrating a process based on a printer driver 1330. FIG. 29 is a diagram illustrating the relationship between a gradation value and a dot generation rate.

The computer 1300 is in charge of control in the correction value setting system 1000. For example, the computer 1300 controls the scanner 1200 to acquire the darkness of an image printed on the paper S, and controls the printer 1100 to print an image on the paper S or to store the correction values in a memory 1152 (correction value storing section 1152a) that is provided in the printer 1100. Thus, the computer 1300 is communicably connected to the scanner 1200 and the printer 1100.

The computer 1300 has a host-side controller 1310. The host-side controller 1310 has a CPU 1311, a memory 1312, a first interface section 1313, and a second interface section 1314. The CPU 1311 is an arithmetic processing unit for performing the overall control of the computer 1300. The CPU 1311 is communicably connected to the recording and reproducing device 1600, the display device 1400, and the input device 1500. It should be noted that the recording and reproducing device 1600 is attached to a casing of the computer 1300. The memory 1312 is for securing, for example, areas for storing a computer program that is used by the CPU 1311 and work areas, and is constituted by, for example, a RAM, an EEPROM, a ROM, or a magnetic disk device. The first interface section 1313 is interposed between the scanner 1200 and the computer 1300, and exchanges data therebetween. The second interface section 1314 is interposed between the printer 1100 and the computer 1300, and exchanges data therebetween.

Examples of a computer program installed on the memory 1312 include an application program 1320, the printer driver 1330, a video driver 1340, and a scanner driver 1350. The application program 1320 is, in the broad sense, a computer program for letting the computer 1300 perform a desired operation. The application program 1320 in the correction value setting system 1000 serves as a computer program (also referred to as "correction value setting program 1320") for the sake of convenience) for letting the computer 1300 function as the correction value setting control device. The printer driver 1330 is a computer program for letting the computer 1300 operate the printer 1110. The video driver 1340 is a computer program for displaying display data from the application program 1320 and the printer driver 1330 on the display device 1400. The scanner driver 1350 is a computer program for letting the computer 1300 operate the scanner 1200. Furthermore, as shown in FIG. 27, in the correction value setting system 1000, a part of the area of the memory 1312 that is provided in the host-side controller 1310 is used as a data table for storing the read darkness.

The CPU 1311 performs various types of control in accordance with the computer program stored in the memory 1312. For example, control is performed for acquiring the darkness of an image printed on the paper S using the correction value setting program 1320' and the scanner driver 1350. Furthermore, control is performed for printing an image on the paper S using the correction value setting program 1320' and the printer driver 1330.

In control for printing an image, the CPU 1311 performs, for example, the following processes. When a print instruction is given via the user interface, the CPU 1311 converts image data into print data. Herein, the print data is data in a format that can be interpreted by the printer 1100, and has pixel data and various types of command data. The command data is data for instructing the printer 1100 to perform a specific operation, and is, for example, data to instruct supply of paper, data indicating the carrying amount, or data to instruct discharge of paper. The CPU 1311 performs the resolution converting process, the color converting process, the halftone process, the rasterizing process and others in order to convert the image data into the print data. Furthermore, the pixel data is data (data such as the color and the size of a dot) relating to a dot formed on paper, and is determined for each unit area. "Unit area" refers to a rectangular area that is virtually defined on a medium such as paper, and its size and shape are determined in accordance with the print resolution. For example, if the print resolution is 720 dpi (movement direction)×720 dpi (carrying direction), then the unit area is a square area with a size of about 35.28 μm×35.28 μm (≈1/720 inch×1/720 inch). Furthermore, if the print resolution is 360 dpi×720 dpi, then the unit area is an oblong area with a size of about 70.56 μm×35.28 μm (≈1/360 inch×1/720 inch). When ink (ink in the shape of a droplet; also referred to as "ink droplet") is ejected in an ideal state, the ink lands on the center position of this unit area, and then the ink spreads on the medium, and a dot is formed on the unit area.

The resolution converting process is a process for converting image data (such as text data and image data) into the resolution (spacing between dots when printing; also referred to as "print resolution") when an image is printed on the paper S. The color converting process is a process for converting each of the RGB pixel data of RGB image data into data indicating gradation values of multiple grades (such as 256 grades) expressed in CMYK color space. Herein, C, M, Y and K stand for colors of ink. More specifically, C stands for cyan, M stands for magenta, Y stands for yellow, and K stands for black. The color converting process is performed by referring to a table (color conversion lookup table LUT) in which RGB gradation values are associated with CMYK gradation values. The halftone process is a process for converting CMYK pixel data having gradation values of multiple grades into CMYK pixel data having gradation values of a few grades that can be expressed by the printer 1100. For example, with the halftone process, CMYK pixel data indicating gradation values of 256 grades is converted into two-bit CMYK pixel data indicating gradation values of four grades. The two-bit CMYK pixel data is data that indicates, for each color, "no dot formation" (binary value "00"), "small dot formation" (binary value "01"), "medium dot formation" (binary value "10"), and "large dot formation" (binary value "11"), for example. The generation rate of each of the dots is determined in accordance with the gradation values. For example, as shown in FIG. 29, in a pixel specifying a gradation value gr, the probability that a large dot is generated is 1d, the probability that a medium dot is generated is 2d, and the probability that a small dot is generated is 3d. As the halftone process, for example, dithering, γ-correction, or error diffusion is used. The rasterizing process is a process for rearranging the CMYK image data on which the halftone process has been performed into the data order in which it is to be transferred to the printer 1100. Data on which the rasterizing process has been performed is output to the printer 1100 as the print data described above.

<Regarding the Scanner 1200>

Figure 30:
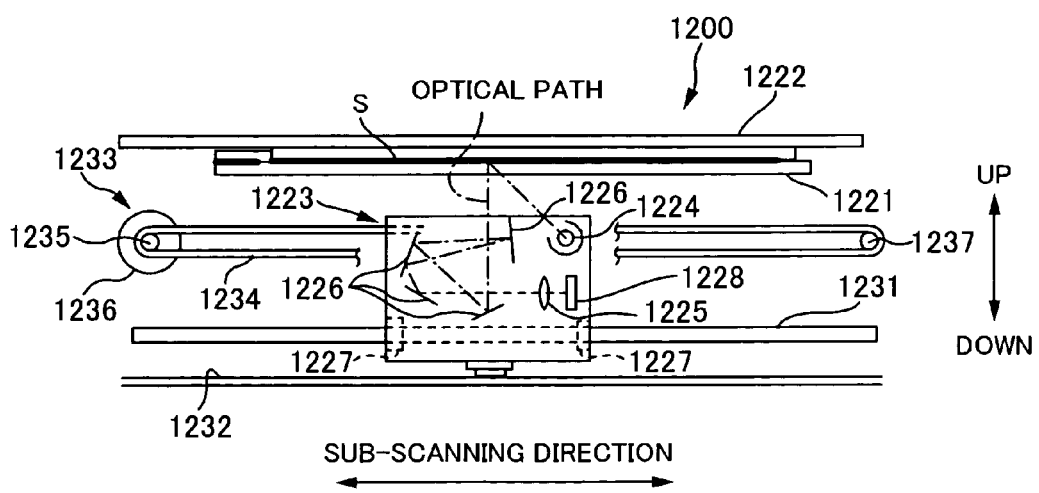
FIG. 30 is a front view for illustrating the internal configuration of a scanner of the second embodiment.
Figure 31:
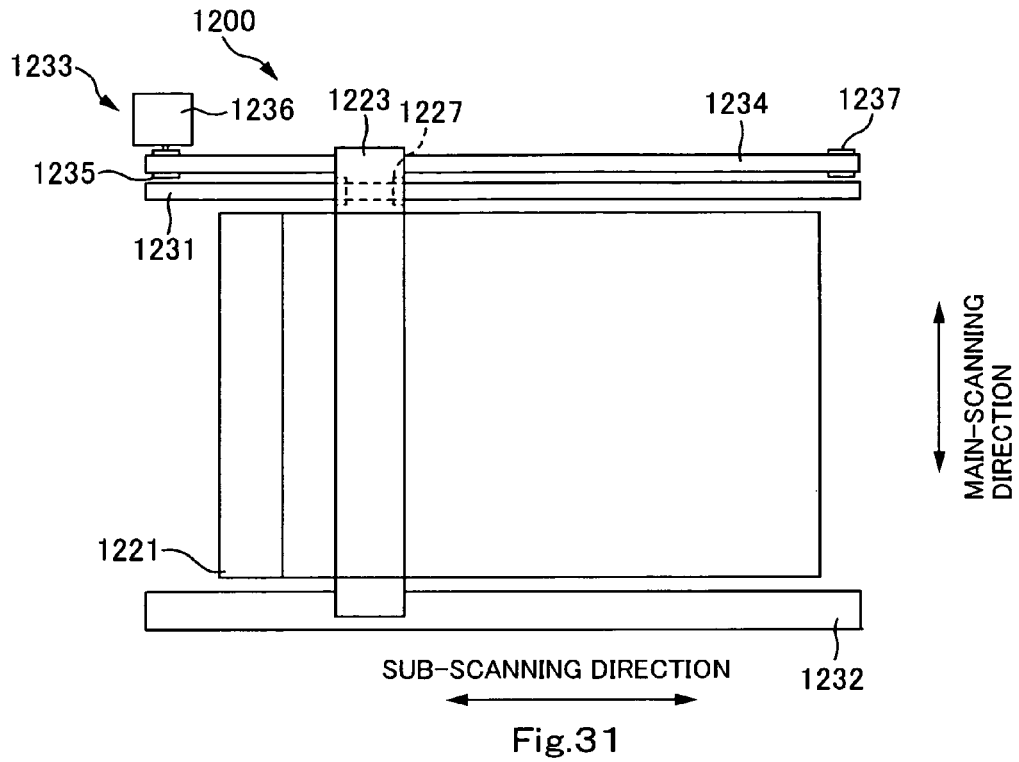
FIG. 31 is a plan view for illustrating the configuration of the scanner of the second embodiment.

Next, the scanner 1200 is described. Here, FIG. 30 is a front view for illustrating the internal configuration of the scanner 1200. FIG. 31 is a plan view for illustrating the configuration of the scanner 1200. It should be noted that in FIG. 31, a document platen cover 1222 has been removed for the sake of convenience. In the following description, a reference is also made to FIG. 26. As shown in FIG. 26, the scanner 1200 has a scanner-side controller 1210, a reading mechanism 1220, and a drive mechanism 1230.

The scanner-side controller 1210 has a CPU 1211, a memory 1212, and an interface section 1213. The CPU 1211 is an arithmetic processing unit for performing the overall control of the scanner 1200. The CPU 1211 is communicably connected to the reading mechanism 1220 and the drive mechanism 1230. The memory 1212 is for securing, for example, areas for storing a computer program that is used by the CPU 1211 and work areas, and is constituted by, for example, a RAM, an EEPROM, or a ROM. The interface section 1213 is interposed between the computer 1300 and the scanner 1200, and exchanges data therebetween.

As shown in FIGS. 30 and 31, the reading mechanism 1220 has a document platen glass 1221, the document platen cover 1222, and a reading carriage 1223. The document platen glass 1221 is a transparent glass plate on which a document (such as the paper S on which an image has been printed) is placed. The document platen cover 1222 is for pressing the reading surface of the document toward the document platen glass 1221. The reading carriage 1223 corresponds to a reading section for reading the darkness of the document. The reading carriage 1223 is moved in a predetermined direction (hereinafter, also referred to as "sub-scanning direction") along the document platen glass 1221 while keeping a constant spacing between the reading carriage 1223 and the reading surface of the document in opposition thereto via the document platen glass 1221. The reading carriage 1223 has an exposure lamp 1224, a lens 1225, a plurality of mirrors 1226, a guide support section 1227, and a CCD image sensor 1228. The exposure lamp 1224 is a light source when reading a document. The lens 1225 is for focusing the light reflected by the document. The mirrors 1226 are for guiding the reflected light to the lens 1225. The guide support section 1227 is a portion into which a regulating guide 1231 is inserted. The CCD image sensor 1228 is for receiving the reflected light that has been focused by the lens 1225. In the scanner 1200 shown as an example, the CCD image sensor 1228 is configured as a so-called linear sensor. More specifically, the CCD image sensor 1228 has a plurality of photodiodes for performing a photoelectric conversion. The photodiodes are arranged in a line. More specifically, the photodiodes are arranged in a direction (hereinafter, also referred to as "main-scanning direction") that is substantially perpendicular to the sub-scanning direction in which the reading carriage 1223 is moved. When an image illustrated on the document is read, each of the photodiodes detects the amount of light that is irradiated within a predetermined time. Accordingly, the darkness data indicating the darkness of the image is acquired.

The drive mechanism 1230 has the regulating guide 1231, a support rail 1232, and a drive section 1233. The regulating guide 1231 is for regulating the movement direction of the reading carriage 1223. The support rail 1232 is for supporting the reading carriage 1223. The drive section 1233 is for moving the reading carriage 1223 in the sub-scanning direction, and has a timing belt 1234, a drive pulley 1235, a pulse motor 1236, and an idler pulley 1237. The timing belt 1234 is a ring-shaped component whose end portion is fixed on the reading carriage 1223, and is extended between the drive pulley 1235 and the idler pulley 1237. The drive pulley 1235 is meshed with the timing belt 1234, and is attached to the rotation shaft of the pulsemotor 1236. The pulse motor 1236 serves as a drive source when moving the reading carriage 1223, and is disposed on one side in the sub-scanning direction. The idler pulley 1237 is for applying the tensile force to the timing belt 1234, and is disposed on the other side, in the sub-scanning direction, opposite to the drive pulley 1235. The reading carriage 1223 moves along the regulating guide 1231 as the reading carriage 1223 is carried by the timing belt 1234. At that time, the operation of the pulse motor 1236 is controlled by the scanner-side controller 1210.

Furthermore, the scanner 1200 is provided with a home position sensor (not shown). The home position sensor is for detecting that the reading carriage 1223 has reached a starting position (hereinafter, also referred to as "home position") of the reading operation. The home position sensor is constituted by, for example, a transmission optical sensor. The position of the reading carriage 1223 is controlled by the scanner-side controller 1210 using the home position as the reference. For example, the position of the reading carriage 1223 is controlled based on the number of pulses given to the pulse motor 1236 and the movement amount of the reading carriage 1223 corresponding to one pulse, after being detected by the home position sensor.

In the scanner 1200 configured as above, light of the exposure lamp 1224 is irradiated on the reading surface of the document, and the reflected light is guided via the mirrors 1226 and the lens 1225 to the CCD image sensor 1228. Furthermore, the reading carriage 1223 is moved along the document platen glass 1221 (that is, the reading surface of the document). The darkness is read with respect to the document for the distance over which the reading carriage 1223 has moved within one period, by acquiring the voltage that is output from the CCD image sensor 1228 in a predetermined period.

===Regarding the Printer 1100===

<Regarding the Configuration>

Figure 32:
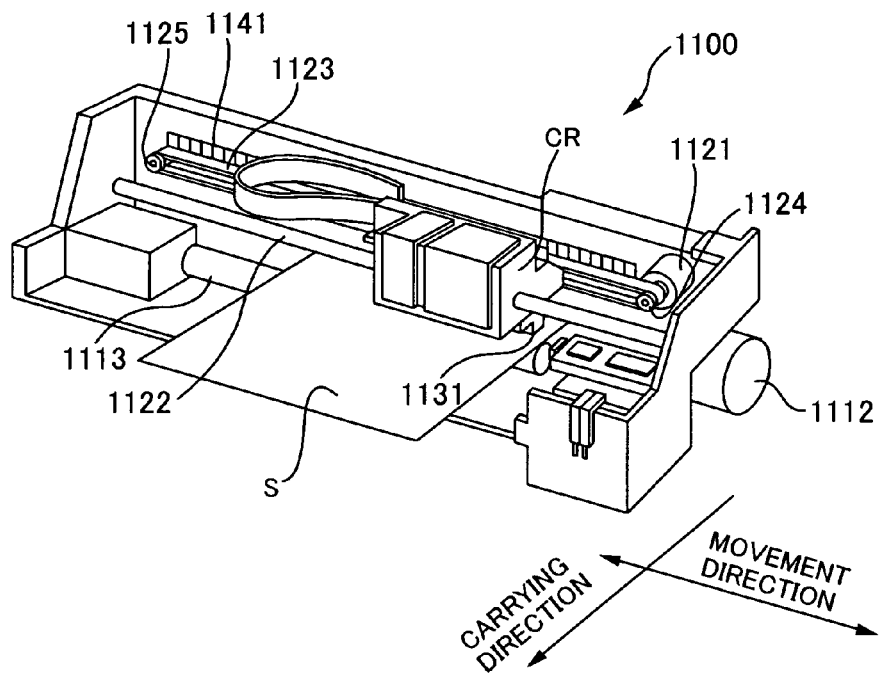
FIG. 32 is a perspective view illustrating the internal configuration of a printer of the second embodiment.
Figure 33:
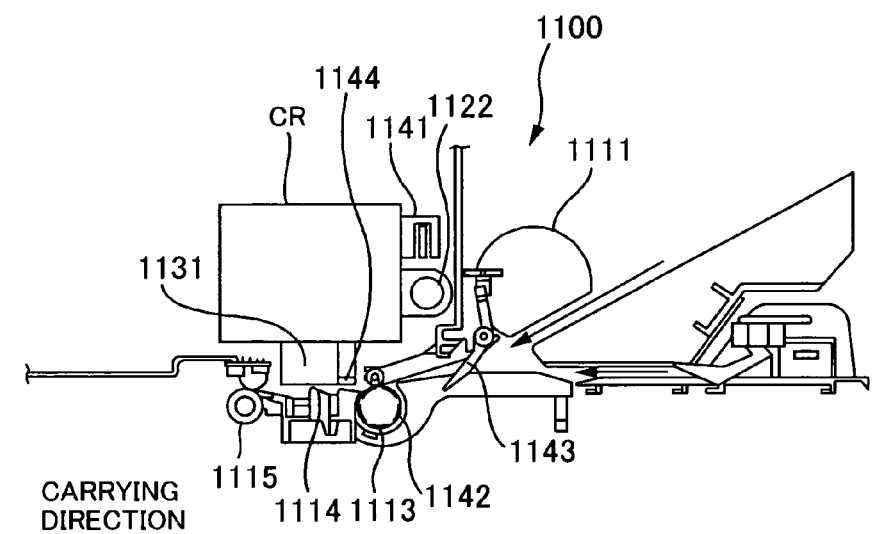
FIG. 33 is a side view illustrating the internal configuration of the printer of the second embodiment.
Figure 34:
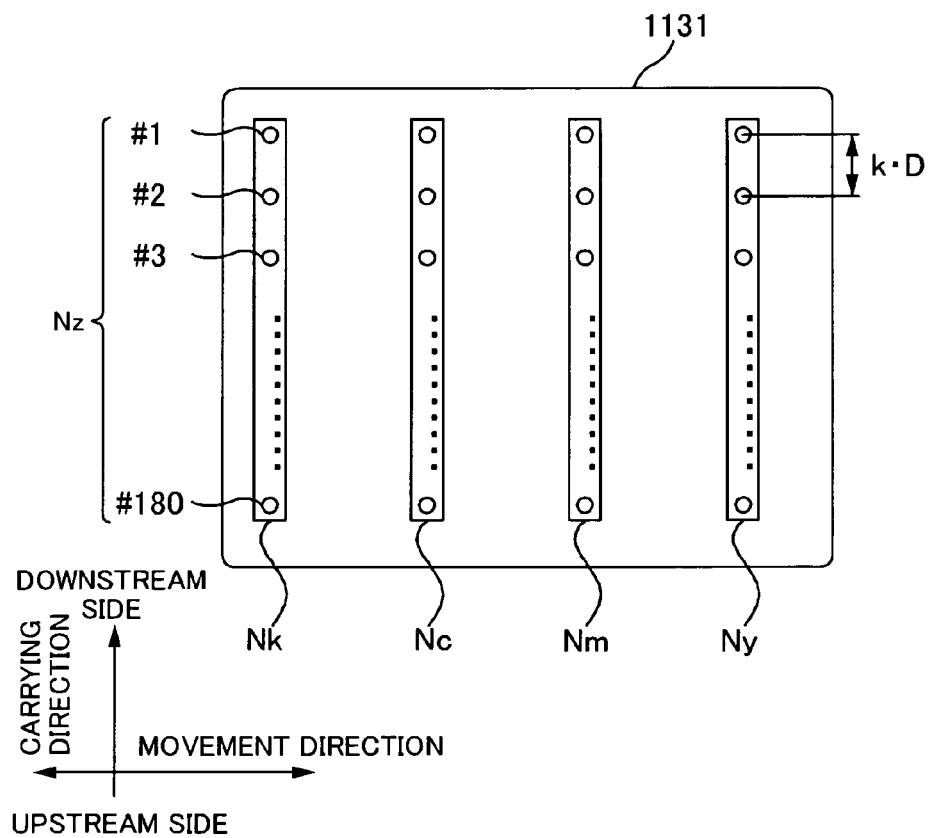
FIG. 34 is a diagram illustrating the arrangement of nozzles of the second embodiment.

Next, the printer 1100 is described. Here, FIG. 32 is a perspective view illustrating the internal configuration of the printer 1100. FIG. 33 is a side view illustrating the internal configuration of the printer 1100. FIG. 34 is a diagram illustrating the arrangement of nozzles Nz that are provided at a head 1131. FIG. 35 is a diagram for illustrating a part of the area of the memory 1152 that is provided in a printer-side controller 1150. In the following description, a reference is also made to FIG. 26.

As described above, the printer 1100 corresponds to a printing apparatus for printing an image on a medium such as the paper S, cloth, film, or OHP paper. As shown in FIG. 26, the printer 1100 has a paper carry mechanism 1110, a carriage movement mechanism 1120, a head unit 1130, a detector group 1140, and the printer-side controller 1150. The printer 1100 that has received print data from the computer 1300 that is an external device controls the sections to be controlled, that is, the paper carry mechanism 1110, the carriage movement mechanism 1120, ant the head unit 1130 using the printer-side controller 1150. At that time, each of the detectors of the detector group 1140 monitor conditions inside the printer 1100. Then, the detection result is output by each of the detectors to the printer-side controller 1150. The printer-side controller 1150 that has received the detection result from each of the detectors controls the sections to be controlled based on the detection result.

As shown in FIGS. 32 and 33, the paper carry mechanism 1110 is for sending the paper S to a printable position and for carrying the paper S by a predetermined carrying amount in the carrying direction. Herein, the carrying direction is a direction that intersects the movement direction of a carriage CR described next. The paper carry mechanism 1110 has a paper supply roller 1111, a carry motor 1112, a carry roller 1113, a platen 1114, and a paper discharge roller 1115. The paper supply roller 1111 is a roller for automatically sending the paper S that has been inserted into a paper insert opening into the printer 1100, and has a D-shaped cross-section in this example. The carry motor 1112 is a motor for carrying the paper S in the carrying direction, and is constituted by, for example, a DC motor. The operation of the carry motor 1112 is controlled by the printer-side controller 1150. The carry roller 1113 is a roller for carrying the paper S that has been sent by the paper supply roller 1111 up to a printable area. The operation of the carry roller 1113 is also controlled by the carry motor 1112. The platen 1114 is a component for supporting the paper S that is being printed, from the rear face side of the paper S. The paper discharge roller 1115 is a roller for carrying the paper S on which printing has ended.

The carriage movement mechanism 1120 is a mechanism for moving, in the movement direction, the carriage CR to which the head unit 1130 is attached. The movement direction includes an orientation from one side to the other side, and an orientation from the other side to the one side. The head unit 1130 has the head 1131 as the print head, and the head 1131 has the nozzles Nz (see FIG. 34) for ejecting ink. Thus, as the carriage CR moves, the head 1131 and the nozzles Nz also move in the movement direction of the carriage CR. More specifically, the movement direction of the carriage CR corresponds to the movement direction of the head 1131, and also corresponds to the movement direction of the nozzles Nz. Hereinafter, the movement direction of the carriage CR, the head 1131, and the nozzles Nz is also referred to as "movement direction" in short.

The carriage movement mechanism 1120 has a carriage motor 1121, a guide shaft 1122, a timing belt 1123, a drive pulley 1124, and an idler pulley 1125. The carriage motor 1121 corresponds to a drive source for moving the carriage CR. The operation of the carriage motor 1121 is also controlled by the printer-side controller 1150. The drive pulley 1124 is attached to a rotation shaft of the carriage motor 1121. The drive pulley 1124 is disposed on one end side in the movement direction. The idler pulley 1125 is disposed on the other end side, in the movement direction, opposite to the drive pulley 1124. The timing belt 1123 is a ring-shaped component whose end portion is fixed on the carriage CR, and is extended between the drive pulley 1124 and the idler pulley 1125. The guide shaft 1122 is a rod-shaped component for supporting the carriage CR such that the carriage CR can move. The guide shaft 1122 is attached along the movement direction. Thus, when the carriage motor 1121 operates, the carriage CR moves in the movement direction along the guide shaft 1122.

The head unit 1130 is for ejecting ink toward the paper S, and has the head 1131. As shown in FIG. 34, the nozzles Nz for ejecting ink are provided on the lower face of the head 1131. The nozzles Nz are divided into groups based on the type of ink to be ejected, and each of the groups constitutes a nozzle row. The head 1131 shown as an example has a black ink nozzle row Nk, a cyan ink nozzle row Nc, a magenta ink nozzle row Nm, and a yellow ink nozzle row Ny. Each of the nozzle rows is provided with n (for example, n=180) nozzles Nz. In each of the nozzle rows, the nozzle groups are provided at a constant spacing (nozzle pitch: k·D) along the carrying direction. Herein, D is the minimum dot pitch in the carrying direction, that is, the spacing of dots formed on the paper S at the highest resolution. Also, k is a coefficient indicating the relationship between the minimum dot pitch D and the nozzle pitch, and is set to an integer of 1 or larger. For example, if the nozzle pitch is 180 dpi ($\frac{1}{180}$ inch) and the dot pitch in the carrying direction is 720 dpi ($\frac{1}{720}$ inch), then k=4. In the example shown in the diagram, the nozzles Nz of each of the nozzle rows are assigned numbers (#1 to #180) that become smaller toward the nozzles Nz on the downstream side. More specifically, the nozzle Nz (#1) is positioned on the downstream side of the nozzle Nz (#180) in the carrying direction, that is, on the side closer to the front end of the paper S than the nozzle Nz (#180).

Furthermore, in the printer 1100, a plurality of types of ink in various amounts can be individually ejected from each of the nozzles Nz. For example, it is possible to eject three types of ink droplets, namely a large ink droplet in the amount at which a large dot can be formed, a medium ink droplet in the amount at which a medium dot can be formed, and a small ink droplet in the amount at which a small dot can be formed, with respect to the pixel. In this example, it is possible to perform four types of control, namely no dot formation corresponding to the pixel data "00", formation of a small dot corresponding to the pixel data "01", formation of a medium dot corresponding to the pixel data "10", and formation of a large dot corresponding to the pixel data "11". In other words, it is possible to perform recording in four gradations.

The detector group 1140 is for monitoring conditions in the printer 1100. The detector group 1140 includes, for example, a linear encoder 1141, a rotary encoder 1142, a paper detector 1143, and a paper width detector 1144. The linear encoder 1141 is for detecting the position of the carriage CR in the movement direction. The rotary encoder 1142 is for detecting the rotation amount of the carry roller 1113. The paper detector 1143 is for detecting the position of the front end of the paper S to be printed. The paper width detector 1144 is for detecting the width of the paper S to be printed.

The printer-side controller 1150 is for controlling the printer 1100. The printer-side controller 1150 has a CPU 1151, the memory 1152, a control unit 1153, and an interface section 1154. The CPU 1151 is an arithmetic processing unit for performing the overall control of the printer. The memory 1152 is for securing, for example, areas for storing a program of the CPU 1151 and work areas, and is constituted by a storage element such as a RAM, an EEPROM, and a ROM. The CPU 1151 controls the sections to be controlled via the control unit 1153 in accordance with the program stored in the memory 1152. In this example, as shown in FIG. 35, various types of information are stored in a part of the area of the memory 1152. For example, the number of row areas (described later) in each processing section and the correction values in each processing section are stored. The interface section 1154 is interposed between the computer 1300 that is an external device and the printer 1100, and sends and receives data therebetween.

<Regarding the Printing Operation>

Figure 36:
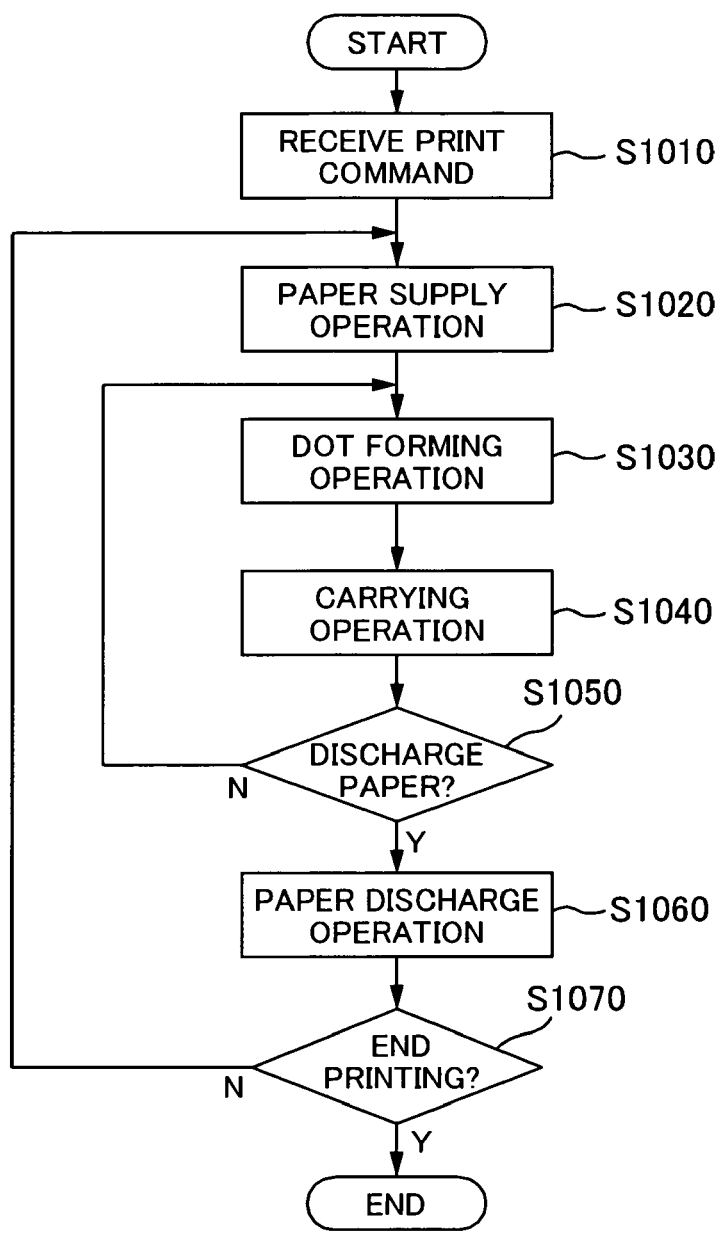
FIG. 36 is a flowchart illustrating processes during printing in the second embodiment.

FIG. 36 is a flowchart illustrating processes during printing. The processes described below are performed by the printer-side controller 1150 controlling the sections to be controlled, in accordance with the computer programs stored in the memory 1152. Thus, this computer program has codes for performing each of the processes.

When a print command in the print data is received (S1010), the printer-side controller 1150 performs a paper supply operation (S1020), a dot forming operation (S1030), a carrying operation (S1040), a paper discharge determination (S1050), a paper discharge operation (S1060), and a print ending determination (S1070) in this order. The paper supply operation is an operation for moving the paper S that is to be printed so as to be positioned at a print starting position (so-called print start position). The dot forming operation is an operation for forming dots on the paper S. In the dot forming operation, the printer-side controller 1150 drives the carriage motor 1121 and outputs control signals to the head 1131. The carrying operation is an operation for moving the paper S in the carrying direction. Through this carrying operation, it is possible to form dots at a position different from the position of dots that have been formed in the preceding dot forming operation. The paper discharge determination is an operation for determining whether or not the paper S that is being printed is to be discharged. The paper discharge operation is a process for discharging the paper S, and is performed if the determination result in the preceding paper discharge determination is "discharge paper". The print ending determination is a determination of whether or not to continue the printing.

Herein, an image is printed by repeating the dot forming operation (S1030) and the carrying operation (S1040). In the dot forming operation, ink is intermittently ejected from the head 1131 (nozzles Nz) moving in the movement direction. More specifically, the printer-side controller 1150 lets ink be ejected from the head 1131 based on the pixel data included in the print data while moving the carriage CR by driving the carriage motor 1121. When ink ejected from the head 1131 lands on the paper surface, dots are formed on the paper. Ink is intermittently ejected while the head 1131 is moving, and thus on paper, a plurality of dots are formed so as to be arranged in the movement direction. More specifically, on paper, a dot row (hereinafter, also referred to as "raster line") constituted by a plurality of dots along the movement direction is formed. Accordingly, it can be said that an image printed on the paper S is constituted by a plurality of raster line arranged adjacent in the carrying direction.

===Regarding the Print Mode===

<Regarding the Interlaced Printing>

As described above, in the printer 1100, an image is printed by letting ink be intermittently ejected from the nozzles Nz while the head 1131 is moved in the movement direction. Incidentally, the head 1131 described above has an extremely fine shape. Thus, unevenness occurs between the components of the nozzles Nz and others depending on the processing and assembling. Due to this unevenness, the characteristics (hereinafter, also referred to as "ejection characteristics") of ink such as the flight path and the ejection amount become uneven. In order to moderate such unevenness in the ejection characteristics, printing in the interlaced mode (hereinafter, also referred to as "interlaced printing") is performed. "Interlaced printing" refers to printing in which a raster line that is not recorded is interposed between raster lines that are recorded in one pass. It should be noted that "pass" refers to one dot forming operation, and "pass n" refers to the n-th dot forming operation.

Figure 37:
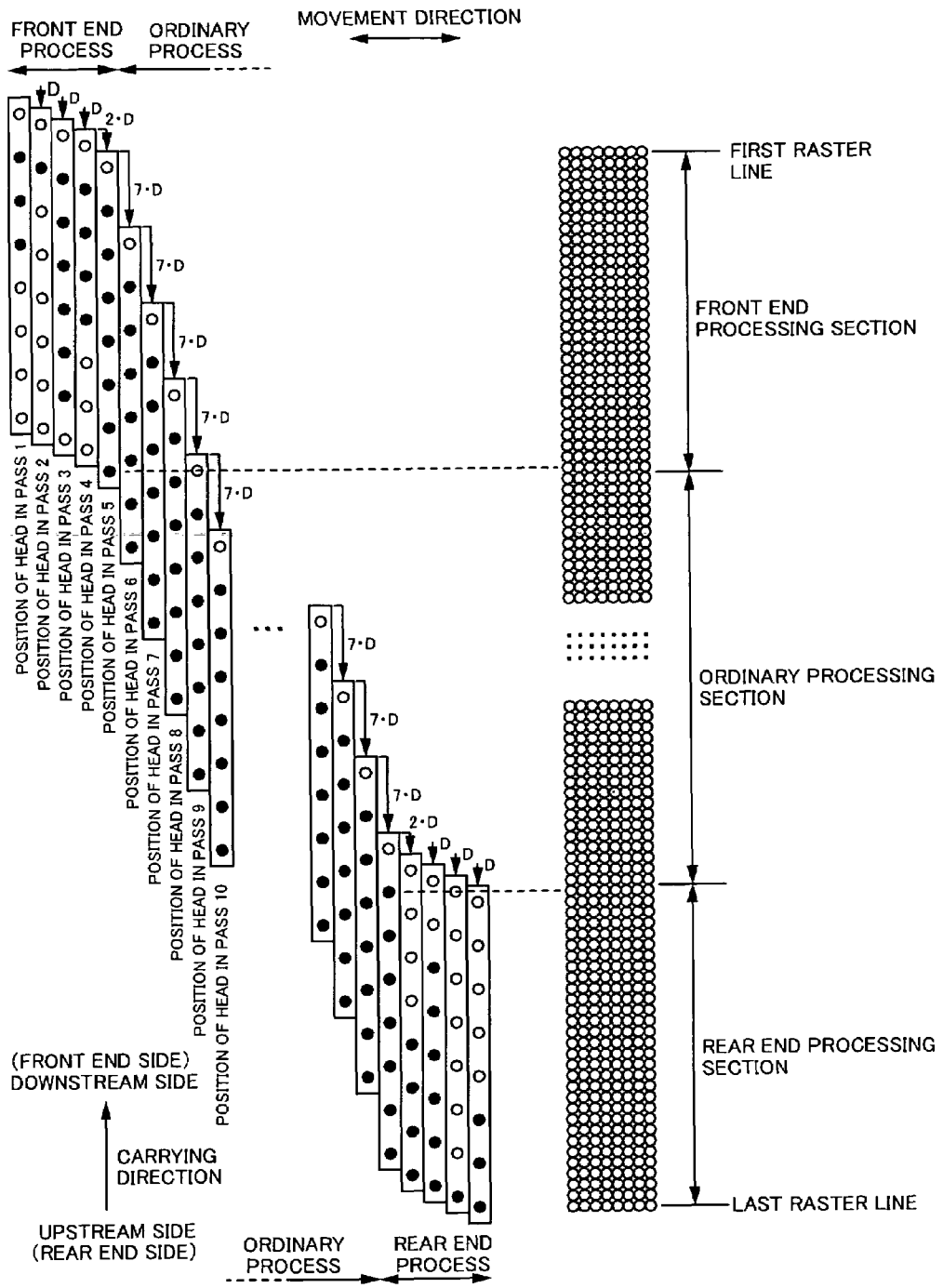
FIG. 37 is a diagram illustrating an example of interlaced printing of the second embodiment.

Here, FIG. 37 is a diagram illustrating an example of interlaced printing. This example shows three processing sections, namely a front end processing section, an ordinary processing section, and a rear end processing section. The ordinary processing section is a portion in which raster lines are formed only in the ordinary process serving as the reference for the process. The front end processing section is a portion that is defined on the side closer to the front end of the paper S than the ordinary processing section, and is a portion in which raster lines are formed in the front end process and the ordinary process. In the front end process, the nozzle Nz for ejecting ink and the carrying amount are determined so as to form raster lines that cannot be formed in the ordinary process. Furthermore, the rear end processing section is a portion that is defined on the side closer to the rear end of the paper S than the ordinary processing section, and is a portion in which raster lines are formed in the ordinary process and the rear end process. Also in the rear end process, the nozzle Nz for ejecting ink and the carrying amount are determined so as to form raster lines that cannot be formed in the ordinary process. The ordinary processing section can be referred to as "intermediate portion" that is interposed between the front end processing section and the rear end processing section. Thus, the ordinary processing section corresponds to an intermediate processing section, and the ordinary process corresponds to an intermediate process.

In the example shown in FIG. 37, for the sake of convenience, only one nozzle row is shown among the plurality of nozzle rows that are provided at the head 1131. Further, the number of the shown nozzles Nz that are provided in one nozzle row is also reduced. Furthermore, in the example, it is shown as if the head 1131 (or the nozzle row) moves relative to the paper S, but this example is for showing the relative position between the head 1131 and the paper S. Thus, in the actual printer 1100, the paper S is moved in the carrying direction. Furthermore, with ink intermittently ejected from each of the nozzles Nz, a plurality of dots are formed so as to be arranged side by side in the movement direction. It should be noted that there is a case in which no dot is formed depending on the pixel data. In addition, the nozzles Nz represented by black circles are nozzles that can eject ink, and the nozzles Nz represented by white circles are nozzles from which ink is not ejected.

In the processes shown as an example, the first five passes are the front end process, and the last five passes are the rear end process. The passes between the front end process and the rear end process are the ordinary process. In the ordinary process, each of the nozzles Nz records a raster line directly above a raster line that has been recorded in the previous pass every time the paper S is carried in the carrying direction by a constant carrying amount F. In order to perform the recording at a constant carrying amount in this manner, it is required to satisfy the conditions (1) and (2) below. More specifically, it is required to satisfy the conditions (1) the number N (integer) of nozzles that can eject ink is coprime to the coefficient k, and (2) the carrying amount F is set to ND (D: the spacing at the highest resolution in the carrying direction). Herein, the setting is such that N=7, k=4, and F=7·D (D=720 dpi) so as to satisfy the conditions. Furthermore, with respect to the raster line groups formed in the ordinary process, there is the periodicity in the combination of the nozzles Nz in charge of each of the raster lines. In other words, raster lines formed by the combination of the same nozzles Nz appear at every predetermined number of lines.

On the other hand, in the front end process, the paper S is carried by the carrying amount (1·D or 2·D) that is smaller than the carrying amount (7·D) in the ordinary process. In the front end process, the nozzle Nz that eject ink are not fixed. Furthermore, also in the rear end process, as in the front end process, the paper S is carried by the carrying amount (1·D or 2(D) that is smaller than the carrying amount (7(D) in the ordinary process. It should be noted that it is difficult to find the periodicity in the combination of the nozzles Nz in the front end process and the rear end process.

===Regarding the Correction Values===

As described above, in the printer 1100, an image is printed by repeating the dot forming operation and the carrying operation. Furthermore, when the interlaced printing is performed, the ejection characteristics of each of the nozzles Nz are moderated, and thus the quality of the image is improved. However, there is a strong request for the high quality image in recent years, and thus it is required to further improve the quality even with respect to an image obtained in the interlaced printing. In order to satisfy this request, a method is considered in which the correction values are set for each row area in which a raster line is formed, and the darkness of the raster line is corrected in each row area. Herein, "row area" refers to an area that is constituted by a plurality of unit areas arranged side by side in the movement direction. For example, if the print resolution is 720 dpi×720 dpi, then the row area is a band-shaped area with a width of 35.28 μm ($\approx 1/720$ inch) in the carrying direction. When ink is intermittently ejected from the nozzle Nz moving in the movement direction in an ideal manner, a raster line is formed in the row area.

<Regarding the Darkness Non-uniformity (banding)>

Figure 38A:
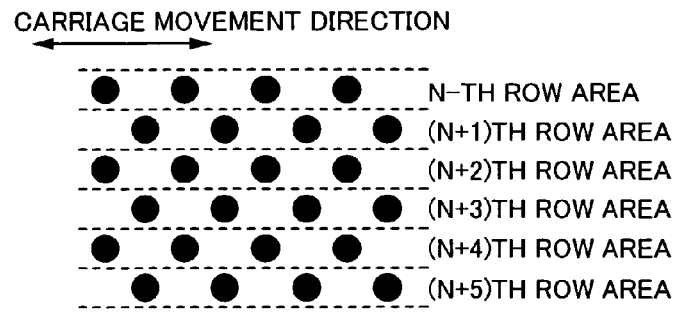
FIG. 38A is a diagram illustrating dot groups formed with ideal ejection characteristics in the second embodiment.
Figure 38B:
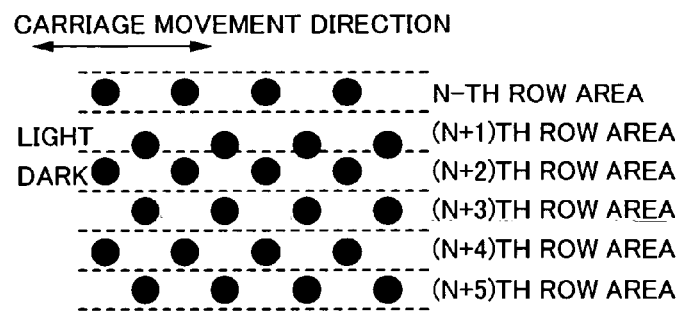
FIG. 38B is a diagram illustrating influence of unevenness in the ejection characteristics in the second embodiment.
Figure 39:
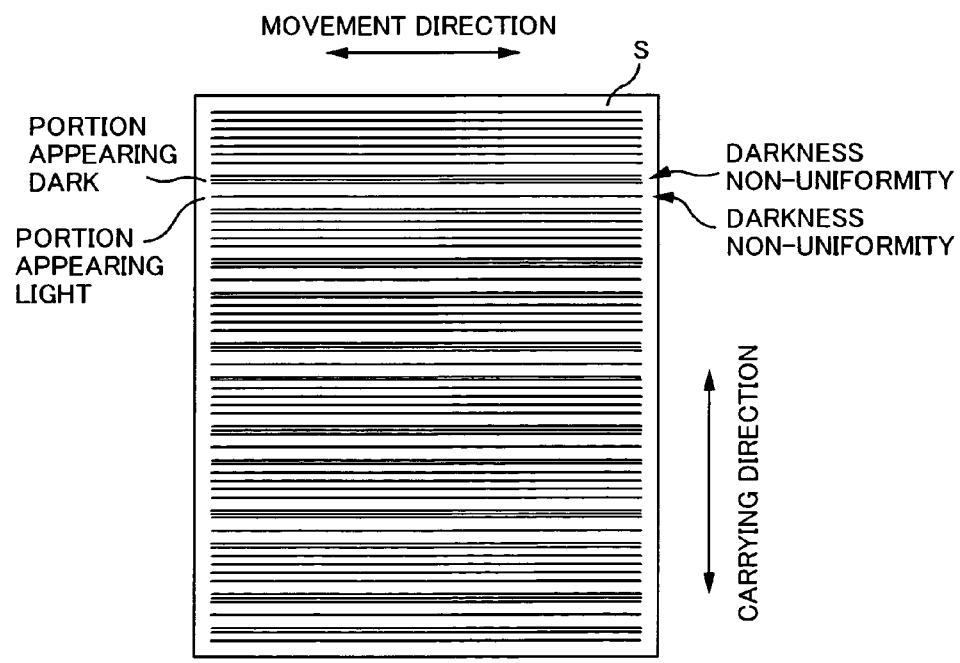
FIG. 39 is a conceptual diagram for illustrating darkness non-uniformity in the second embodiment.

Prior to a description concerning the correction values, the darkness non-uniformity (unevenness in the darkness) is described. The darkness non-uniformity appears to be in the shape of stripes (also referred to as "the shape of horizontal stripes", for the sake of convenience) that are parallel with the movement direction of the carriage CR. More specifically, it is the darkness non-uniformity that occurs in the carrying direction of the paper S. Here, FIG. 38A is a diagram illustrating dot groups formed with ideal ejection characteristics. FIG. 38B is a diagram illustrating influence of unevenness in the ejection characteristics. FIG. 39 is a conceptual diagram for illustrating darkness non-uniformity. For the sake of convenience, the following description is made using a monochrome printed image as an example. Furthermore, it is assumed that the darkness of the image is constantly at an intermediate level (darkness 50%, for example) in FIGS. 38A and 38B.

In the example shown in FIG. 38A, the ejection characteristics are ideal, and thus ink ejected from the nozzles Nz lands precisely in terms of the position on unit areas that are virtually defined on paper. More specifically, the centers of the unit areas match the centers of the dots. The raster lines are constituted by the plurality of dots arranged side by side in the movement direction. Thus, it can be said that the raster lines are formed precisely in terms of the position at the center in the carrying direction of the row areas. In this example, when the image darkness is compared with respect to the printed image in the unit of the row area, the image darkness is even between the row areas. For the sake of convenience, in the description below, each of images that have been divided in the row areas is also referred to as "image piece". Herein, raster lines are different from image pieces in that the raster lines are dot rows obtained when ink lands, whereas the image pieces are obtained by dividing a printed image in the unit of the row area.

In the example shown in FIG. 38B, due to unevenness in the ejection characteristics, the raster line associated with the (n+1)th row area is formed closer to the (n+2)th row area (lower side in FIG. 38B) than the normal position. The darkness is originally to be even between each of the image pieces as in the example shown in FIG. 38A, but in the example in FIG. 38B, the darkness is uneven between each of the image pieces due to the unevenness in the ejection characteristics. For example, the darkness of the image piece associated with the (n+1) throw area is lighter than the darkness of the image piece associated with the standard row area (for example, the n-th row area and the (n+3)th row area). Furthermore, the darkness of the image piece associated with the (n+2)th row area is darker than the darkness of the image piece associated with the standard row area.

As shown in FIG. 39, the unevenness in the darkness between the image pieces macroscopically appears as the darkness non-uniformity in the shape of horizontal stripes. More specifically, the image pieces in a portion where the spacing between adjacent raster lines is relatively wide macroscopically appear light, and the image pieces in a portion where the spacing between adjacent raster lines is relatively narrow macroscopically appear dark. The darkness non-uniformity is a cause to that impairs the image quality of printed images.

It should be noted that the cause of the darkness non-uniformity is also applied to other ink colors. If even one color of each color of CMYK tends to be uneven, then darkness non-uniformity appears in an image printed in multiple colors.

<Regarding the Outline of the Correction Values>

In order to correct the darkness non-uniformity between the row areas, the correction values for each row area are set in the printer 1100 in the second embodiment. For example, with respect to the row areas that tend to appear darker than the standard, the correction values are set such that the image pieces in the row areas are formed lighter, and with respect to the row areas that tend to appear lighter than the standard, the correction values are set such that the image pieces in the row areas are formed darker. A reference is made to the correction values, for example, in the process performed by the printer driver 1330. For example, the CMYK pixel data obtained by performing the color converting process is corrected by the CPU 1311 of the computer 1300 based on the correction values. Subsequently, the halftone process is performed on the CMYK pixel data after the correction. In short, the gradation values of the pixel data are corrected based on the correction values. Accordingly, the ejection amount of ink is adjusted so as to suppress the unevenness in the darkness between each of the image pieces.

It should be noted that in the example shown in FIG. 38B, the image piece associated with the (n+2)th row area is dark because the spacing between the adjacent raster lines is narrower than the standard spacing. More specifically, the (n+1) th raster line that is originally to be formed at the center in the carrying direction in the (n+1)th row area is too close to the (n+2)th row area, and thus the associated image piece becomes dark. In other words, this state is not caused by the influence of the raster line associated with the (n+2)th row area. Thus, in consideration of using the image piece as the reference, it is also necessary to consider the raster lines that are formed in the adjacent row areas. Accordingly, in a method in which the correction values are simply set for each nozzle, it is impossible to suppress the darkness non-uniformity. Thus, in the second embodiment, the correction values are set for each row area, and the darkness of printed image is corrected based on the correction values.

In the second embodiment, in order to set the correction values, a test pattern is printed by the printer 1100 in the inspection step in the printer manufacturing plant, and the test pattern is read by the scanner 1200, and the correction values for each row area are determined based on the darkness of each image piece in the test pattern. Then, the correction values for each row area are stored in the correction value storing section 1152a that is provided in the memory 1152 of the printer-side controller 1150. Herein, the test pattern is printed by the printer 1100 for which the correction values are to be set. Thus, the characteristics in darkness non-uniformity in each printer 1100 are reflected in the set correction values. Furthermore, a user who has purchased the printer 1100 lets a computer (computer owned by the user) acquire the correction values and correct the gradation values of the pixel data based on the acquired correction values. Furthermore, the computer creates the print data based on the corrected gradation values and outputs it to the printer 1100. The printer 1100 performs printing based on the print data.

===Regarding the Processes in the Printer Manufacturing Plant===

<Printing of the Test Pattern>

Figure 40A:
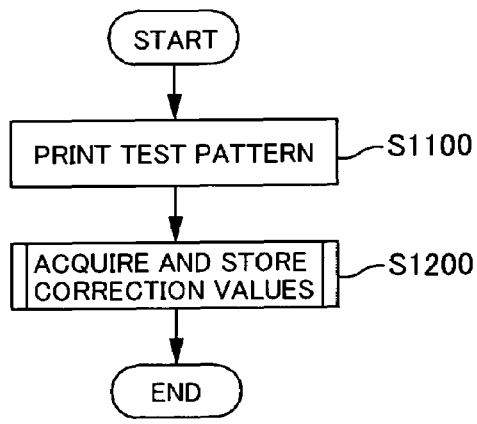
FIG. 40A is a flowchart of processes in which correction values are set in the second embodiment.
Figure 40B:
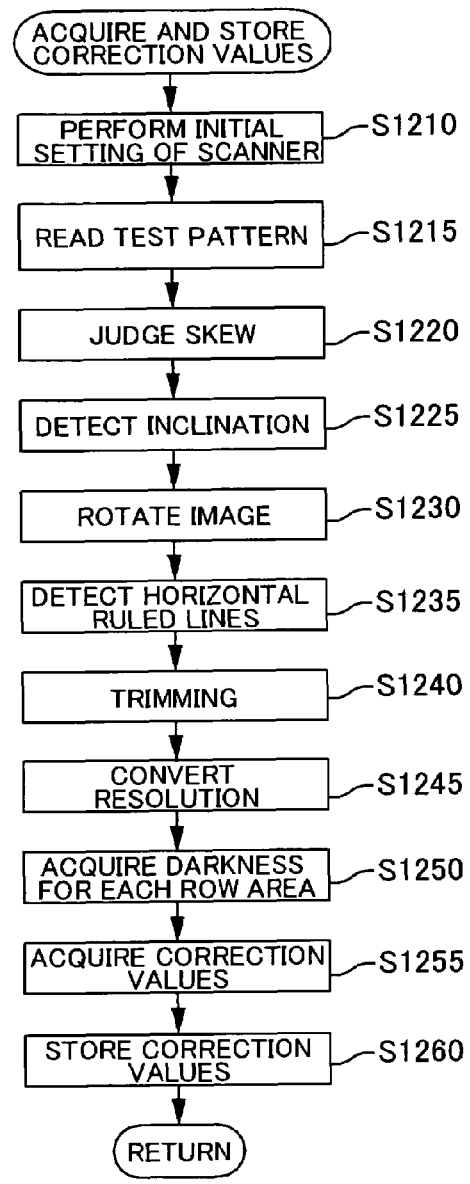
FIG. 40B is a flowchart of processes in which correction values are obtained and stored in the second embodiment.

Next, the processes performed in the printer manufacturing plant are described. Here, FIG. 40A is a flowchart of processes in which the correction values are set in the inspection step after the printer 1100 has been manufactured. FIG. 40B is a flowchart of processes in which the correction values are obtained and stored in the processes in which the correction values are set. It should be noted that the processes in which the correction values are set described below is achieved by the correction value setting program 1320', the scanner driver 1350, and the printer driver 1330 that are installed on the computer 1300. Thus, the correction value setting program 1320', the scanner driver 1350, and the printer drier 1330 have codes for performing the processes in which the correction values are set.

Prior to the processes in which the correction values are set, the operator connects the printer 1100 for which the correction values are to be set to the computer 1300. The scanner 1200 is connected to the computer 1300 in advance. In addition, the correction value setting program 1320' is installed on the computer 1300 in advance. As described above, the correction value setting program 1320' is one type of the application program 1320. The correction value setting program 1320' lets the CPU 1311 perform a process that is necessary for setting the correction values. Examples of this process include a process for letting the printer 1100 print the test pattern, a process for performing an image process or an analysis on the darkness data of an image acquired from the scanner 1200, and a process for storing the acquired correction values in the memory 1152 (correction value storing section 1152a) of the printer 1100.

After the printer 1100 has been connected, then the test pattern is printed (S1100). In this step, the operator of the plant gives an instruction for printing the test pattern, via the user interface of the correction value setting program 1320'. When this instruction is received, the CPU 1311 of the host-side controller 1310 creates the print data for the test pattern, and sends the created print data to the printer 1100. Subsequently, based on the print data from the computer 1300, the printer 1100 prints the test pattern on the paper S serving as a medium. This printing operation is performed following the processes (see FIG. 36) described above. Described briefly, it is performed by repeating, in accordance with the print data, the dot forming operation (S1030) in which ink is ejected toward the paper S while the head 1131 is moved in the movement direction and the carrying operation (S1040) in which the paper S is carried in the carrying direction.

<Regarding the Test Pattern>

Figure 41A:
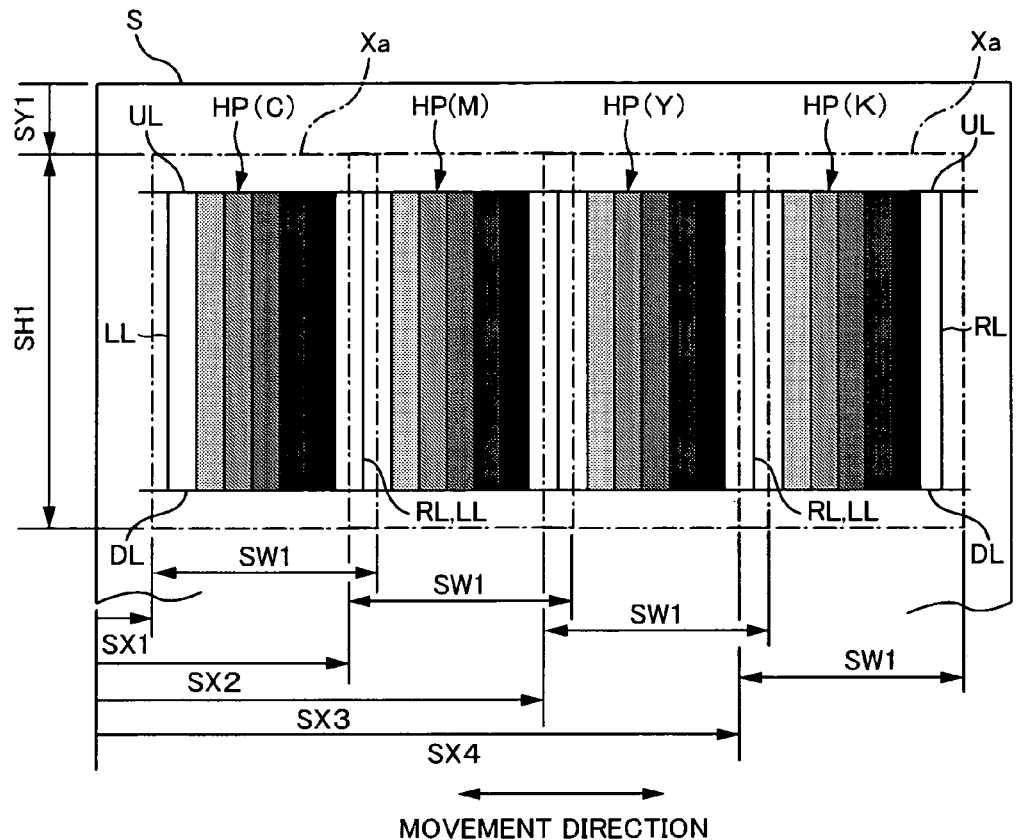
FIG. 41A is an explanatory diagram of a test pattern of the second embodiment.
Figure 41B:
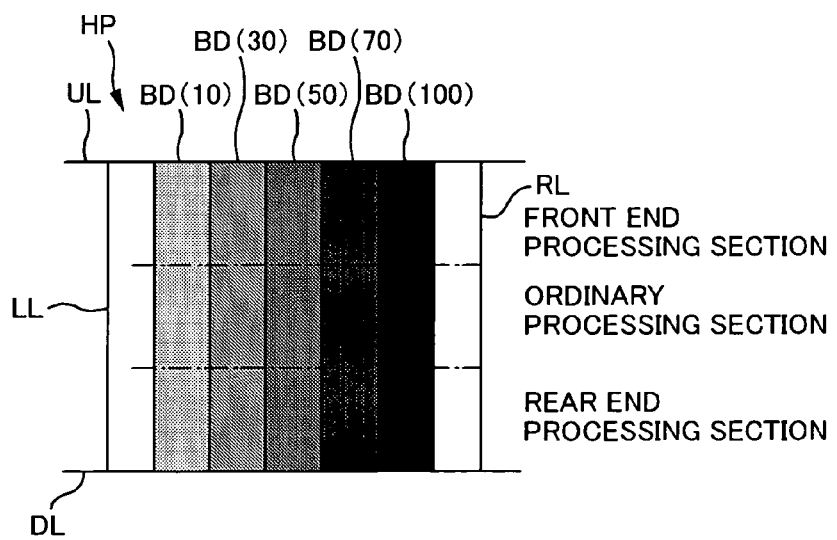
FIG. 41B is an explanatory diagram of a correction pattern of the second embodiment.

Next, the printed test pattern is described. Here, FIG. 41A is an explanatory diagram of a test pattern CP. FIG. 41B is an explanatory diagram of a correction pattern HP. It should be noted that "test pattern CP" refers to the entire patterns printed on the paper S. "Correction pattern HP" refers to a portion printed using the same type of ink, and is used for evaluating unevenness in the darkness. As described above, in the printer 1100, it is possible to eject four types of inks, namely cyan ink (C), magenta ink (M), yellow ink (Y), and black ink (K). Thus, it can be said that the test pattern CP has four correction patterns HP for the respective colors. In the test pattern shown as an example, a correction pattern HP formed using cyan ink, a correction pattern HP formed using magenta ink, a correction pattern HP formed using yellow ink, and a correction pattern HP formed using black ink are horizontally printed side by side in the movement direction. For the sake of convenience, in the description below, the correction pattern HP formed using cyan ink is also referred to as "cyan correction pattern HP(C)". In a similar manner, the correction pattern HP formed using magenta ink is also referred to as "magenta correction pattern HP(M)", the correction pattern HP formed using yellow ink is also referred to as "yellow correction pattern HP(Y)", and the correction pattern HP formed using black ink is also referred to as "black correction pattern HP(K)". It should be noted that the types of ink also include the difference in color materials. For example, black dye ink and black pigment ink are taken as ink of different types although they have the same color. Thus, in the case of the printer 1100 using black dye ink and black pigment ink, a correction pattern HP is printed with the black dye ink and another correction pattern HP is printed with the black pigment ink.

Each of the correction patterns HP (the cyan correction pattern HP(C) to the black correction pattern HP(K)) is constituted by band-shaped patterns BD (BD(10) to BD(100)) printed at five types of specific darknesses, an upper ruled line UL, a lower ruled line DL, a left ruled line LL, and a right ruled line RL. It should be noted that the left ruled line LL and the right ruled line RL are used in common by two adjacent correction patterns. For example, the right ruled line RL of the cyan correction pattern HP(C) is also used as the left ruled line LL of the magenta correction pattern HP(M). In a similar manner, the right ruled line RL of the yellow correction pattern HP(Y) is also used as the left ruled line LL of the black correction pattern HP(K).

Each of the band-shaped patterns BD is created based on the image data with a constant gradation value. From the band-shaped pattern BD at the left end in FIG. 41B, printing is performed at the darkness that becomes darker toward the position on the right side in the order: the gradation value 26(darkness 10%), to the gradation value 76 (darkness 30%), to the gradation value 128 (darkness 50%), to the gradation value 179(darkness 70%), and to the gradation value 255 (darkness 100%). These five types of gradation values (darknesses) correspond to command values in the control. Thus, these gradation values (darknesses) are referred to as "command gradation values (command darknesses)", and are represented by a symbol Sa (gradation value 26), a symbol Sb (gradation value 76), a symbol Sc (gradation value 128), a symbol Sd (gradation value 179), and a symbol Se (gradation value 255).

As described above, when an image is printed, the front end process, the ordinary process, and the rear end process are performed. Thus, each of the correction patterns HP is printed using the front end process, the ordinary process, and the rear end process. More specifically, each of the correction patterns HP has the front end processing section, the ordinary processing section (corresponding to the intermediate processing section), and the rear end processing section. It should be noted that when an image is printed by a user, several thousands of raster lines constituting the ordinary processing section are formed in the case of A4-size, for example. Herein, there is the periodicity in the combination of the nozzles Nz in charge of the raster lines of the ordinary processing section, and thus the length (length in the carrying direction) of the ordinary processing section in each of the correction patterns HP is set to a length including raster lines associated with an amount of a plurality of periods, such as a length associated with an amount of eight periods.

Furthermore, in the correction pattern HP, with respect to the upper ruled line UL and the lower ruled line DL, the upper ruled line UL is formed by the first raster lines in the band-shaped patterns BD, and the lower ruled line DL is formed by the last raster lines in the band-shaped patterns BD.

===Regarding Acquisition of the Correction Values===

<Initial Setting of the Scanner 1200>

After the test pattern CP has been printed, then a process (S1200) is performed in which the correction values are acquired and stored in the printer 1100. The following is a description concerning this process. As shown in FIG. 40B, in this process, the initial setting of the scanner 1200 is first performed (S1210). In the initial setting, items such as the reading resolution of the scanner 1200, the document type, the image type, the scanning mode, and the storing format of the read image are set. In these items, it is required that the reading resolution of the scanner 1200 is higher than the print resolution. It is preferable that the reading resolution is set to an integral multiple of the print resolution. In this embodiment, the print resolution of the test pattern CP is 720 dpi, and thus four times the resolution, that is, 2880 dpi is set as the reading resolution of the scanner 1200. Furthermore, the document type is a reflection document, the image type is eight-bit grayscale, and the storing format is a bitmap format.

<Reading of the Test Pattern CP>

After the initial setting of the scanner 1200 has been performed, the test pattern CP is read (S1215). In this step, the operator sets a document (the paper S on which the test pattern has been printed) for the scanner 1200. Then, an instruction for reading the darkness of the test pattern CP is given via the user interface of the correction value setting program 1320'. When this instruction is received, a reading command (one type of control command) for reading the darkness of the document is output by the CPU 1311 of the host-side controller 1310 to the scanner 1200. When the reading command is received, the scanner-side controller 1210 acquires the darkness data of the entire paper by controlling the reading mechanism 1220 and the drive mechanism 1230. Herein, the test pattern CP is read by moving the reading carriage 1223 in a predetermined direction (sub-scanning direction). More specifically, the darknesses of the band-shaped patterns BD printed at specific darknesses are acquired along the longitudinal direction of the band-shaped patterns BD. Then, the acquired darkness data is output by the scanner-side controller 1210 to the computer 1300. The thus acquired darkness data is data indicating the darkness for each pixel (here, an area with a size prescribed by the reading resolution), and constitutes the image. Thus, in the description below, the data acquired by the scanner 1200 is also referred to as "image data". Furthermore, the darkness data for each pixel constituting the image data is also referred to as "pixel darkness data". The pixel darkness data is constituted by the gradation value indicating the darkness.

When the image data from the scanner 1200 is received, the host-side controller 1310 acquires the image data of a predetermined range Xa associated with each correction pattern HP, from the received image data. As indicated by the dashed dotted line in FIG. 41A, the predetermined range Xa is defined as a rectangular range that is slightly larger than the correction pattern HP. Then, the host-side controller 1310 acquires the image data for each correction pattern HP, from the image data for the entire paper. For example, in the case of the cyan correction pattern HP(C) that is positioned at the upper left in FIG. 41A, the predetermined range Xa indicated by the dashed dotted line surrounding the correction pattern HP(C) is the image data of the cyan correction pattern. Furthermore, this range is specified by predetermined parameters SX1, SY1, SW1, and SH1. It should be noted that the parameter SX1 is data of an X-axis coordinate indicating the origin of the target range, the parameter SY1 is data of a Y-axis coordinate indicating the origin of the target range, the parameter SW1 is data indicating the width in the X-axis direction of the target range, and the parameter SH1 is data indicating the width in the Y-axis direction of the target range. These parameters are stored in, for example, the correction value setting program 1320'. Accordingly, the host-side controller 1310 acquires the image data (pixel darkness data) with respect to the predetermined range Xa that is specified by the parameters SX1, SY1, SW1, and SH1. Herein, the image data is acquired following a similar procedure by using as appropriate parameters SX2, SX3, and SX4 indicating the origins, also with respect to the correction patterns HP of other colors (the magenta correction pattern HP(M), the yellow correction pattern HP(Y), and the black correction pattern HP(K)).

<Skew Judgment>

Next, the host-side controller 1310 judges the skew of the paper S (S1220) when the test pattern CP (each correction pattern HP) is printed, using the image data (read data obtained by the scanner 1200). Herein, "skew" is a phenomenon in which the paper S is carried in a curve. In other words, it is carrying unevenness between one side portion and the other side portion in the paper width direction, in the paper S, when an image is printed on the paper S. In this skew judgment, if it is judged that skew at a level that interferes in setting the correction values has occurred, then an instruction to re-print the test pattern CP or to adjust the printer 1100 is given. On the other hand, if it is judged that no skew has occurred, or that the skew is at a level that does not interfere in setting the correction values, then the inclination of the correction pattern HP is detected (S1225). Note that, the skew judgment process is described later in detail.

<Detection of the Inclination of the Correction Pattern HP>

Figure 42A:
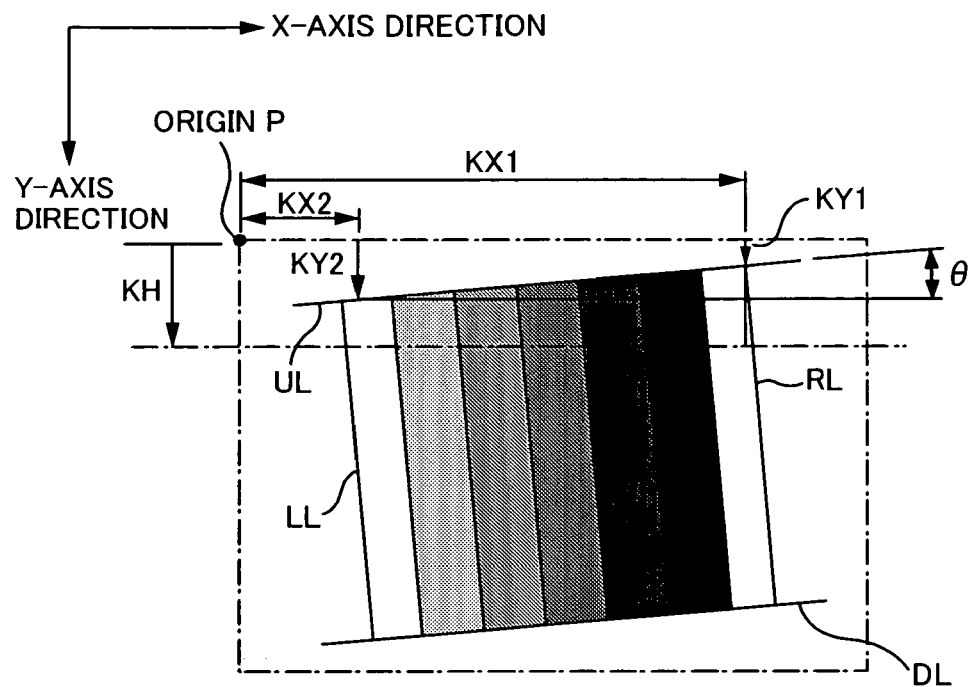
FIG. 42A is a diagram illustrating image data when the inclination is detected in the second embodiment.
Figure 42B:
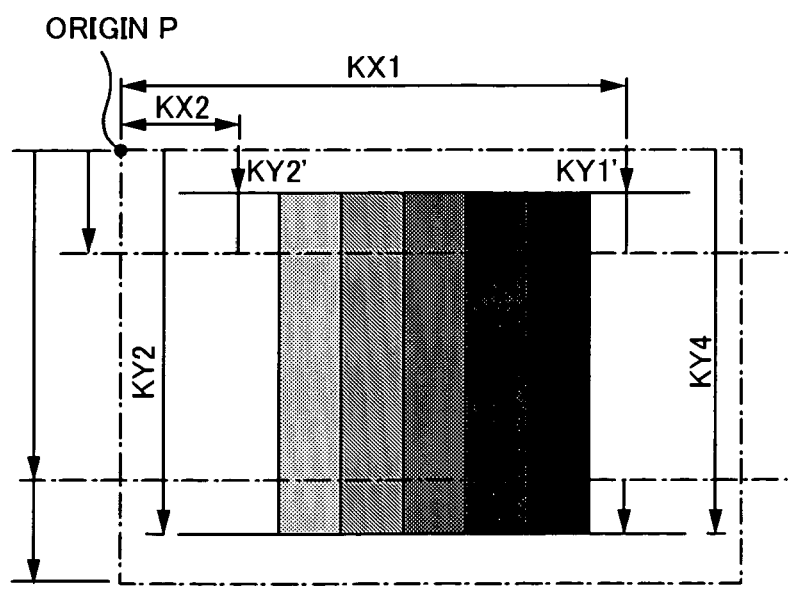
FIG. 42B is an explanatory diagram of image data after a rotation process of the second embodiment.

Here, FIG. 42A is a diagram illustrating the image data when an inclination θ is detected. FIG. 42B is an explanatory diagram of the image data after the rotation process. The host-side controller 1310 acquires the pixel darkness data with respect to pixels in a predetermined range from the acquired image data. In this example, the pixel darkness data is acquired with respect to the pixel group that is positioned away by a distance of KX1 in the X-axis direction and consists of KH pixels in the Y-axis direction, using the origin P as the reference. In a similar manner, the pixel darkness data is acquired also with respect to the pixel group that is positioned away by a distance of KX2 in the X-axis direction and consists of KH pixels in the Y-axis direction. In this case, the parameters KX1, KX2, and KH are determined such that the acquired pixels do not include a pixel associated with the right ruled line RL nor the left ruled line LL, and furthermore, they are determined such that a pixel associated with the upper ruled line UL is not included either. Then, the host-side controller 1310 obtains center of gravity positions KY1 and KY2 with respect to the KH sets of pixel darkness data (gradation values) that have been acquired, in order to detect the position of the upper ruled line UL. Then, the host-side controller 1310 calculates the inclination θ of the correction pattern HP using Equation (1) below based on the parameters KX1 and KX2 and the center of gravity positions KY1 and KY2.

$$\theta = \tan^{-1}\{(KY2-KY1)/(KX2-KX1)\} \quad (1)$$

Next, the host-side controller 1310 performs the rotation process (S1230) in accordance with the inclination θ on the image data. In this rotation process, a rotation process of the image data is performed based on the inclination θ calculated using Equation (1).

<Trimming of the Correction Pattern HP>

Figure 43:
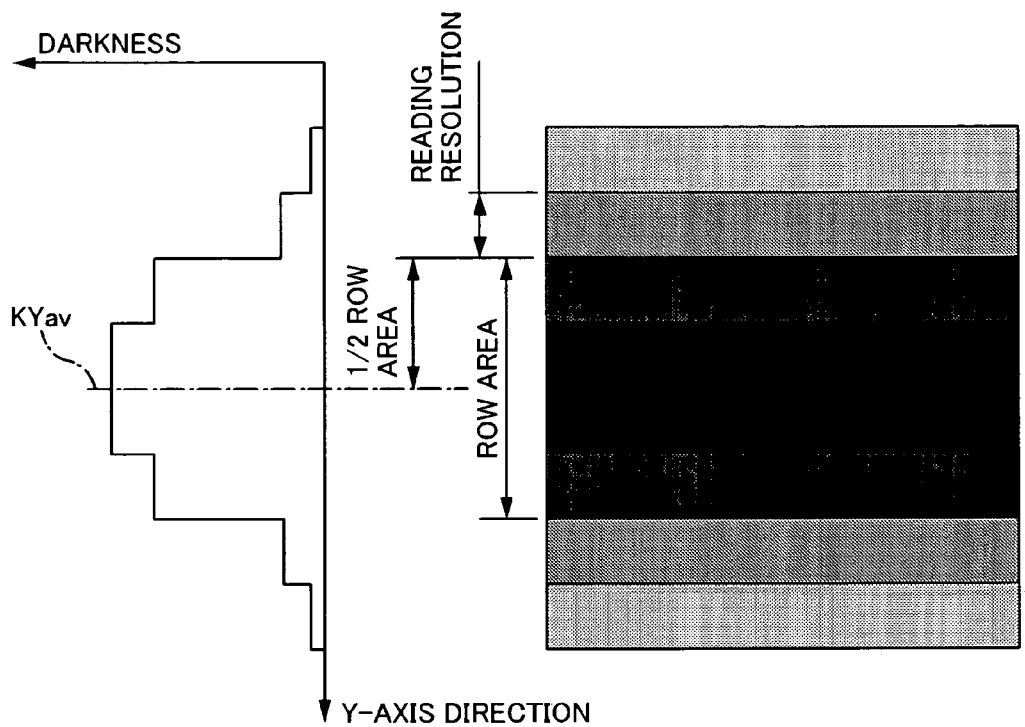
FIG. 43 is an explanatory diagram of image data at the time of trimming of the second embodiment.

Next, the host-side controller 1310 detects the horizontal ruled lines (the upper ruled line UL and the lower ruled line DL) from the image data of each correction pattern HP (S1235), and performs trimming (S1240). Here, FIG. 43 is an explanatory diagram of the image data at the time of trimming, and is an explanatory diagram of the trimming position on the upper ruled line UL. It should be noted that in this description, a reference is also made to FIG. 42B. The host-side controller 1310 acquires the pixel darkness data with respect to pixels in a predetermined range from the image data on which the rotation process has been performed. In this example, as in the preceding rotation process, the pixel darkness data is acquired with respect to the pixels that are positioned at the positions KX1 and KX2 in the X-axis direction and consist of KH pixels in the Y-axis direction, using the origin as the reference. Next, the host-side controller 1310 obtains center of gravity positions (center of gravity positions with respect to the darkness) KY1' and KY2' of the KH sets of obtained pixel data in each of the two pixel groups, and the average value of the two obtained center of gravity positions KY1' and KY2' is taken as a center of gravity position KYav on the upper ruled line UL. Then, the host-side controller 1310 determines, as the trimming position, the position away from the center of gravity position KYav on the upper ruled line UL by ½ of the width of the row area toward the origin. More specifically, the boundary between the pixels that are closest to the position is determined as the trimming position. Furthermore, in the second embodiment, the reading resolution when the image data is acquired is 2880 dpi, and the width of the row area when the test pattern CP is printed is 720 dpi, and thus ½ of the width of the row area corresponds to the width of two pixels in the image data. With the correction value acquiring program, trimming is performed by cutting off pixels upper than the determined trimming position. The description above is about the trimming position on the upper ruled line UL, but a similar process is performed also on the lower ruled line DL. More specifically, in trimming on the lower ruled line DL, the position away from the center of gravity position on the lower ruled line DL by ½ of the width of the row area in a direction opposite to the origin is determined as the trimming position.

<Resolution Conversion>

After the trimming has been performed, then the host-side controller 1310 converts the resolution of the image data on which the trimming has been performed (S1245). In this process, the resolution of the image data is converted such that the number of pixels in the Y-direction in the image data is equal to the number of raster lines constituting the correction pattern HP. For example, it is assumed that the correction pattern HP printed at the resolution 720 dpi is read at the resolution 2880 dpi. In this case, in an ideal state, the number of pixels in the Y-axis direction in the image data is four times the number of raster lines constituting the correction pattern HP. However, in an actual state, due to the influence of an error and others during printing or reading, there is a case in which the number of raster lines does not match the number of pixels. The resolution conversion is performed on the image data so as to eliminate such mismatching.

In this process, the host-side controller 1310 calculates the multiplying factor in the resolution conversion by calculating Equation (2) below on the image data on which the trimming has been performed.

Multiplying factor in resolution conversion=[the number of raster lines constituting correction pattern HP]÷[the number of pixels in the Y-axis direction in image data after trimming]  (2)

After the multiplying factor has been calculated, then the resolution converting process is performed using this multiplying factor. It is possible to use various methods for the resolution conversion, but a bicubic method is used in this example. As a result, the number of pixels arranged side by side in the Y-axis direction becomes equal to the number of row areas, and the pixel rows arranged side by side in the X-axis direction are associated with the row areas one-to-one. For example, the pixel row that is closet to the origin with respect to Y-axis direction is associated with the first row area, and the next pixel row is associated with the second row area. In other words, with respect to the correction pattern HP, the pixel darkness data is obtained for each of the unit areas constituting the row areas. Thus, in the correction value setting system 1000, the darkness of the test pattern CP is read for each unit area. Since the reading unit of the darkness matches the unit area with respect to the test pattern CP, it is easy to perform association when evaluating unevenness in the darkness and when setting the correction values, and thus it is possible to improve the work efficiency.

<Acquisition of the Darkness for each Row Area>

Figure 44:
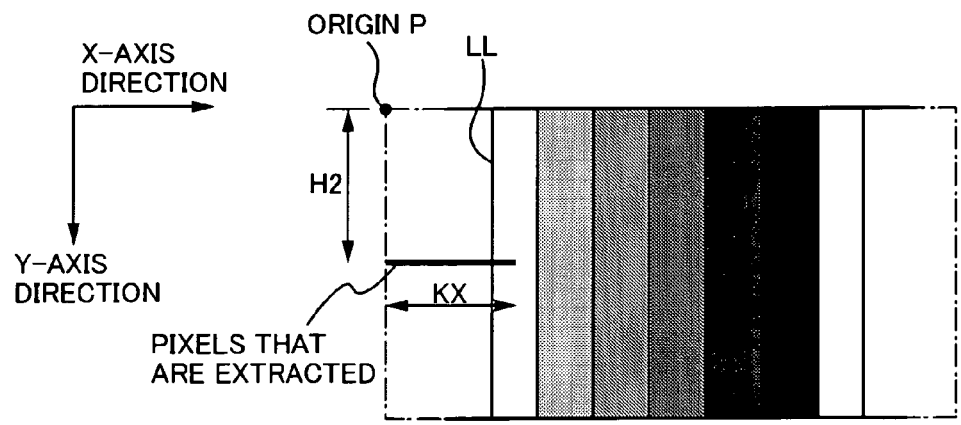
FIG. 44 is a diagram for illustrating the detection of a left ruled line of the second embodiment.
Figure 45:
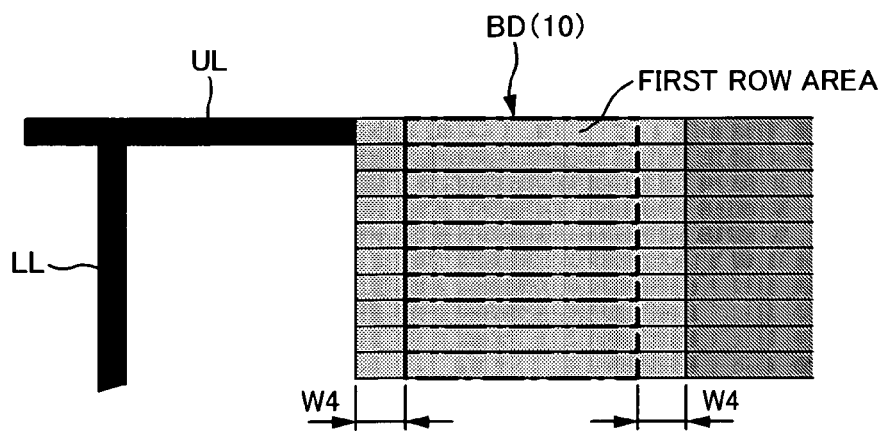
FIG. 45 is a diagram illustrating a range in which the darkness is measured with respect to a belt-shaped pattern of the second embodiment.

Next, the host-side controller 1310 acquires the darkness for each row area in the correction pattern HP (S1250). Here, FIG. 44 is a diagram for illustrating the detection of the left ruled line LL. FIG. 45 is a diagram illustrating a range in which the darkness is measured with respect to the band-shaped pattern BD. When the darkness for each row area is acquired, the host-side controller 1310 detects the position of the vertical ruled line (left ruled line LL in this example) serving as the reference. First, the host-side controller 1310 acquires the pixel darkness data with respect to pixels in a predetermined range from the image data on which the resolution conversion has been performed. For example, as shown in FIG. 44, the pixel darkness data is acquired with respect to pixels that are positioned away by a distance of H2 in the Y-axis direction and consist of KX pixels in the X-axis direction, from the origin P. It should be noted that the number (KX) of pixels in the X-axis directions is determined such that the pixel darkness data group that is acquired includes the pixel darkness data associated with the left ruled line LL. Then, the host-side controller 1310 obtains the center of gravity position with respect to the acquired pixel darkness data (gradation values). This center of gravity position corresponds to the center position of the left ruled line LL. Herein, with respect to the X-axis direction, the spacing from the left ruled line LL to each of the band-shaped patterns BD is already known. Accordingly, the host-side controller 1310 specifies pixels constituting each of the band-shaped patterns BD (BD(10) to BD(100)) using the center of gravity position of the left ruled line LL as the reference, and acquires the pixel darkness data with respect to the specified pixels. For example, in the case of the band-shaped pattern BD(10) printed at the darkness 10%, the pixel darkness data is acquired with respect to each of the pixels belonging to the range indicated by the dotted line excluding ranges of W4. Then, the average value of the acquired pixel darkness data is taken as the read darkness at the darkness 10% corresponding to the first row area. The read darkness is acquired in a similar manner also with respect to other row areas and other band-shaped patterns BD. It should be noted that the read darkness also can be expressed as the measured value of the darkness using the scanner 1200. Then, the acquired read darkness is stored in the data table (see FIG. 27) in the memory 1312 that is provided in the host-side controller 1310. More specifically, the read darkness is stored in an area that is specified by the ink color, the darkness when printing the pattern, and the row area number. It should be noted that "darkness 1 to darkness 5" in FIG. 27 refer to the darknesses of each of the band-shaped patterns BD. For example, the darkness 1 is associated with the darkness 10%, and the darkness 5 is associated with the darkness 100%.

<Acquisition of the Correction Values>

After the read darkness for each row area has been acquired, then the host-side controller 1310 acquires the correction values for each row area (S1255). As described above, one band-shaped pattern BD is printed at the same command gradation value. However, unevenness occurs in the read darkness in the obtained row areas. This unevenness causes darkness non-uniformity in the print image. In order to eliminate this darkness non-uniformity, with respect to each band-shaped pattern BD, it is required to make the read darkness for each row area even to the extent possible. From this point of view, the correction values are determined for each row area based on the read darkness for each row area.

Figure 46:
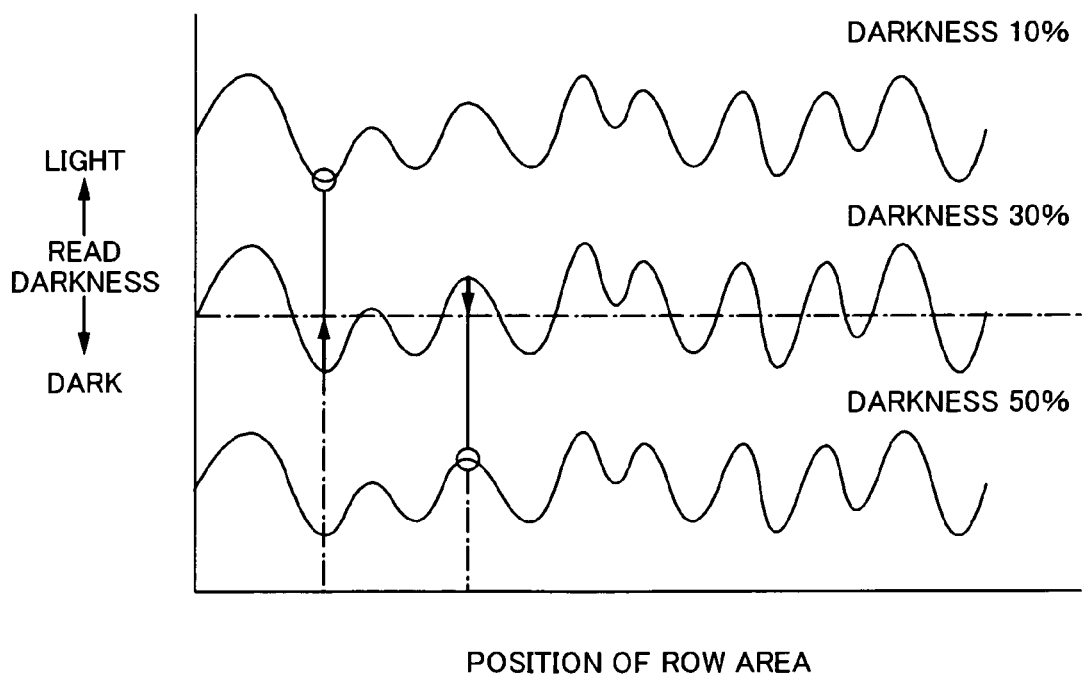
FIG. 46 is a diagram illustrating the combination of a read darkness used for acquiring correction values in the second embodiment.
Figure 47A:
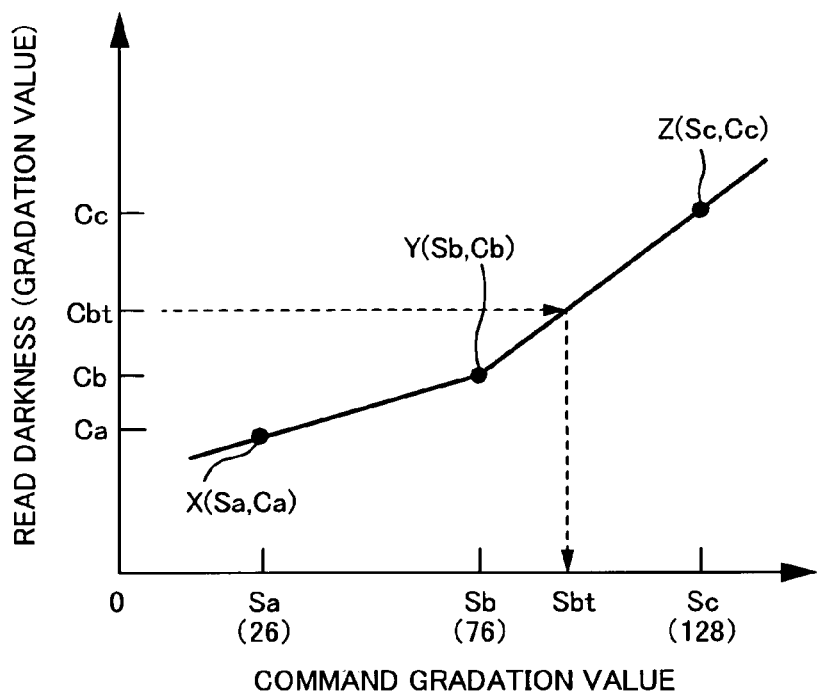
FIG. 47A is a diagram illustrating the acquisition of a correction value in a case where the read darkness is lower than a target darkness in the second embodiment.
Figure 47B:
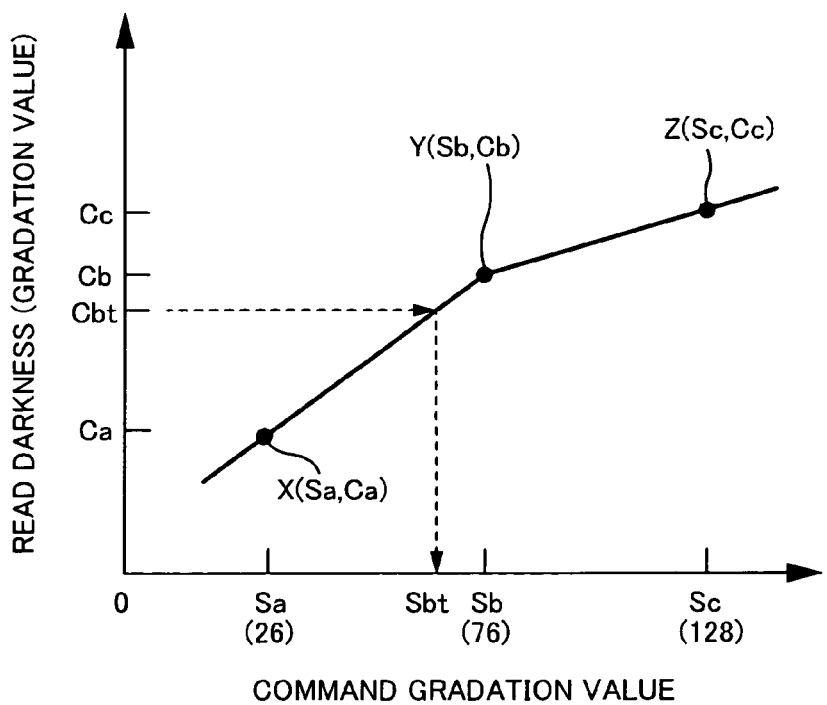
FIG. 47B is a diagram illustrating the acquisition of a correction value in a case where the read darkness is higher than the target darkness in the second embodiment.

Here, the description is made using, as an example, a case in which the correction values at the command gradation value Sb (darkness 30%, gradation value 76) in a row area are acquired. Here, FIG. 46 is a diagram illustrating the combination of a read darkness used for acquiring the correction values. FIG. 47A is a diagram illustrating the acquisition of the correction value in a case where the read darkness is lower than the target darkness. FIG. 47B is a diagram illustrating the acquisition of the correction value in a case where the read darkness is higher than the target darkness.

In the correction value setting system 1000, the host-side controller 1310 sets the target darkness with respect to the darkness for which the correction values are to be set. In this example, with respect to the band-shaped pattern BD at the darkness for which the correction values are to be set, the average value of the read darknesses of each of the row areas is set as the target darkness. The correction values in a row area are set in accordance with the difference from the target darkness. In other words, it can be said that when the correction values are acquired, unevenness in the darkness between each of the row areas is evaluated. When the correction values are set for each row area, the host-side controller 1310 refers to the read darkness at the higher side darkness that is higher than the darkness for which the correction values are to be set, and the read darkness at the lower side darkness that is lower than the darkness. For example, as shown in FIG. 46, when the correction values at the command gradation value Sb (darkness 30%) are set, the read darkness at the command gradation value Sc (darkness 50%, gradation value 128) is used as the higher side darkness, on the other hand, the read darkness at the command gradation value Sa (darkness 10%, gradation value 26) is used as the lower side darkness.

Then, if the read darkness in a row area is lower than the target darkness, then as shown in FIG. 47A, the correction value is acquired based on a read darkness Cb and the command gradation value Sb in the row area, and a read darkness Cc and the command gradation value Sc in the associated row area at the higher side darkness. More specifically, the host-side controller 1310 calculates a command gradation value Sbt associated with the target darkness by performing a primary interpolation (primary interpolation based on a straight line YZ) shown in Equation (3) below, and acquires a correction value Hb by performing the calculation shown in Equation (4) below.

$$Sbt = Sb + (Sc - Sb) \times \{(Cbt - Cb)/(Cc - Cb)\} \qquad (3)$$

$$Hb = (Sbt - Sb)/Sb \qquad (4)$$

On the other hand, if the read darkness in a row area is higher than the target darkness, then as shown in FIG. 47B, the correction value is acquired based on a read darkness Cb and the command gradation value Sb in the row area, and a read darkness Ca and the command gradation value Sa in the associated row area at the lower side darkness. More specifically, the host-side controller 1310 calculates a command gradation value Sbt associated with the target darkness by performing a primary interpolation (primary interpolation based on a straight line XY) shown in Equation (5) below, and acquires a correction value Hb by performing the calculation shown in Equation (4) above.

$$Sbt = Sb - (Sb - Sa) \times \{(Cbt - Cb)/(Ca - Cb)\} \qquad (5)$$

$$Hb = (Sbt - Sb)/Sb \qquad (4)$$

The host-side controller 1310 acquires the correction values Hb at the gradation value Sb (darkness 30%) for each row area by performing the calculations for each row area. In a similar manner, correction values Hc at the gradation value Sc (darkness 50%) are also acquired for each row area. In this case, the read darkness at the command gradation value Sd (darkness 70%, gradation value 179) is used as the higher side darkness, and the read darkness at the command gradation value Sb (darkness 30%, gradation value 76) is used as the lower side darkness. Furthermore, correction values Hd at the gradation value Sd (darkness 70%) are also acquired for each row area. The correction values Hb, Hc, and Hd that have been thus acquired are temporarily stored in the memory 1312 (such as a work memory) of the host-side controller 1310, and then are stored in the memory 1152 that is provided in the printer-side controller 1150.

Herein, as described above, with respect to the raster line groups formed in the ordinary process, there is the periodicity in the combination of the nozzles Nz in charge of each of the raster lines. Thus, the correction values for the ordinary processing section are determined taking this periodicity into consideration. More specifically, the correction values are determined for the row areas for one period. In this case, tentative correction values are calculated for each of the row areas in a plurality of periods, and the average values of the tentative correction values of the corresponding row areas are obtained and taken as the correction values of the row areas.

<Storage of the Correction Values>

Figures 48, 49:
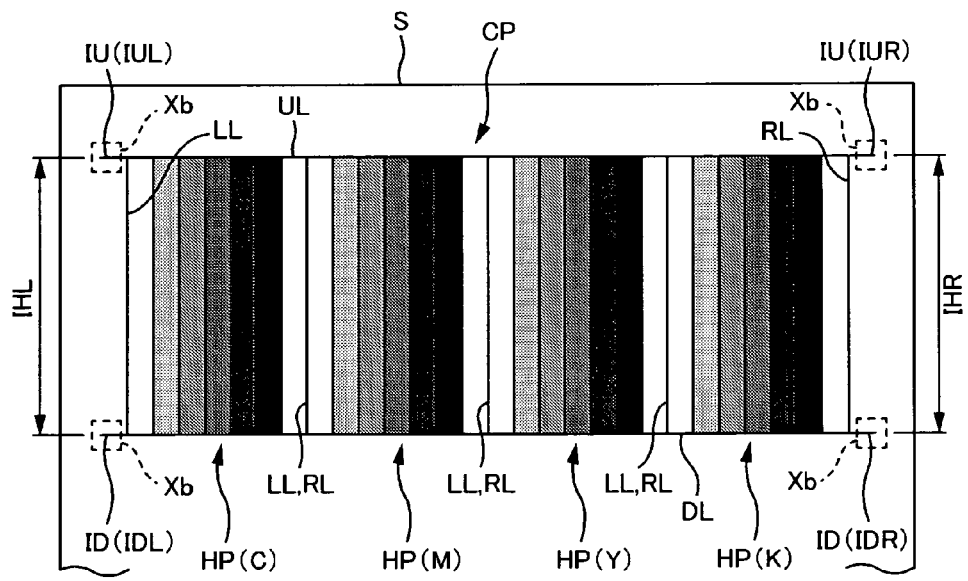
FIG. 48 is a diagram for illustrating correction values that are stored in a correction value storing section in the second embodiment.
FIG. 49 is a diagram for illustrating one index pair and the other index pair of the second embodiment.

After the correction values have been acquired, then the host-side controller 1310 stores the acquired correction values in the memory 1152 (correction value storing section 1152*a*; see FIG. 35) of the printer-side controller 1150 (S1260). Here, FIG. 48 is a diagram for illustrating the correction values that are stored in the correction value storing section 1152*a*. In this case, the host-side controller 1310 communicates with the printer 1100 such that the correction values can be stored. Then, the host-side controller 1310 transfers the correction values that are stored in the memory 1312 and stores the correction values in the memory 1152 of the printer-side controller 1150. As shown in FIG. 35, the correction value storing section 1152*a* is provided with a storage area of the correction values for the front end process, a storage area of the correction values for the ordinary process, and a storage area of the correction values for the rear end process. Furthermore, as shown in FIG. 48 in detail, a plurality of such storage areas are provided in accordance with the row areas. It should be noted that as described above, the number of the storage areas of the ordinary processing section is the number for one period. Thus, in the correction value storing section 1152*a*, three types of correction values at various darknesses are stored for each row area. Furthermore, this group is provided for each type of ink. Herein, in FIG. 48, "darkness 2" refers to the darkness that is the second lightest, and is associated with the darkness 30% in the second embodiment. In a similar manner, "darkness 3" is associated with the darkness 50%, and "darkness 4" is associated with the darkness 70%.

===Regarding the Skew Judgment===

<Problem from Skew>

In the printing apparatuses represented by the printer 1100, skew may occur as described above. Various causes of the skew are conceivable. For example, when the carrying amount becomes uneven between one side and the other side in the paper width direction (movement direction) because a roller slips, skew occurs. Furthermore, also when a paper guide (not shown) is strongly pressed against the edge of the paper S, due to the frictional force between the paper guide and the edge of the paper S, the carrying amount becomes uneven between one side and the other side in the paper width direction, and thus skew occurs. As described above, the head 1311 is for ejecting ink while moving in the movement direction, and thus when skew occurs, the test pattern CP printed on the paper S is deformed. For example, it is deformed into the shape of a fan. Then, if the correction values are acquired based on the deformed test pattern CP, then the precision in the correction is impaired. The reason for this is that the darkness for each row area is changed also by the influence of the skew. It should be noted that the skew may not have the reproductivity. Herein, in the case of the skew not having the reproductivity, it is difficult to make the correction effective even when the correction is performed based on the obtained correction values. On the other hand, in the case of the skew having the reproductivity, an image printed by the printer 1100 is deformed. Accordingly, when skew is confirmed, confirmation and adjustment are necessary regardless of whether or not the skew has the reproductivity.

Thus, in the second embodiment, one index pair and another index pair for judging whether or not skew has occurred are printed within the test pattern CP, and the relationship between the position of the one index pair and the position of the other index pair is obtained using the read data obtained by reading the darkness of the test pattern CP. Then, based on this relationship, skew when the test pattern CP is printed on the paper S is detected. Accordingly, it is possible to precisely detect skew during printing. The following is a description concerning the detection of skew.

<Regarding one Index Pair and the other Index Pair>

The one index pair and the other index pair are printed on the positions that are away from each other in the carrying direction of the medium. Each of the one index pair and the other index pair is constituted by a pair of indexes printed at the positions that are away from each other in the movement direction. The following is a description concerning the one index pair and the other index pair. Here, FIG. 49 is a diagram for illustrating the one index pair and the other index pair in the test pattern CP.

As shown in FIG. 49, in the test pattern CP in the second embodiment, a part of the horizontal ruled lines is used as an upper index pair IU (corresponding to the one index pair) and a lower index pair ID (corresponding to the other index pair), that is, the left end portion and the right end portion on the upper ruled line UL are used as the upper index pair IU, and the left end portion and the right end portion on the lower ruled line DL are used as the lower index pair ID. More specifically, portions on the side outer than the vertical ruled lines (the left ruled line LL and the right ruled line RL) are used as the indexes. More specifically, the end portion on the upper ruled line UL and the end portion on the lower ruled line DL that are positioned at the left of the cyan correction pattern HP(C) printed at the most left, and that are printed at the left of the left ruled line LL are respectively used as an upper left index IUL and a lower left index IDL. Furthermore, the end portion on the upper ruled line UL and the end portion on the lower ruled line DL that are positioned at the right of the black correction pattern HP(K) printed at the most right, and that are printed at the right of the right ruled line RL are respectively used as an upper right index IUR and a lower right index IDR.

In other words, in this test pattern CP, the plurality of correction patterns HP (the cyan correction pattern HP(C) to the black correction pattern HP(K)) are printed so as to be arranged side by side in the movement direction between the indexes that are printed so as to be away from each other in the movement direction. In this configuration, the indexes are printed so as to be away from each other in the movement direction, and thus it is possible to precisely detect displacement of the print position, for example, the positional displacement between the indexes constituting the index pairs, and the deformation of the correction patterns HP, caused by skew. In addition, the upper ruled line UL is formed by the first raster lines in the correction patterns HP (band-shaped patterns BD) and the lower ruled line DL is formed by the last raster lines in the band-shaped patterns BD. As described above, the upper ruled line UL and the lower ruled line DL also serve as the reference when performing the trimming (S1240). In this manner, the upper ruled line UL and the lower ruled line DL have a plurality of functions, and thus it is possible to simplify the test pattern CP. It is advantageous to simplify the test pattern CP, for example, because it is possible to prevent a reading error.

<Regarding the Printing of the Test Pattern CP>

The test pattern CP having the upper index pair IU and the lower index pair ID is also printed following the ordinary procedure. As described above, it is printed by repeating, in accordance with the print data, the dot forming operation (S1030) and the carrying operation (S1040) Accordingly, the upper index pair IU is printed together with a part of the correction patterns HP on the paper S and the lower index pair ID is printed together with another part of the correction patterns HP on the paper S. For example, the upper index pair IU (the upper left index IUL and the upper right index IUR) is printed on the paper S when the first raster lines in each of the correction patterns HP are formed. Furthermore, the lower index pair ID (the lower left index IDL and the lower right index IDR) is printed on the paper S when the last raster lines in each of the correction patterns HP are formed. In this manner, both the index pairs IU and ID are printed together with a part and another part of the correction patterns HP during a series of printing operations, and thus it is possible to establish a high correlation between the formation positions of both the index pairs IU and ID, and the deformation of each of the correction patterns HP, caused by skew. Thus, it is possible to precisely detect the deformation of the test pattern caused by skew, based on the result of the skew detecting process described next.

<Regarding the Skew Judgment Process>

Figure 50:
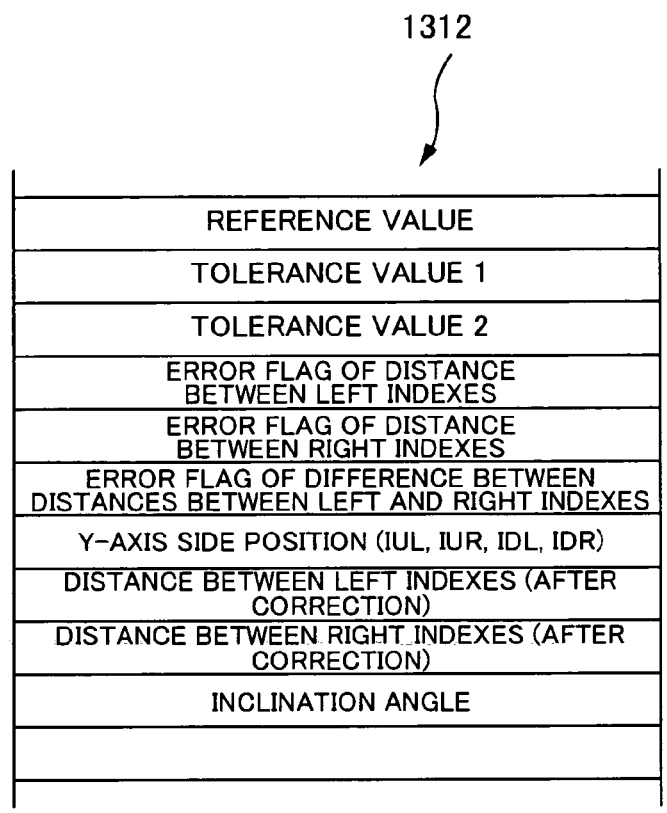
FIG. 50 is a conceptual diagram illustrating the area of a memory provided in a host-side controller of the second embodiment.
Figure 51:
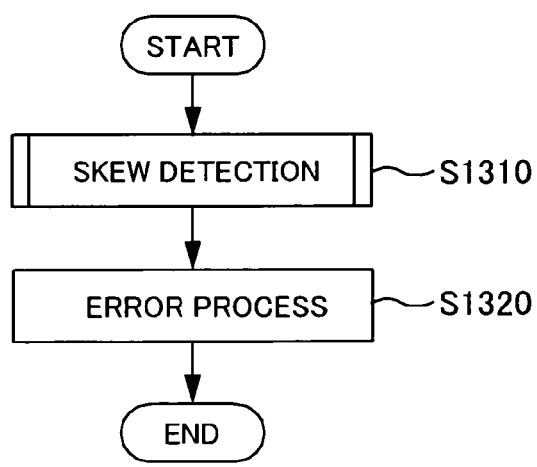
FIG. 51 is a flowchart illustrating a skew judgment process of the second embodiment.
Figure 52:
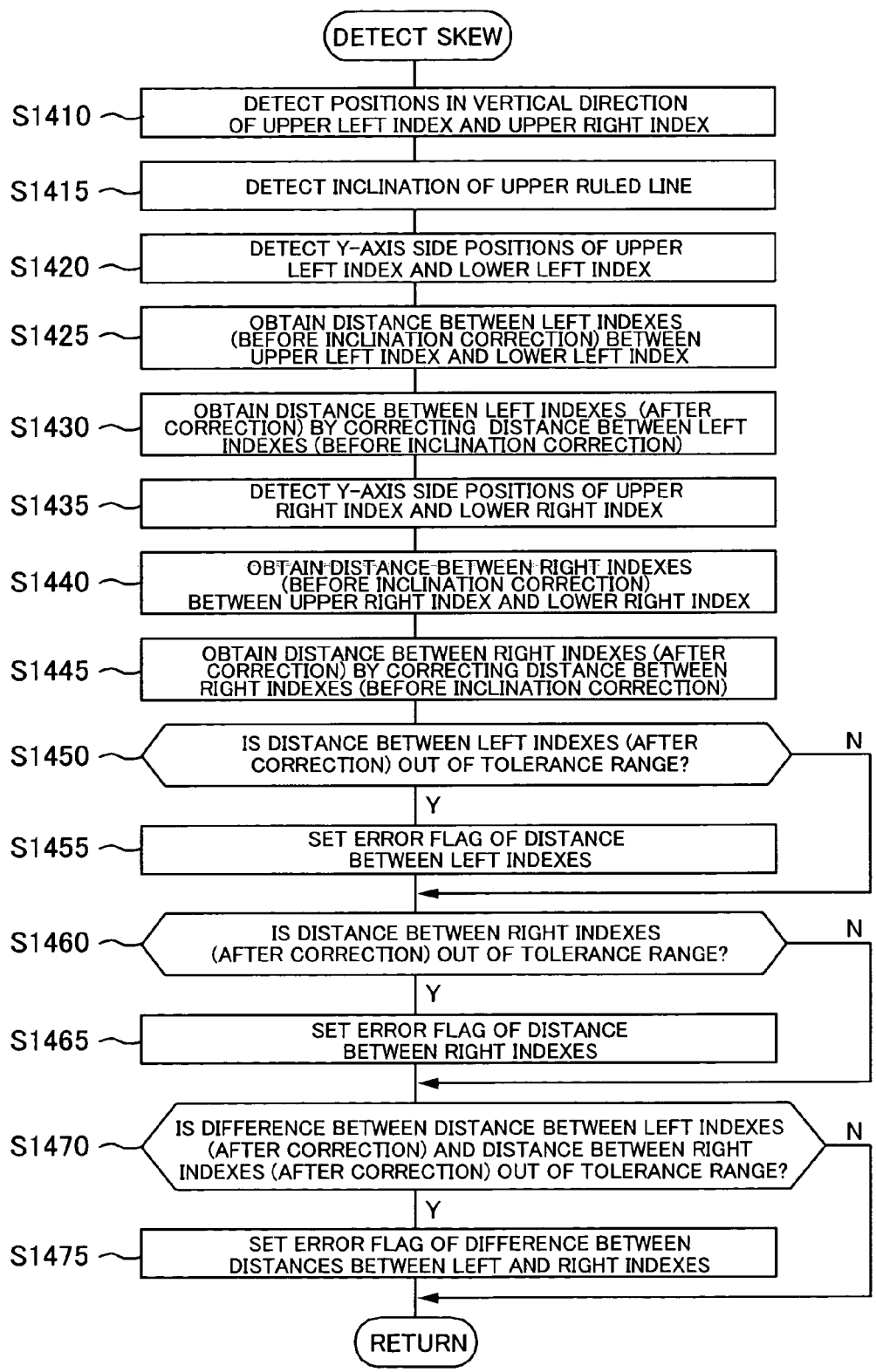
FIG. 52 is a flowchart illustrating a skew detecting process of the second embodiment.
Figure 53A:
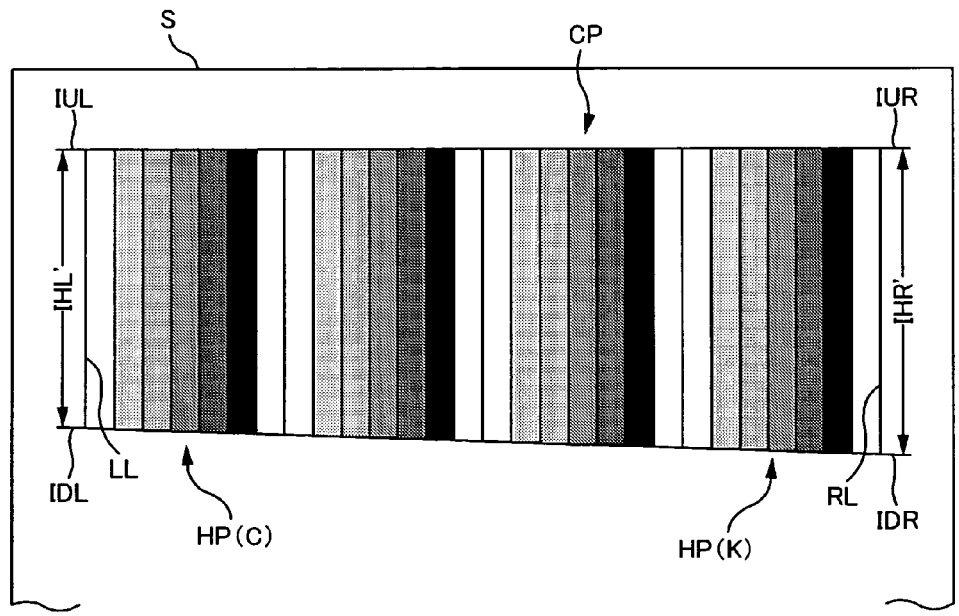
FIG. 53A is a diagram illustrating an example of a test pattern printed in a state where skew has occurred in the second embodiment.
Figure 53B:
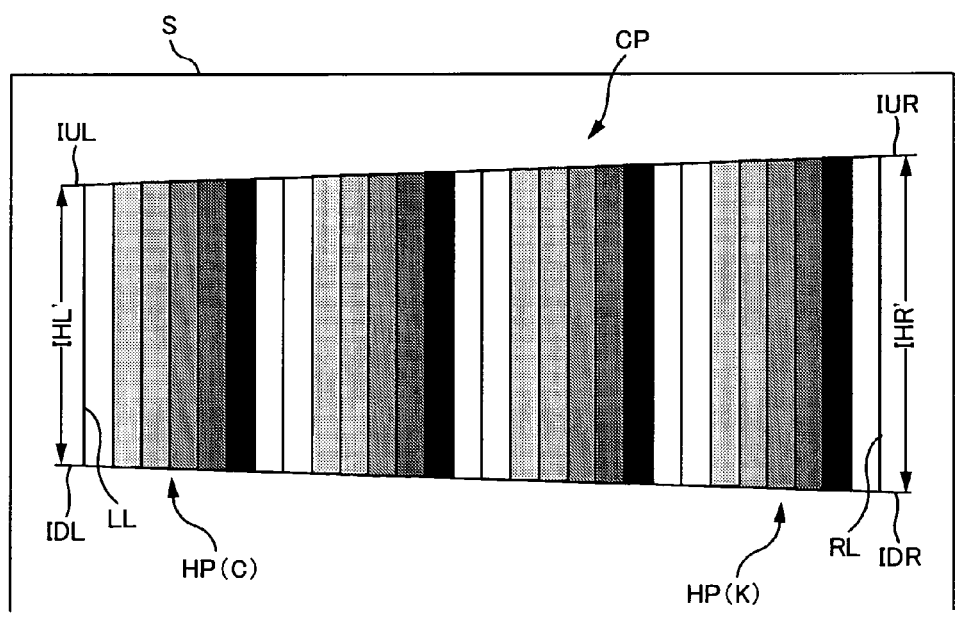
FIG. 53B is a diagram illustrating another example of a test pattern printed in a state where skew has occurred in the second embodiment.

Next, the skew judgment process (S1220) based on the printed test pattern CP is described. Here, FIG. 50 is a conceptual diagram illustrating a portion of the memory 1312 that is used in the skew judgment process. FIG. 51 is a flowchart illustrating the skew judgment process. FIG. 52 is a flowchart illustrating the skew detecting process. FIG. 53A is a diagram illustrating an example of the test pattern CP printed in a state where skew has occurred. FIG. 53B is a diagram illustrating another example of the test pattern CP printed in a state where skew has occurred.

First, a portion of the memory 1312 used in the skew judgment process is described. In addition to the information described above, some types of information are stored in the memory 1312 that is provided in the host-side controller 1310. First, the information that is stored in the memory 1312 is briefly described. As shown in FIG. 50, the memory 1312 is provided with an area for storing reference values, areas for storing tolerance values, areas for storing error flags, an area for storing the positions in the Y-axis direction of the indexes, areas for detecting the distance between the indexes, and an area for storing the inclination of the upper ruled line. It should be noted that the information stored in the areas is also described in the description of the process.

As shown in FIG. 51, in the skew judgment process, a skew detecting process (S1310) and an error process (S1320) are performed. Herein, the skew detecting process is a process in which skew when the test pattern CP is printed on the paper S is detected using the read data obtained in the reading process (S1215) of the test pattern CP. Furthermore, the error process is a process in which if skew at a level which interferes with setting the correction values has occurred, that effect is notified to the operator using, for example, an error message.

First, the skew detecting process is described. As shown in FIG. 52, in this skew detecting process, the host-side controller 1310 first detects the Y-axis side position of the upper left index IUL and the Y-axis side position of the upper right index IUR (S1410). In this step, the image data is acquired with respect to a read range indicated by a symbol Xb in FIG. 49, and acquires the pixel darkness data with respect to the image data in the read range Xb while shifting the pixels in the Y-axis direction. Then, the center of gravity position of the upper left index IUL and the center of gravity position of the upper right index IUR are obtained based on the acquired pixel darkness data, and the center of gravity positions are taken as the Y-axis side position of the upper left index IUL and the Y-axis side position of the upper right index IUR. The Y-axis positions are stored in the predetermined area in the memory 1312.

After the Y-axis side positions of the upper left index IUL and the upper right index IUR have been detected, then the inclination of the upper ruled line UL is obtained (S1415). In this step, the host-side controller 1310 obtains the displacement in the Y-axis direction based on the Y-axis side position of the upper left index IUL and the Y-axis side position of the upper right index IUR, and obtains the distance between the indexes in the X-axis direction based on the X-axis side position of the upper left index IUL and the X-axis side position of the upper right index IUR. Furthermore, the host-side controller 1310 obtains the inclination $\theta$ of the upper ruled line UL based on the displacement in the Y-axis direction and the distance between the indexes in the X-axis direction. In the second embodiment, the inclination $\theta$ in a case where the X-axis direction is taken as 0 is obtained. Then, the inclination $\theta$ is stored in the predetermined area in the memory 1312.

After the inclination $\theta$ of the upper ruled line UL has been obtained, then the Y-axis side position of the upper left index IUL and the Y-axis side position of the lower left index IDL are detected (S1420). Also in this step, the host-side controller 1310 obtains the center of gravity position of the upper left index IUL and the center of gravity position of the lower left index IDL, based on the pixel darkness data of the read range Xb, and takes the center of gravity positions as the Y-axis side position of the upper left index IUL and the Y-axis side position of the lower left index IDL. The Y-axis side positions are stored in the memory 1312. Next, the host-side controller 1310 obtains the spacing between the upper left index IUL and the lower left index IDL, that is, the distance between the left indexes before the correction (S1425). In this step, the difference between the Y-axis side position of the upper left index IUL and the Y-axis side position of the lower left index IDL is acquired as the distance between the left indexes before the correction without taking into consideration the inclination $\theta$ of the upper ruled line UL. Next, the host-side controller 1310 obtains a distance IHL between the left indexes after the correction by correcting the distance between the left indexes before the correction (S1430). In the second embodiment, the distance IHL between the left indexes after the correction is acquired based on the distance between the left indexes before the correction and cos $\theta$. Then, the acquired distance IHL between the left indexes after the correction is stored in the predetermined area in the memory 1312. These processes are for correcting the inclination of the image data (read data) based on the positions of the upper left index IUL and the upper right index IUR, and for acquiring the distance IHL between the left indexes based on the corrected image data. These processes can be performed faster by performing the processes with respect to a part of the image data. It should be noted that although the distance between the left indexes is corrected based on the inclination $\theta$ of the upper ruled line UL in this embodiment, it is also possible to perform the correction based on the inclination of the lower ruled line DL.

After the distance IHL between the left indexes has been acquired in this manner, then the host-side controller 1310 acquires a distance IHR between the right indexes in a similar manner. The distance IHR between the right indexes is acquired following a procedure similar to that of the distance IHL between the left indexes. Briefly describing, first, the Y-axis side positions of the upper right index IUR and the lower right index IDR are acquired (S1435), and then the distance between the right indexes before the correction is acquired (S1440). Subsequently, a distance IHR between the right indexes after the correction is acquired based on the inclination $\theta$ (S1445). The distance IHR between the right indexes after the correction is also stored in the predetermined area in the memory 1312. In this manner, the image data is corrected based on the inclination $\theta$, and then distance between the indexes is acquired, and thus it is possible to improve the precision in the detection. Furthermore, the reference for detecting the inclination is the index pairs that is a part of the horizontal ruled lines, and thus it is possible to use the detection result of the inclination $\theta$ also in other processes (such as detection of the inclination in step S1225).

Next, the skew judgment based on the distance IHL between the left indexes and the distance IHR between the right indexes that have been acquired is performed (S1450 to S1475). In these processes, the host-side controller 1310 first judges whether or not the distance IHL between the left indexes is within a tolerance range (S1450). This judgment is performed by comparing the distance IHL between the left indexes with the threshold. The threshold is set to a value obtained by being displaced from the reference value by a tolerance value 1. Herein, "reference value" refers to the distance IHL between the left indexes in a case where the test pattern CP is printed in an ideal state. More specifically, it can be referred to as the design value of the distance IHL between the left indexes. Furthermore, "tolerance value 1" refers to the carrying unevenness amount that is tolerable at the side edge section on one side on the paper S. Thus, in this step, if the distance IHL between the left indexes is equal to or smaller than the value obtained by subtracting the tolerance value 1 from the reference value, or is equal to or larger than the value obtained by adding the tolerance value 1 to the reference value, the judgment condition is satisfied. Herein, when the judgment condition is satisfied, the carrying unevenness on the left side on the paper S is so large that it has reached an intolerable level. Thus, the host-side controller 1310 sets an error flag of the distance between the left indexes in the predetermined area in the memory 1312 (S1455). Next, the host-side controller 1310 judges whether or not the distance IHR between the right indexes is within the tolerance range (S1460). Also in this step, the judgment is performed based on the threshold, and the threshold is set to a value obtained by being displaced from the reference value by the tolerance value 1. More specifically, the same threshold is used both at the left and the right. Then, if the judgment condition is satisfied, then the host-side controller 1310 sets an error flag of the distance between the right indexes in the predetermined area in the memory 1312 (S1465). Furthermore, the host-side controller 1310 judges whether or not the difference between the distance IHL between the left indexes and the distance IHR between the right indexes is within another tolerance range (S1470). This judgment is performed based on another threshold. More specifically, the other threshold is set as the tolerance amount (tolerance value 2) regarding the difference in the carrying amount between the left and the right. Then, if the difference between the distance IHL between the left indexes and the distance IHR between the right indexes is out of the range that is defined by the other threshold, then it is acknowledged that the difference in the carrying amount between the left and the right is large to reach an intolerable level, and an error flag of the difference between the distances between the left and right indexes is set (S1475).

When these processes are performed, for example, if, due to skew, the carrying amount of the paper S on the left side is excessively small as shown in FIG. 53A, then the error flag of the distance between the left indexes is set in the memory 1312. Furthermore, if, due to skew, the carrying amount of the paper S on the left side is excessively small and the carrying amount of the paper S on the right side is excessively large as shown in FIG. 53B, then the error flag of the distance between the left indexes, the error flag of the distance between the right indexes, and the error flag of the difference between the distances between the left and right indexes are set in the memory 1312. Furthermore, in the second embodiment, the spacing (such as the distance IHL between the left indexes) between the indexes that are formed on one side (such as the left side) in the movement direction, and the spacing (such as the distance IHR between the right indexes) between the indexes that are formed on the other side (such as the right side) in the movement direction are acquired, and the skew judgment is performed based on the spacings, and thus it is possible to simply and precisely perform the judgment.

<Regarding the Error Process>

Figures 54, 55:
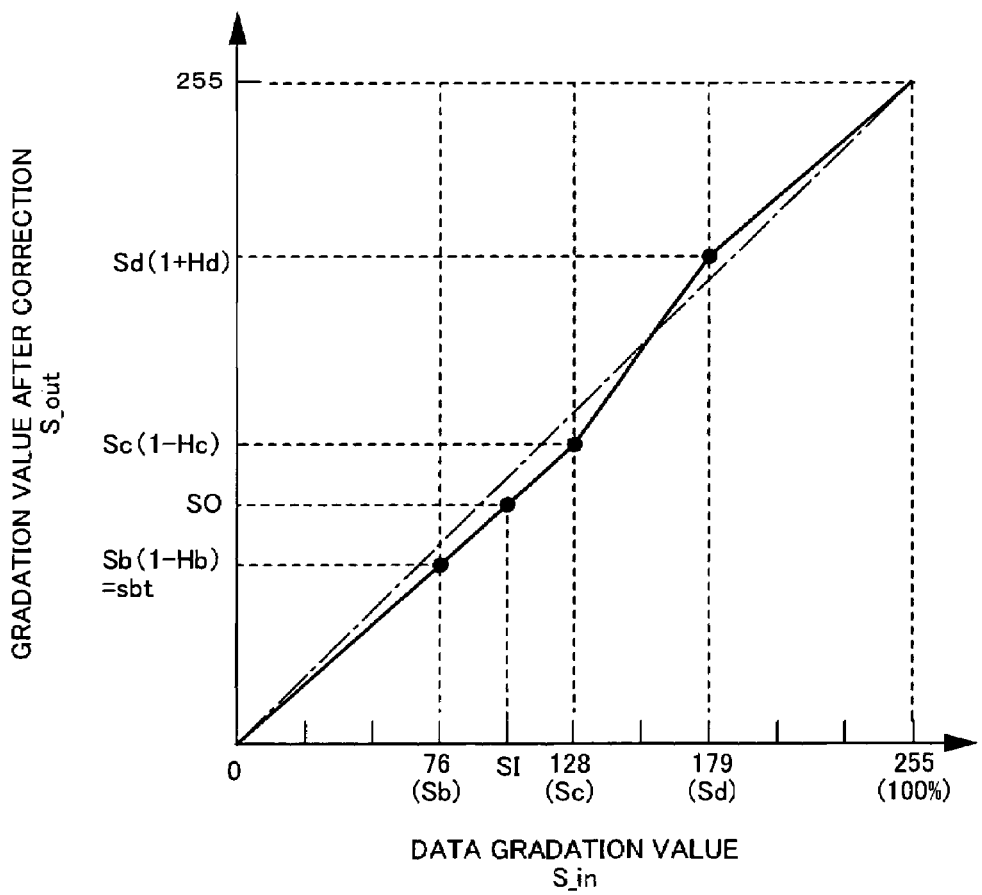
FIG. 54 is a conceptual diagram for illustrating an error process of the second embodiment.
FIG. 55 is a diagram for illustrating a darkness correcting process on pixel data of the second embodiment.

Next, the error process (S1320) is described. Here, FIG. 54 is a conceptual diagram for illustrating the error process. In this error process, the host-side controller 1310 refers to the memory 1312, confirms the set state of the error flag of the distance between the left indexes, the error flag of the distance between the right indexes, and the error flag of the difference between the distances between the left and right indexes, and notifies the state in accordance with the set state. This notification is performed, for example, by displaying a message on the display device 1400 or by outputting voice. If neither the error flag of the distance between the left indexes, the error flag of the distance between the right indexes, nor the error flag of the difference between the distances between the left and right indexes is set, then it is acknowledged that no skew has occurred, and that effect is notified. Furthermore, if only the error flag of the distance between the left indexes is set, then it is notified that slight skew has occurred on the left side on the paper S. Furthermore, if only the error flag of the difference between the distances between the left and right indexes is set, then it is notified that since slight skews have occurred respectively on the right side and the left side on the paper S, and the skews are symmetrical, the skews are overall at an intolerable level. Furthermore, if two or more error flags are set, it is notified that serious skew has occurred. In this manner, in the second embodiment, it is judged whether or not skew has occurred individually at the left and the right on the paper S, and the judgment is further performed with respect to the difference in the carrying amount between the left and the right, and thus it is possible to precisely confirm the characteristics of the skew when the test pattern CP is printed. For example, it is possible to notify in detail the information relating to the direction of skew or the level of skew.

Then, if it is judged that no skew has occurred, then the host-side controller 1310 performs the inclination detection (S1225; see FIG. 40B) and the following processes as described above. Furthermore, if it is judged that skew has occurred, then the host-side controller 1310 stops the process, and urges that the test pattern CP be again printed or that adjustment be performed. In this case, the type of the skew is also notified, and thus it is possible to perform appropriate processing in accordance with the skew that has occurred.

===Regarding the Processes Performed by the User===

<Printing System>

Following the procedure described above, the printer 1100 in which the correction values are stored in the memory 1152 (correction value storing section 1152a) of the printer-side controller 1150 undergoes other inspections and is shipped from the plant. At the time of this shipment, a CD-ROM storing the printer driver 1330 is also packaged together with the printer 1100. Then, a user who has purchased the printer 1100 constructs the printing system by connecting the printer 1100 to a computer (it goes without saying that this computer is different from the computer 1300 in the plant) owned by the user. Herein, "printing system" refers to a system including at least a printing apparatus for which the correction values have been set, and a printing control device. Herein, the printing control device is, for example, constituted by a computer owned by the user, and an application program and a printer driver is installed on it. Herein, it is possible to transfer the correction values that are stored in the memory 1152 of the printer 1100 to the computer when the printer driver is installed. Furthermore, it is also possible to let the computer 1300 refer to the correction values that are stored in the memory 1152 during the printing. Furthermore, it is also possible to download the printer driver via communication lines, instead of using the CD-ROM.

<Printing Operation>

When the power is turned on, the printer 1100 waits for the print data to be sent from the computer. When the print data is sent from the computer, the printing operation is performed. The basic operation of the printing operation is the same as the printing operation of the test pattern CP. Thus, the detailed description thereof has been omitted. The printing operation performed by the user is different from the printing operation of the test pattern CP in that the pixel data is corrected for each row area using the correction values. More specifically, the host-side controller that is provided in the computer performs a darkness correcting process after the color converting process. Then, the halftone process is performed with respect to the pixel data of many gradations on which the darkness correction has been performed. The following is a description concerning this point. FIG. 55 is a diagram for illustrating the darkness correcting process on the pixel data. The darkness correcting process is a process in which the gradation values of the pixel data are corrected based on the correction values. In this case, the correction values that are determined in accordance with each row area are used. As described above, in the second embodiment, three correction values that are associated with the darkness 30% (gradation value 76), the darkness 50% (gradation value 128), and the darkness 70% (gradation value 179) are associated with the row area. Then, based on the three correction values, the host-side controller corrects the pixel data of the unit areas belonging to the row area. More specifically, a gradation value S_out after the correction is obtained based on a gradation value S_in of the pixel data that has been obtained by performing the color converting process, and the halftone process is performed on the gradation value S_out.

If the gradation value S_in of the pixel data before the correction is equal to the command gradation value Sb, then the host-side controller can form dots associated with a target darkness Cbt at the pixel on paper simply by correcting the gradation value S_in into a target gradation value Sbt. On the other hand, if the gradation value S_in before the correction is a gradation value SI that is different from the command gradation value, then a gradation value SO that is to be output is obtained by performing linear interpolation such as shown in FIG. 55, but this is not a limitation. For example, it is possible to perform interpolation using a curved line between each of the correction values (Hb, Hc, and Hd) associated with each of the command gradation values.

In the darkness correcting process described above, the correction is performed on the row area that tends to appear dark such that the gradation values of the pixel data (CMYK data) of the pixels associated with the row area become low. On the contrary, the correction is performed on the row area that tends to appear light such that the gradation values of the pixel data of the pixels associated with the row area become high. It should be noted that the printer driver performs the correcting process also on the row areas of other colors in a similar manner.

When the thus created print data is output to the printer 1100, the darkness of image pieces associated with the row areas is corrected in a print image formed by the printer 1100, and thus the darkness non-uniformity in the entire image is suppressed.

===Other Examples in the Second Embodiment===

In the second embodiment, the correction value setting system 1000 provided with the printer 1100 was mainly described, but the disclosure of the method for acquiring the correction values, the method for setting the correction values and others is also included. Furthermore, the second embodiment is for the purpose of facilitating the understanding of the present invention and is not to be interpreted as limiting the present invention. The invention can of course be altered and improved without departing from the gist thereof and includes functional equivalents. In particular, the embodiments noted below are also included in the present invention.

<Regarding One Index Pair and the Other Index Pair>

In the second embodiment, the upper index pair IU (the upper left index IUL and the upper right index IUR) as one index pair is set at both end portions of the upper ruled line UL, and the lower index pair ID (the lower left index IDL and the lower right index IDR) as the other index pair is set at both end portions of the lower ruled line DL, but the configuration is not limited to this. For example, it is also possible to set the one index pair and the other index pair at portions midway on the upper ruled line UL and the lower ruled line DL. For example, it is also possible to provide the upper left index IUL and the lower left index IDL between the cyan correction pattern HP(C) and the magenta correction pattern HP(M), and to provide the upper right index IUR and the lower right index IDR between the yellow correction pattern HP(Y) and the black correction pattern HP(K). Furthermore, the number of the correction patterns HP printed between the indexes is not limited to four. It may be two, or may be five or more. As in the embodiment described above, when the plurality of correction patterns HP are horizontally printed side by side, and each of the indexes are set at both end portions on both ruled lines, the distance between the indexes constituting the index pairs can be secured, and thus it is possible to improve the precision in the skew detection.

Furthermore, it is also possible to print the one index pair and the other index pair separately from the upper ruled line UL and the lower ruled line DL. As in the embodiment described above, when the one index pair and the other index pair is constituted by a part of the upper ruled line UL and the lower ruled line DL, it is possible to effectively use the limited print space.

<Regarding the Print Mode>

In the second embodiment described above, the interlaced mode was shown as an example of the print mode, but this is not a limitation. For example, it is also possible to use the overlapping mode. The overlapping mode is a print mode in which one raster line is formed by a plurality of various nozzles Nz.

<Regarding the Printing System>

With respect to the printing system, in the second embodiment described above, the configuration in which the printer 1100 as the printing apparatus and the computer 1300 as the printing control device are separated from each other, but the configuration is not limited to this. The printing system may include the printing apparatus and the printing control device as a single unit. Furthermore, it is also possible to use a printer/scanner compound device provided with the scanner 1200 in a single unit. With this compound device, it is easy for the user to set the correction values again. More specifically, it is possible to easily construct the correction value setting system.

<Regarding Ink>

The second embodiment described above is an embodiment of the printer 1100, and thus a dye ink or a pigment ink was ejected from the nozzles Nz. However, the ink that is ejected from the nozzles Nz is not limited to such inks.

<Regarding Other Application Examples>

In the second embodiment described above, the printer 1100 was described, but this is not a limitation. For example, technology similar to that of this embodiment also may be applied to various types of storing devices that use inkjet technology, including color filter manufacturing devices, dyeing devices, fine processing devices, semiconductor manufacturing devices, surface processing devices, three-dimensional shape forming machines, liquid vaporizing devices, organic EL manufacturing devices (particularly macromolecular EL manufacturing devices), display manufacturing devices, film formation devices, and DNA chip manufacturing devices. Moreover, methods and manufacturing methods of these are also within the scope of application.

What is claimed is:

1. A printing method, comprising:

carrying a medium; and printing, using a plurality of nozzles for ejecting ink, a plurality of images, each of the respective images having a section to be detected for detecting an inclination of the respective image with respect to the carried medium, wherein:

each respective image includes an adjustment pattern that is used for adjustment, the plurality of nozzles are arranged in a predetermined direction, the images are printed by forming dots on the medium with the ink ejected from the plurality of nozzles while the nozzles are moved in a movement direction that intersects the predetermined direction, based on image data for printing the images, the image data indicates gradation values for respective unit areas formed on the medium, adjustment information is acquired using measured values of darknesses of adjustment patterns that have been printed based on specific gradation values, and the image data is corrected, by an adjustment so as to suppress darkness non-uniformity between row areas in which dot rows along the movement direction are formed using each of the nozzles when an image other than the adjustment patterns is printed, based on the adjustment information.

2. A printing method according to claim 1, wherein:

ink of a plurality of colors is used, the nozzles are provided for respective colors of the ink, and the adjustment pattern is printed for the respective colors.

3. A printing method according to claim 1, wherein:

the adjustment pattern has a main section and a plurality of sections to be detected that are used for the adjustment, and the plurality of sections to be detected are provided on both sides of the main section in the movement direction.

4. A printing method according to claim 1, wherein the section to be detected comprises a ruled line that is printed in the movement direction.

5. A printing method according to claim 4, wherein the ruled line is formed on an extension line of an outermost dot row that is positioned at the outermost at a front end side of the medium when the medium on which the adjustment patterns have been printed is carried.

6. A printing method according to claim 4, wherein the ruled line is formed when the nozzles are moved in order to form the outermost dot row that is positioned at the outermost at a front end side of the medium when the medium on which the adjustment patterns have been printed is carried.

7. A printing method according to claim 1, wherein the inclination of the adjustment patterns is detected for each of the adjustment patterns, data obtained by reading each of the adjustment patterns is adjusted based on the detected inclinations, and the adjustment information is acquired for each adjustment pattern.

8. A printing method according to claim 1, wherein if it is detected that the inclinations of the adjustment patterns are equal to or more than a predetermined amount, then that detection is notified.

9. A printing method, comprising:

carrying a medium; and printing, using a plurality of nozzles for ejecting ink, a plurality of images, each of the respective images having a section to be detected for detecting an inclination of the respective image with respect to the carried medium, wherein:

each respective image includes an adjustment pattern that is used for adjustment, the plurality of nozzles are arranged in a predetermined direction, the images are printed by forming dots on the medium with the ink ejected from the plurality of nozzles while the nozzles are moved in a movement direction that intersects the predetermined direction, based on image data for printing the images, the image data indicates gradation values for respective unit areas formed on the medium, adjustment information is acquired using measured values of darknesses of adjustment patterns that have been printed based on specific gradation values, the image data is corrected, by an adjustment so as to suppress darkness non-uniformity between row areas in which dot rows along the movement direction are formed using each of the nozzles when an image other than the adjustment patterns is printed, based on the adjustment information, ink of a plurality of colors is used, the nozzles are provided for respective colors of the ink, the adjustment pattern is printed for the respective colors, the adjustment pattern has a main section and a plurality of sections to be detected that are used for the adjustment, the plurality of sections to be detected are provided on both sides of the main section in the movement direction, the plurality of sections to be detected are ruled lines that are printed in the movement direction, the ruled lines are formed on an extension line of an outermost dot row that is positioned at the outermost at a front end side of the medium when the medium on which the adjustment patterns have been printed is carried, the ruled lines are formed when the nozzles are moved in order to form the outermost dot row that is positioned at the outermost at a front end side of the medium when the medium on which the adjustment patterns have been printed is carried, the inclinations of the adjustment patterns are detected based on distances in the predetermined direction between sections to be detected that are provided on one side of the main section in the movement direction and a front end of the medium, and distances in the predetermined direction between sections to be detected that are provided on the other side of the main section in the movement direction and the front end of the medium, the inclinations of the adjustment pattern are detected for the respective adjustment patterns, data obtained by reading each of the adjustment patterns is adjusted based on the detected inclinations, and the adjustment information is acquired for each of the adjustment patterns, and if it is detected that the inclinations of the adjustment patterns are equal to or more than a predetermined amount, then that detection is notified.

10. A storage medium storing a program,
wherein:
the program has a code for letting a printing apparatus having a plurality of nozzles for ejecting ink print, using the plurality of nozzles, a plurality of images, each of the respective images having a section to be detected for detecting an inclination of the respective image with respect to a medium, each respective image includes an adjustment pattern that is used for adjustment, the plurality of nozzles are arranged in a predetermined direction, the images are printed by forming dots on the medium with the ink ejected from the plurality of nozzles while the nozzles are moved in a movement direction that intersects the predetermined direction, based on image data for printing the images, the image data indicates gradation values for respective unit areas formed on the medium, adjustment information is acquired using measured values of darknesses of adjustment patterns that have been printed based on specific gradation values, and the image data is corrected, by an adjustment so as to suppress darkness non-uniformity between row areas in which dot rows along the movement direction are formed using each of the nozzles when an image other than the adjustment patterns is printed, based on the adjustment information.

11. A medium on which an image is printed,
wherein:
the image is a plurality of images that have been printed using a plurality of nozzles for ejecting ink, each of the respective images having a section to be detected for an inclination of the respective image with respect to the medium, each respective the image includes an adjustment pattern that is used for adjustment, the plurality of nozzles are arranged in a predetermined direction, the images are printed by forming dots on the medium with the ink ejected from the plurality of nozzles while the nozzles are moved in a movement direction that intersects the predetermined direction, based on image data for printing the images, the image data indicates gradation values for respective unit areas formed on the medium, adjustment information is acquired using measured values of darknesses of adjustment patterns that have been printed based on specific gradation values, and the image data is corrected, by an adjustment so as to suppress darkness non-uniformity between row areas in which dot rows along the movement direction are formed using each of the nozzles when an image other than the adjustment patterns is printed, based on the adjustment information.

12. A printing apparatus, comprising:
a plurality of nozzles for ejecting ink; and
a controller for printing, using the plurality of nozzles, a plurality of images, each of the respective images having a section to be detected for detecting an inclination of the respective image with respect to a medium,
wherein:
each respective image includes an adjustment pattern that is used for adjustment, the plurality of nozzles are arranged in a predetermined direction, the images are printed by forming dots on the medium with the ink ejected from the plurality of nozzles while the nozzles are moved in a movement direction that intersects the predetermined direction, based on image data for printing the images, the image data indicates gradation values for respective unit areas formed on the medium, adjustment information is acquired using measured values of darknesses of adjustment patterns that have been printed based on specific gradation values, and the image data is corrected, by an adjustment so as to suppress darkness non-uniformity between row areas in which dot rows along the movement direction are formed using each of the nozzles when an image other than the adjustment patterns is printed, based on the adjustment information.

13. A manufacturing method of a printing apparatus, the method comprising:
assembling the printing apparatus;
carrying a medium using the assembled printing apparatus;
printing, using a plurality of nozzles for ejecting ink of the assembled printing apparatus, a plurality of images, each of the respective images having a section to be detected for detecting an inclination of the respective image with respect to the carried medium; and
setting adjustment information,
wherein:
each respective image includes an adjustment pattern that is used for adjustment, the plurality of nozzles are arranged in a predetermined direction, the images are printed by forming dots on the medium with the ink ejected from the plurality of nozzles while the nozzles are moved in a movement direction that intersects the predetermined direction, based on image data for printing the images, the image data indicates gradation values for respective unit areas formed on the medium, the adjustment information is acquired using measured values of darknesses of adjustment patterns that have been printed based on specific gradation values, and the adjustment information is for suppressing darkness non-uniformity between row areas in which dot rows along the movement direction are formed using each of the nozzles when an image other than the adjustment patterns is printed.

* * * * *